(12) United States Patent
Hultgren

(10) Patent No.: US 10,242,115 B2
(45) Date of Patent: Mar. 26, 2019

(54) METHOD AND DEVICE FOR HANDLING DATA CONTAINERS

(71) Applicant: ContentMap Aktiebolag, Göteborg (SE)

(72) Inventor: Tomas Hultgren, Göteborg (SE)

(73) Assignee: ContentMap Aktiebolag (SE)

(*) Notice: Subject to any disclaimer, the term of this patent is extended or adjusted under 35 U.S.C. 154(b) by 601 days.

(21) Appl. No.: 14/766,640

(22) PCT Filed: Feb. 10, 2014

(86) PCT No.: PCT/SE2014/050161
§ 371 (c)(1),
(2) Date: Aug. 7, 2015

(87) PCT Pub. No.: WO2014/123482
PCT Pub. Date: Aug. 14, 2014

(65) Prior Publication Data
US 2015/0339307 A1 Nov. 26, 2015

Related U.S. Application Data

(60) Provisional application No. 61/762,348, filed on Feb. 8, 2013.

(51) Int. Cl.
*G06F 17/30* (2006.01)
*G06F 3/0481* (2013.01)

(52) U.S. Cl.
CPC ........ *G06F 17/3087* (2013.01); *G06F 3/0481* (2013.01); *G06F 17/30112* (2013.01);
(Continued)

(58) Field of Classification Search
CPC .......... G06F 17/3087; G06F 17/30643; G06F 17/30112; G06F 17/30327; G06F 17/30126; G06F 3/0481
See application file for complete search history.

(56) References Cited

U.S. PATENT DOCUMENTS

| | | | |
|---|---|---|---|
| 4,944,023 A | 7/1990 | Imao et al. | |
| 6,111,578 A | 8/2000 | Tesler | |

(Continued)

FOREIGN PATENT DOCUMENTS

| | | |
|---|---|---|
| CN | 1364266 A | 8/2002 |
| CN | 101124572 A | 2/2008 |

(Continued)

OTHER PUBLICATIONS

International Preliminary Report on Patentability for Application No. PCT/SE2014/050161 dated Apr. 21, 2015.
(Continued)

*Primary Examiner* — Albert M Phillips, III
(74) *Attorney, Agent, or Firm* — Lerner, David, Littenberg, Krumholz & Mentlik, LLP

(57) ABSTRACT

The present invention relates to a computer-implemented method for handling a set of data containers of a file structure, which method is performed by one or more processors of a computing device. The method comprises determining a first set of coordinates on a digital boundary for each data container, and storing the first set of coordinates associated with each data container in a memory. Furthermore, each data container is arranged in a parent data container, and each first set of coordinates associated with a data container is representative of a default position of that data container on the digital boundary. The present invention also relates to a computing device and to a computer-readable medium.

23 Claims, 20 Drawing Sheets

(52) U.S. Cl.
CPC .. *G06F 17/30126* (2013.01); *G06F 17/30327* (2013.01); *G06F 17/30643* (2013.01)

(56) References Cited

U.S. PATENT DOCUMENTS

| | | | |
|---|---|---|---|
| 6,137,493 | A | 10/2000 | Kamimura et al. |
| 6,754,660 | B1 | 6/2004 | MacPhail |
| 8,046,333 | B1 | 10/2011 | Wang et al. |
| 2007/0244921 | A1* | 10/2007 | Blair ................. G06F 17/30011 |
| 2008/0222166 | A1* | 9/2008 | Hultgren ........... G06F 17/30554 |
| 2009/0210413 | A1 | 8/2009 | Hayashi et al. |
| 2010/0083172 | A1 | 4/2010 | Breeds et al. |
| 2012/0081375 | A1* | 4/2012 | Robert .............. G06F 17/30126 |
| | | | 345/522 |

FOREIGN PATENT DOCUMENTS

| | | | |
|---|---|---|---|
| CN | 102289342 | A | 12/2011 |
| EP | 0694829 | A1 | 1/1996 |
| EP | 0942381 | A2 | 9/1999 |
| WO | 9908170 | A2 | 2/1999 |
| WO | 03073320 | A2 | 9/2003 |

OTHER PUBLICATIONS

Matsuura, Toshio et al., "A Graph Editor for Large Trees with Browsing and Zooming Capabilities", Systems and Computers in Japan, vol. 24, No. 8 (1993), pp. 35-46.
International Search Report for Chinese Patent Application No. 2014800200453 dated Mar. 19, 2018.
Office Action for Chinese Application No. 2014800200453 dated Mar. 27, 2018 (24 pgs.).

* cited by examiner $\Delta x_B = \Delta x_B \text{calc} + \Delta x_B \text{offs}$
$\Delta y_B = \Delta y_B \text{calc} + \Delta y_B \text{offs}$ $d = \Delta x - l$ From Left to Right From Right to Left From Up and Down From Down and Up

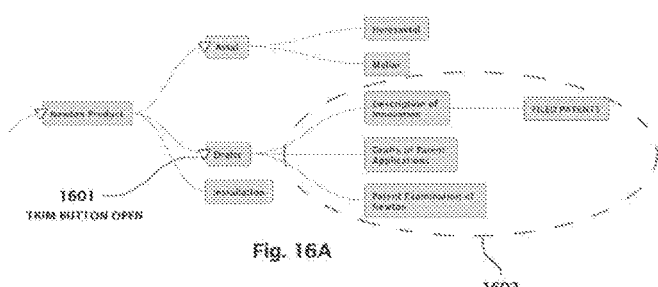
Fig. 16A
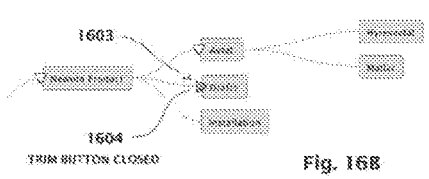
Fig. 16B
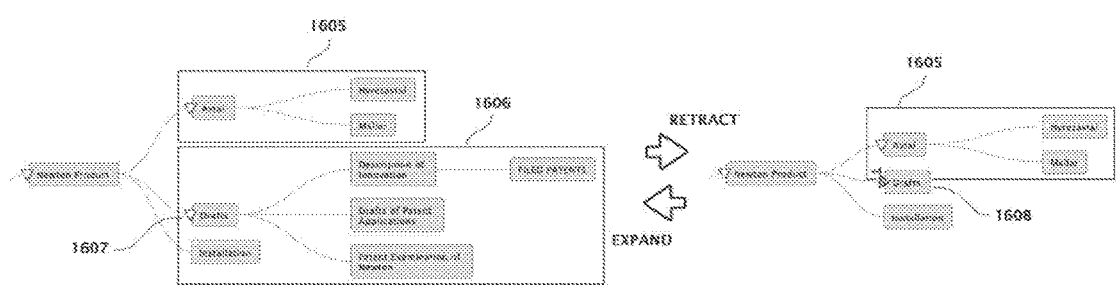
Fig. 16C                    Fig. 16D

METHOD AND DEVICE FOR HANDLING DATA CONTAINERS

CROSS-REFERENCE TO RELATED APPLICATIONS

The present application is a national phase entry under 35 U.S.C. § 371 of International Application No. PCT/SE2014/050161 filed Feb. 10, 2014 which claims the benefit of and priority to U.S. Provisional Patent Application No. 61/762,348 filed Feb. 8, 2013, the entire disclosures of which are incorporated herein by reference.

FIELD OF THE INVENTION

The present invention relates to handling of data containers, such as folders, of a file structure of e.g., a computer system, computers or computing devices comprising or being connected to a display device and one or more processors. More specifically, the present invention relates to a computer-implemented method for handling a set of data containers. The present invention also relates to a computing device and to a computer-readable medium.

BACKGROUND ART

Digital data containers and folders are used for handling and content, such as files, on file structure, and for representing the file structure in computers and other devices. However, for large file structure comprising a large number of folders and files, it is cumbersome to handle and overview the content for a user using existing systems. Also, existing system does not operate efficiently, leading to time consuming processing, memory accessing, and handling time for the processor, and, in turn, for time consuming management of the file system by the user.

SUMMARY OF THE INVENTION

In view of the above-mentioned and other drawbacks of the prior art, a general object of the present invention is to provide improved handling of a set of data containers. These and other objects are achieved by the subject matters provided in the independent claims. Preferred embodiments of the invention are presented in the dependent claims.

According to a first aspect thereof, the present invention relates to a computer-implemented method for handling a set of data containers of a file structure, which method is performed by one or more processors of a computing device. The method comprises determining a first set of coordinates on a digital boundary for each data container, and storing the first set of coordinates associated with each data container in a memory. Furthermore, each data container is arranged in a parent data container, and each first set of coordinates associated with a data container is representative of a default position of that data container in the digital boundary.

According to an exemplifying embodiment, each first set of position coordinates associated with a data container is representative of a default position of the respective data container in the digital boundary in relation to its parent data container.

According to an exemplary embodiment, the handling comprises generating a signal for output on a display communicating with the computing device: a graphical representation of the digital boundary, and a graphical tree structure representation of the set of data containers in the digital boundary based on the first set of position coordinates.

According to an exemplary embodiment, each data container is visualized with a data container symbol in the graphical tree structure, such as a folder symbol representing a node in the tree structure. The graphical tree structure may also comprise a root data container forming the most inward node of the tree structure.

According to an exemplary embodiment, the method comprises determining that a first data container contains a first child data container, and specifying parameters representative of the extension of a delimiting box representation in the digital boundary, which delimiting box representation is assigned to the first data container.

According to an exemplary embodiment, the method comprises determining that the first data container contains a second or more child data containers forming, with the first child data container, a sibling-subset of data containers sharing the same parent data container, wherein the step of specifying box parameters is based on sibling data containers in the sibling-subset.

According to an exemplary embodiment, size of the delimiting box representation associated with the first data container is adapted to encompass the tree structure formed by the sibling-subset of data containers.

According to an exemplary embodiment, the step of determining the first set of coordinates for the sibling data containers comprises arranging the default position of each one of sibling data containers in relation to the first data container and in relation to each other in based on predetermined position rules.

According to an exemplary embodiment, the predetermined position rules may comprise separating sibling data containers from each other by a sibling-sibling separation distance. For example, the sibling data containers may be separated from each other in a sibling-sibling direction normal to the general inward or outward extension direction of the tree structure. For example, the sibling-sibling distance corresponds to the y-axis direction, as e.g. illustrated with reference to s in appended FIG. 15. The sibling-sibling separation distance may for example be defined as the distance between neighboring outer edges of data container symbols representing the data containers in the tree structure in the digital boundary. According to an exemplary embodiment, the predetermined position rules may comprise separating sibling data containers from their common parent data container, i.e. the first data container, by a parent-sibling separation distance. For example, the sibling data containers may be separated from their common parent data container in a parent-sibling direction coinciding with the general inward or outward extension direction of the tree structure. For example, the parent-sibling distance corresponds to the x-axis direction, with reference to appended Figures.

The parent-sibling separation distance, for each sibling, may for example be defined as the distance between a reference point on a data container symbol representing the common parent data container in the tree structure in the digital boundary and a reference point on a data containers symbol representing that sibling data container in the tree structure in the digital boundary.

According to an exemplary embodiment, each data container comprising one or more child data containers is assigned a delimiting box representation, and the step of determining the first set of coordinates in the digital boundary for each data container is based on the extension of the assigned delimiting box representation in the digital boundary.

According to an exemplary embodiment, the step of determining the first set of position coordinates on a digital boundary for each data container is based on a condition that the delimiting box representations assigned to sibling data containers are arranged next to each other in the digital boundary. For example, the delimiting box representations of sibling data containers may not overlap each other.

According to an exemplary embodiment, the each data container which do not comprise one or more child data containers is not assigned a delimiting box representation, or a delimiting box representation assigned to a data container which do not comprise one or more child data containers is disregarded when determining the first set of position coordinates based on the extension of the assigned delimiting box representations in the digital boundary.

According to an exemplary embodiment, the method further comprises graphically representing a data container and a branch of child data containers associated to the data container by causing an identification of the delimiting box representation assigned to data container. For example, the delimiting box representation may be colored or indicated with a picture, or content specific markings representative of the content in the data container.

According to an exemplary embodiment, the method comprises recalculating the first set of position coordinates for all or a subset of the set of data containers.

According to an exemplary embodiment, the step of recalculating, or redetermining, the first set of position coordinates is caused in response to a data container rearrangement condition. For example, a data container rearrangement condition may include a rearrangement of the underlying file structure or a manual input via a user interface.

According to an exemplary embodiment, the data container rearrangement conditions is set by receiving an adjusting input for adjusting default positions in the digital boundary of the data containers or for changing the underlying file structure of the data containers.

According to an exemplary embodiment, the method further comprises adjusting the size of the digital boundary in relation to the required size for the graphical tree structure representation of the set of data containers, for example for fitting the tree structure in a display or in a frame or space in a display.

For example, improved control and enhanced overview and user interfacing of the tree structure is provided. Also, outputting the complete view of the tree structure on a display is achieved faster with reduced in- and out-put commands and/or processing time.

According to a further exemplary embodiment, the method comprises detecting a portion or symbol belonging to the tree structure is positioned in close proximity to an edge of the digital boundary, and, in response to the detection, expanding the digital boundary.

According to an exemplary embodiment, the method comprises determining a second set of coordinates in the digital boundary for each data container, and storing the second set of coordinates associated with each data container in a memory, wherein each second set of coordinates associated with a data container is representative of a off-set position of the data container in the digital boundary in relation to its default position.

Hence, an off-set position of each data container may advantageously be provided, wherein the off-set position of a data container is given by its second set of coordinates in relation to its first set of coordinates. For example, the first set of coordinates of a data container defines the origo (0,0) for the second set of coordinates. Thereby, according to an exemplary embodiment, the relative position in the digital boundary of each data container in relation to its parent data container may advantageously determined by the sum of the first set of coordinates and the second set of coordinates. This allows for improved and more efficient switching or adjusting between a default position and an off-set position of all or a subset of the set of data containers. Origo (0,0) for the first and second set of coordinates may also be fixed to the digital boundary.

According to an exemplary embodiment, the method comprises receiving via an input a first off-setting input selecting a data container of the set of data containers outputted on the display, receiving via an input a second off-setting input for moving the selected data container to an off-set position in the digital boundary, and in response to the second off-setting input recalculate the second set of coordinates for the selected data container.

According to an exemplary embodiment, the method further comprises, in response to the second off-setting input, generating a signal for output, on a display communicating with the computing device, the selected data container in its off-set position in the digital boundary based on its recalculated second set of coordinates.

According to an exemplary embodiment, the selected data containers forms a parent data container for a subset of child data containers, and the method further comprises maintaining each child data container in the subset in the same relative position in the digital boundary in relation to the selected data container.

According to an exemplary embodiment, the method further comprises, in response to the second off-setting input, causing an animation to be outputted on the display of the selected data container, with a connected branch of data containers comprising the subset of child data containers, being moved to the off-set position.

According to an exemplary embodiment, the method further comprises receiving a first adjustment input for adjusting all or a subset of data containers to each of their respective default position determined by the first set of coordinates associated with each data container.

According to an exemplary embodiment, the method further comprises, in response to the first adjustment input, generating a signal for output on a display all or the subset of data containers in their respective default position in the digital boundary.

According to an exemplary embodiment, the method further comprises receiving via an input a first move input selecting a data container of the set of data containers, which selected data container is arranged in the container of a current parent container, receiving via an input a second move input selecting a second data container for moving the selected data container to be arranged in the container of the second data container, and in response to the second move input recalculate the first set of coordinates for the selected data container.

In other words, the actual path of the selected data container in the file structured, which path determines the parent data container, is changed to a new path in the file structure determining the new parent data container of the moved selected data container. For example, in the case of folders, moving a folder A in the file structure from a current parent folder B into another folder C, such that folder C forms the new parent folder for folder A. This may be compared to changing the off-set position of a selected data container which only moves the selected data container in the digital boundary while the selected data container remains in and keeps the same parent data container.

For example, changing the off-set position or moving of a data container on the digital boundary, may be achieved by receiving drag-and-drop inputs in the digital boundary via a user interface.

According to an exemplary embodiment, the method further comprises, in response to the second move input, generating a signal for output on a display the selected data container in its default position in the digital boundary based on its recalculated first set of coordinates.

According to an exemplary embodiment, the selected data container forms a parent data container for a subset of child data containers, wherein the method further comprises maintaining each child data container in the subset in the same relative position in the digital boundary in relation to the selected data container.

According to an exemplary embodiment, the method further comprises, in response to the second move input, causing an animation to be outputted on the display of the selected data container, with a connected branch of data containers comprising the subset of child data containers, being moved to its default position based on its recalculated first set of coordinates.

According to an exemplary embodiment, the method further comprises, in response to the second move input recalculate the first set of coordinates for each one of the data containers in the subset of child data container.

According to an exemplary embodiment, the method further comprises, generating a signal for output on a display the data containers in their respective default position in the digital boundary.

According to an exemplary embodiment, the method further comprises receiving via an input a first import input selecting a data container of the file structure.

According to an exemplary embodiment, the selected data container and all data containers arranged in, or contained in, the selected data container forms the set of data containers.

According to an exemplary embodiment, the step of receiving the first import input selecting a data container of the file structure comprises selecting a data container presented in a user interface connected to the device.

According to an exemplary embodiment, the user interface comprises e.g. a graphical user interface or a command-line user interface. The first import input may also be provided by other application running of the computing device or running on another device connected to the computing device.

According to an exemplary embodiment, the step of receiving a first import input precedes the steps of determining coordinates and storing coordinates in the memory.

According to an exemplary embodiment, the method further comprises, in response to receiving the first import input, detecting that the selected data container is a part of the set of data containers, and adjusting the outputted digital boundary and graphical tree structure based on the position of the selected data container. For example, the digital boundary and tree structure may be centered in relation to the selected data container, or the selected data container, including or not including, its branch of child data containers, may be indicated or highlighted on the display.

According to an exemplary embodiment, the graphical tree structure representation of the data containers is outputted successively. For example by using a timer and causing a short time break between the outputting of data containers in a predetermined order, for example visualizing the growing of the tree structure in the outward direction from a root data container.

According to an exemplary embodiment, the method further comprises receiving via in input a first trimming input selecting a data container presented in a user interface connected to the device, for expanding or retracting a branch of child data containers associated with the selected data container.

According to an exemplary embodiment, the method comprises determining that an auto trimming condition is fulfilled, and in response automatically causing a second trimming input for auto-expanding or auto-retracting a branch of child data containers associated with a data container. The auto trimming conditions may be based various parameters, such as number of child data containers, or height and/or width of the graphical representation in the digital boundary of a branch of child data containers.

According to an exemplary embodiment, the method further comprises, in response to receiving the first or second trimming input, determining that the selected data container and the branch of child data containers associated with the selected data container is graphically represented in an extended state on the display, and retracting the branch of child data containers associated with the selected data container into a retracted state. Thereby, selected data containers may be retracted, or hidden, from displaying. In other words, parts of the tree structure may be minimized which provides for improved overview.

According to an exemplary embodiment, the method further comprises, in response to receiving the first or second trimming input, determining that the selected data container and the branch of child data containers associated with the selected data container is retracted, and extracting the branch of child data containers associated with the selected data container into a graphically representation of a extended state on the display.

According to further exemplary embodiments, the method further comprises, in response to receiving the first or second trimming input, recalculating the first set of position coordinates for all or a subset of the set of data containers. Moreover, the method may further include generating a signal for output on a display an updated version of the graphical tree structure representation of the data containers on the display based on the recalculated first set of position coordinates. In other words, in response to the trimming, surrounding data containers in the digital boundary are adjusted in the digital boundary based on its recalculated first set of coordinates.

According to an exemplary embodiment, the first set of coordinates and/or the second set of coordinates, and/or other meta data associated with the data containers, is stored in a central memory, such as a server or similar memory accessible from distance and/or accessible simultaneously by a plurality of different applications or devices.

According to an exemplary embodiment, the method further comprises connecting each data container with its parent data container with connection lines forming part of the graphical tree structure representation. Thereby, each data container is linked to its parent data container by a graphical connection line, such as a straight or curved connection lined. For example, the connection lines may be attached to a inward attachment point of a data container symbol representing a data container (child data container), and to an outward attachment point of a data container symbol representing the parent data container.

According to an exemplary embodiment, the attachment point locations of the connection lines on the data container symbols is based on, or may be adjusted based on, locations reducing the distance between the data container symbols in the digital boundary. The attachment points may also be based on alignment of the data containers symbols in the digital boundary, such as alignment between outer edges or sides of the data container symbols. For example, moving a data container to an off-sett position may change the attachment points on the moved data container and/or on its parent data container.

According to an exemplary embodiment, the method further comprises establishing a content view for presenting data container content, and generating a signal for output on a display a graphical representation of the content view.

According to various embodiment, content of a data container may include files, meta data associated with the data container, data container indexing parameters, data container function parameters, user rights associated with the data container, and/or user set parameters or association, such as if a user or other system has indicated or stored meta information to the data container.

According to an exemplary embodiment, the content view graphically present the content, such as files and data containers of selected data container. According to an embodiment, the graphical representation of the content view is separated from graphical tree structure representation of the set of data containers in the digital boundary. For example, the display may output in a portion of the display the digital boundary including the tree structure representing the data container file structure, and, in a separate portion of the display, the content of one or more data containers selected in the digital boundary. The content view may further present the content of a selected data container and the content in the associated child data containers. For example, the content of a complete branch of data containers arranged outward in the tree structure is presented in the content view.

According to an exemplary embodiment, the tree structure and content view is based on a file structure of data containers comprising e-mails having meta data such as size, reception date, sent date, sent form, sent to, etc. which may be used for sorting the e-mails in the content view.

According to an exemplary embodiment, the method further comprises receiving via an input a plurality of multiselecting inputs for selecting a plurality of data containers of the set of data containers outputted on the display, wherein the data selected containers form a multiselect-subset of data containers presented in the tree structure in the display.

According to an exemplary embodiment, the method further comprises indicating or highlighting the data containers belonging to the multiselect-subset on the display. According to yet an exemplary embodiment, the content of the multiselect-subset of data containers is presented in the content view. For example, the content from the plurality of data containers forming the multiselect-subset may be presented in a net-view not indicating in which data container a specific content is arranged. Alternatively, the content view indicates both the content and in which data container, in the multiselect-subset, it is arranged. Advantageously, in the net-view, content from a plurality of different data containers located on different levels in the file structure hierarchy may be viewed and sorted independent of where the content is located. For example, the sorting of file size, name, creation date, modified date, e-mail reception date, user rights, etc. may be provided in the net-view. Similar e-mail sorting parameters may be used also in the regular content view in which the content is arranged in their respective data container.

According to an exemplary embodiment, the method further comprises providing symbols markers being associated with a data container, and generating a signal for output on a display a graphical representation of the symbol marker in the digital boundary. The symbol marker may further be switch between a default position in relation to a data container and an off-set position in relation to the data container. Furthermore, a first set of coordinates and/or a second set of coordinates may be determined and assigned to the symbol marker, in a similar manner as described with reference to data containers. The symbol marker may for example be a flag or similar feature for being outputted on the display.

According to an exemplary embodiment, the method further comprises receiving via an input a first search input, and generating a signal for output on a display a graphical representation of a search result comprising search hits in the digital boundary.

According to an exemplary embodiment, the method may further comprise receiving a search result, e.g. from a search engine, comprising a set of content or list of search hits, such as files or folder or parameters, matching inputted search parameters. The graphical representation of the search result may comprise a result indication of content forming part of the search result arranged in a specific data container, such as, but not limited to, the number of search hits arranged in a specific data container. Also, for a retracted branch of data containers being retracted using trimming, the result indication associated with the root data container may represent all the content in the retracted branch. According to yet an exemplary embodiment, the search result is also outputted in the content view. Furthermore, only a subset of the search result may be outputted in the content view, or result view, based on a received second search input selecting one or a plurality of data containers in the digital boundary. Also, the graphical representation of the search result advantageously allows for selecting data containers containing searched content to be moved in the file structure or to be moved to an off-set position in the digital boundary.

According to an exemplary embodiment, the searching is based on, or performed on the content contained in, the multiselect-subset of data containers. Thereby, searching is only performed in the selected data containers forming the multiselect-subset of data containers. According to an exemplary embodiment, the search result comprises a list of search hits. The method may also comprise receiving a third search input for selecting one of more of the content or search hits of the search result, and generating a signal for output on a display an indication in which data container or data containers the selected one or more content or search hits is located. Furthermore, in response to third search input, the method may comprise reposition the digital boundary outputted on the display to the data container in which the selected content or search hit is located. Also, the reposition of the digital boundary outputted on the display may comprises zooming out, thereby increasing the overview of the set of data containers, and zooming in on the data container in which the selected content or search hit is located. Repositioning and zooming may at least partly be outputted to the display simultaneously.

According to various exemplary embodiments, searching and outputting of graphical representation according to above, may also be used for searching and presenting doublets of files and/or data containers in the file structure.

According to an exemplary embodiment, the method further comprises receiving via an input a time interval input for selecting a searching time interval via a user interface.

Thereby, the search result may advantageously be limited to a time interval. The time interval input may be based on an outputted time scale presented on the display. By receiving input adjusting the time interval on the time, the search result outputted on the display is adjusted. For example, any one of the time interval end points may be adjusted independently, or the complete time interval may be adjusted on the time scale thereby maintaining the same time period between the end points. By receiving adjustment to the time interval input, the search result outputted on the display may be contiguously be updated. Time parameter may include but is not limited to creation date and/or change date of data container or content, or creation date and/or change date of user right, indexing parameters, or other metadata associated with data container or content. For example, the time interval may be outputted as a time bar.

According to an exemplary embodiment, searching according to embodiments above may also be based on attributes, such as type, change date, editor, creator, or similar metadata information signed or associated to data containers or content.

According to an exemplary embodiment, the method further comprises receiving via an input a first preview-window input selecting a data container forming a preview data container, and generating a signal for output on a display communicating with the computing device, a graphical representation of the content in the preview data container in a separate preview window on the display.

According to an exemplary embodiment, the separate preview window is indicated by a linking symbol, such as a link-shadow or link-beam, to the preview data container in the digital boundary. Furthermore, a plurality of separate windows for a plurality of preview data containers may be outputted. Each preview data container may be linked to its separate preview window. When more than one separate window is outputted, the linking symbols may extend from only one side edge of the separate preview window, such as the bottom and/or upper side edge of the separate window. For example, the separate window is arranged as a moveable frame in front of the digital boundary. The linking symbol may be semitransparent, thereby showing the underlying tree structure in the digital boundary. A preview data container may be selected by e.g. mouse-over action. The separate preview window may be outputted above, under, or to the side of the selected preview data container.

For example, when searching based on attributes, the search result based on attributes of a data container, subset of data containers, such as the mutliselected subset of data containers, may be outputted by a graphical representation in the separate preview window.

According to an exemplary embodiment, the method further comprises generating a signal for output on a display communicating with the computing device, a graphical representation the content of a preview data container, or a preview-subset of data containers, in an integrated content view in the digital boundary, which integrated content view forms part of the graphical tree structure representation. Thereby the content of a specific data container is advantageously outputted in the tree structure which allows for a combined view in the digital boundary of the file structure of the set of data containers in the form of the tree structure and the content of a data container. For example, the data container symbol in the digital boundary representing the node for a preview data container is changed into a content holding symbol forming the integrated content view, while maintaining the content holding symbol as a representation of the node in the tree structure. The content holding symbol may e.g. be a frame in which the content of the data container is listed or presented. The content holding symbol may further comprise attachment points for connection lines in a similar manner as the data container symbol.

According to an exemplary embodiment, the method further comprises receiving via an input a first preview input selecting a data container of the set of data containers to form the preview data container.

According to an exemplary embodiment, the method further comprises generating a signal for output on a display the preview data container and/or all or a subset of the data containers based on recalculated first set of coordinates. For example, the content holding symbol of the integrated content view have a different size in the digital boundary and adjusting of the default positions of the surrounding data containers in relation to the integrated content view is provided.

According to an exemplary embodiment, the method further comprises determining that an integrated content view condition is fulfilled, and in response automatically generate a second preview input selecting data containers forming the preview-subset of data container.

According to various exemplary embodiments, the integrated content view condition is based on the zoom level of the outputted digital boundary on the display. Thereby, e.g. by receiving a zooming input, the graphical representation of the tree structure in the digital boundary being presented and the display may switch to integrated content view. In other words, by zooming in an out, the representation of the data containers by data container symbols may be switch to content holding symbols, and vice versa. For example, switching to integrated content view and the content data container symbol size may be based on different zoom-level threshold values, such as a first, second, third, etc., zoom threshold values. The content data container symbol size may further determined as a function of the zoom level.

According to an exemplary embodiment, the method further comprises generating a signal for output on a display communicating with the computing device a graphical representation of suggested data containers of the file structure for import. For example, the suggested data container may be forgotten data containers which have not been imported to the digital boundary.

According to an exemplary embodiment, the method further comprises receiving via an input a first stat-input for determining statistical relationship between a stat-subset of data containers, and generating a signal for output, on a display communicating with the computing device, a graphical representation of the statistical relationship between the stat-subset of data containers.

According to an exemplary embodiment, the statistical-subset is defined by the multiselect-subset of data containers. According to an exemplary embodiment, the graphical representation of the statistical relationship may be formed a chart symbol in connection with each one of the data containers in the stat-subset, such as a chart or pie chart. For example, the distribution of file size or overall content size, number of files of a certain type, etc., between the data containers in the stat-subset may be represented.

According to an exemplary embodiment, the method further comprises generating a signal to output a symbol representative of indexing parameters associated with the data containers. Also, a subset of data containers may be selected using e.g. the step describing the selection of the multiselect-subset of data containers.

According to yet an exemplary embodiment, the method comprises selecting a plurality of data containers according to the multiselect steps described in above embodiments, and generating instruction to write meta parameters, keywords, or user right parameters, etc., to the plurality of data containers being part of the multiselect-subset of data containers, and/or to the content arranged in by the multiselect-subset of data containers.

According to a further aspect thereof, the present invention relates to a computing device for handling and/or displaying a set of data containers of a file structure. The comprises one or more processors, a memory containing instructions that, when executed, cause the processor to: determine a first set of position coordinates on a digital boundary for each data container, and store the first set of coordinates associated with each data container in a memory. Furthermore, each first set of position coordinates associated with a data container is representative of a default position of the data container on the digital boundary in relation to a parent data container. The computing device is advantageous in similar manners as described in relation to the first aspect of the present invention. The computing device may further be communicating with a user interface for generating inputs to the computing device. Input may e.g. be achieved via mouse click, via a touchscreen, via touch pad, and/or movement detecting device detecting user movement, such as the movement of eyes, hands, fingers, head, or other body part, etc.

According to a further aspect thereof, the present invention relates to a computer-readable medium containing instructions that, when executed by a computing device, cause the computing device to perform the computer implemented method of any one of the embodiments described herein. The computer-readable medium is advantageous in similar manners as described in relation to the first aspect of the present invention.

Generally, other objectives, features, and advantages of the present invention will appear from the following detailed disclosure, from the attached dependent claims as well as from the drawings are equally possible within the scope of the invention.

NON-LIMITING DESCRIPTIONS OF EXEMPLARY EMBODIMENTS OF FEATURES

The digital boundary in which the tree structure is outputted on a display can be defined in various manners. The digital boundary may form a 2D-workspace wherein each point on the digital boundary is defined by a coordinate set comprising two different coordinate values, such as an x-coordinate and a y-coordinate, or polar coordinates. The digital boundary may also form a 3D-workspace wherein each point in the digital boundary is defined by a coordinate set comprising 3 different coordinates values, such as an x-, y- and z-coordinate, or coordinates reparative of spherical (radius, angle, angle) or polar coordinates (radius, angle, x), or a combination thereof.

In above described exemplified embodiments, the memory and/or computer-readable medium may comprise various types of data storage devices, such as main- or RAM-type, cache-type, register-type, flash-type, disc-type, or similar memories, or combinations thereof. The memory and/or the computer-readable medium may also include tangible and/or non-transitory computer-readable storage media for carrying or having computer-executable instructions or data structures stored thereon. Such non-transitory computer-readable storage media can be any available media that can be accessed by a general purpose or special purpose computing device, including a functional design of any special purpose processor. In the case information is transferred or provided via a network or similar communications connection, such as hardwired, wireless, or combination thereof, to a computing device, it properly views the connection as a memory or a computer-readable medium. Thus, any such connection may be termed a memory or a computer-readable medium.

It is further noted that other embodiments of the disclosure as defined by the claims, may be practiced in network computing environments with many types of computing devices and system configurations, including personal computers, hand-held devices, multi-processor systems, microprocessor-based or programmable consumer electronics, network PCs, minicomputers, mainframe computers, and the like. Exemplary embodiments may also be practiced in distributed computing environments where operations and task may be performed by local and remote processing devices that are linked, either by hardwired links, wireless links, or by a combination thereof, through a communications network. In a distributed computing environment, program modules may be located in both local and remote memory storage devices.

Generally, a display, or display device, form an output device for presentation of information in visual or tactile form. The display me be an electronic display. The display may also be arranged to function or operate as an in-put device, such as a touchscreen or movement reading device.

Various aspects of the invention may be implemented in a computer system comprising one processor or more processors, a memory unit, an interface unit, and a display or outputting unit.

Moreover, the invention may also be implemented in computer-executable instructions which for example may include instructions which cause a general purpose computing device, special purpose computing device, or special purpose processors to perform a certain function or group of functions. Computer-executable instructions may also include program modules that are executed by one or more computing devices in stand-alone or network environments. Computer-executable instructions, associated data structures, and program modules may represent examples of the program code means for executing steps of the methods disclosed herein. The particular sequence of such executable instructions or associated data structures represents examples of corresponding acts for implementing the functions described in such steps.

In the exemplary embodiments described herein, the feature data container may for example be described or referred to as folder, such as a folder in a computer file structure, node, or delimited subset of a data collection. For example, a data container or folder may be described as a virtual container within a digital file system, in which groups of files, e-mails, objects, entries, etc., and other data container or folders can be kept and organized. Furthermore, the feature digital boundary may also be referred to as surface, working surface, map, workspace, frame, window, boundary area, box, boundary volume, canvas, etc.

The delimiting box representation may be defined as a frame in a 2D workspace or as a volume or box in a 3D workspace. The delimiting box representation may further be defined with various shapes, such as a 2D-dimensional rectangle, circle, oval, polygon, or combinations thereof, or such as a 3D-dimensional box, sphere, ovoid, combined polygons, or combinations thereof. In general, aspects and functions of any 2D-dimensional feature, such as line or an area, may be applied to a corresponding 3D-dimension feature, such a line in space or a volume, in an analogous manner, and vice versa.

Content view may also be referred to as a result view. Also content may be outputted in windows. In content view, result view, windows and integrated content view, and similar, the content may for example by output as a list and/or as symbols, such as icons. Sorting of the content in the different views may be based on various attributes associated to the content.

Coordinates may also be referred to as position coordinates, as they are representative of the position of e.g. a data container in the digital boundary. A subset of data containers refers to a specific number of data containers selected from a set of data containers. The subset may be defined via an input, or based on a condition. For example, a child-subset of data containers is formed of a group of data containers being group together based on their property of being a child to parent data container. In a similar manner, e.g. the multiselect-subset of data containers is formed of a group of data containers being group together based on an selection of multiple data containers. Generally, the specification of a subset of data containers is used for specifying a group of data containers for being subjected to a specified functions and/or operations, such as trimming, moving, off-setting, searching, outputting, etc. A subset of data container may further be formed of a branch of data containers in the tree structure.

BRIEF DESCRIPTION OF DRAWINGS

Embodiments of the invention will now be described, by way of example, with reference to the accompanying drawings, wherein.

FIGS.

Figure 1:
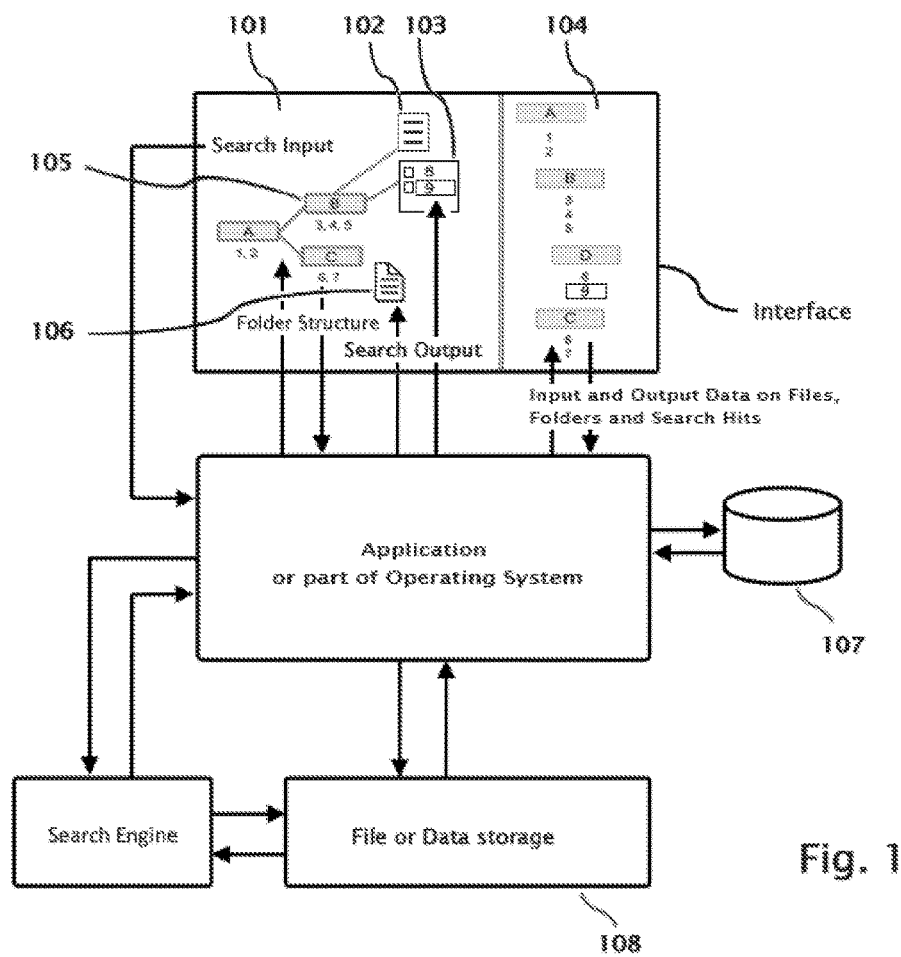
FIGS. 1-6 are schematic views of exemplary embodiments of the invention.

Additional figures of further embodiments may be appended.

It should be understood that the drawings are not true to scale and, as is readily appreciated by a person skilled in the art, dimensions and layouts other than those illustrated in the drawings are equally possible within the scope of the invention.

DETAILED DESCRIPTION OF EMBODIMENTS OF THE INVENTION

The present invention relates to methods and technical solutions for creation of two dimensional surface interfaces and applications which have been invented in the interface and combination with search engine.

The described embodiments of the invention are methods and machines/devices for creation of an interface comprising, or consisting of, structures of symbols with functionality of buttons on a two dimensional surface as well as, but not limited to, embodiments of processes and methods for processing in the interface as well as, but not limited to, processes of combining the result from a search engine and the suggested interface.

Usage and advantages of the embodiments of the processes and machines are for example, among other usages:
1. Automatic creation of graphical structure of folders for overview of content.
2. Improved result of search engine or search engines by means of, among other features, displaying the search hits in context of the structure of folders as well as using the search in combination with selection of part of structure and the here in described method of filtering only search hits in the result view of the interface.
3. Multi-select of folders and files with opening and preview of folders and files.
4. New freedom of management and movement to rearrange folders and files as well as to use the graphical structure to add, check and remove keywords and user rights for documents in folders.

The method to automatically calculate suitable coordinates for automatic deployment of the graphical folder objects from the computers storage units has not been previously known. Also, the method to store coordinates in an instance of a folder class in relation to the coordinates of the parent folder of the folder, has not been known or applied, or to read the content of the subfolders in connection with searching of documents with search engine for displaying the outputted tree structure of folder nodes on the infinite large workspace, the two dimensional surface.

The following describe methods relating to how reading and following handling of coordinates on the map are performed, the Relative coordinate method and the Box method, as well as different applications and display modes. Also searching with search engine in the imported content is described, as well as other applications with this solution.

The New System

A data container, such as a folder in a computer system, can contain more than one other folder, a branching occurs. As this branching can repeat it self, a tree structure will be provided. The best way to display a tree structure can be to draw it out on a two-dimensional surface, for example represented by a digital boundary. On the surface, each node at which the structure is branching is a folder. Folders can contain both files (documents, multimedia, drawings, blueprints or other data files) and other folders. If the folder structure is drawn up on a two dimensional surface in the way here propose, it will results in a good overview over all the folders and enables easier folder search and identification of its content. It is easier to edit and improve the storage structures of the folders and organize their content of files. By using the innovation, to connect the search engine of the computer system to the two dimensional surface of folders, it will improve the search function for documents since the search results will appear in its context at the surface. The system is an application running on an existing computer system with file system but it can also be integrated as a part in the existing computer system software or operating system. The two dimensional surface can grow vertically and horizontally without any limits and in theory to become as large as needed.

Advantageously, the map has an intuitive interface that makes it easy for users to both manage files and folders and to work with them operationally. The system can be integrated with the computer operating system in a way that all documents which can be searched, can be opened, saved and moved. There could be a preview function for the most common document categories and integration with search engines for all search categories with a view of the result, directly at the map and in addition to the usual view, in a search hit list (a list of documents that match the search criteria). It is possible to zoom out from the map for an overview, move or copy whole branches between units. One can see where the in the structures a document with a certain content exists and thereby arrange documents to the correct folders. When zooming in, the folders will open automatically and expose the content of new work surfaces through a process. It is possible to write notes directly at the map sheet, place marker flags etc. that is, all that one would like to do with regular paper map.

Import is done by dragging in the folder and the subfolders, which content shall be unfolded, into the application working surface or selected in the dialog box. The program can also be started with all folders in the computer system or with a pre-selected subset of all folders in the computer system imported. The program can also be initiated with all folders in the computer system or with a predetermined sub-set of all folders in the data system imported. The program can also be a permanent part of an operating system. The program reads the logical addresses to all folders and documents therein. An algorithm calculates the appropriate coordinates, such as the first and/or second set of coordinates, for the folders at the map chart based on (the appearance of) the structure and then draws out the structure of an easily foreseeable view of all folders. The added information, coordinates, makes the connections more easily understood. The collection of created instances, objects, of the various graphical objects on the two-dimensional surface layer stores logical addresses to folders and documents and the relative coordinates between folder icons which each folder obtains by the program for positioning on the surface (map). The instances also store other information for plotting of various graphical objects on the surface and instructions to the underlying computer system whose file structure is mapped on the surface. The collection of objects is organized by the program that keeps track of the various instances. Data about each folder symbol (data container symbol) (node in the structure) may thus be saved as an instance (object of class for folders in the program) in the memory of the computer. The instances of any object can also be saved on secondary storage device in real-time or when an application or computer (computing device) is turned off.

The system can then use the logical addresses for reading and writing to and from the computer system and to visualize the correlation between the search result and folder structure.

Graphical Objects and the Surface they Appear on

The two-dimensional surface, also referred to as the digital boundary, and sometimes in this text referred to as "the surface", sometimes "map of the surface" or "map", as one obtains a clear overview of the folders in the underlying data system file structure which much resemble a map over folders, plotted as a mind-folder of folder symbols. The surface is constructed so that it will grow automatically when items are imported, new tree structures emerges through imports or by moving items so that more surface area is required. The surface is thus infinitely large. Its edges detects if an object obtains coordinates in the vicinity of the edge, i.e. approaching the edge, and the edge is then moved automatically. The ultimate coordinate increases. To show the location of an object at the surface, the delimitation is visualized by a frame for the area where the object is located. The frame grows as above when items comes close to the frame's edge. With the help of a frame you can be assured that no object has disappeared into the surface and thereby lost. A plurality of frames can be created on the surface to display different affinities, different sources of imported objects or different users. The frame is represented by a line with shading on one exterior side. Shading indicates which side of the line is inside the frame if you only see the line. This way you can for example easily distinguish between the right and left boundary line if you do not see both and do not see any objects on the surface.

Lines

Lines connecting folder symbols are in this document illustrated as straight lines for simplicity, but in they can be drawn up in other ways in the application, e.g. as S-shaped curved lines which start and end at an right angle to the folder symbols they interconnect.

1. Handling the Coordinates of Folder Icons, Etc. On the Two-Dimensional Surface, and Database Storage.

Two types of relative coordinates is suitable pointing backwards/inwards to the preceding node, they are the default calculated relative coordinates, also referred to as the first set of coordinates, and the manually specified relative offset coordinates, also referred to as second set of coordinates. The latter indicates the deviation from the default calculated relative coordinates which are needed for mapping symbols to be moved on the surface to the new position that is saved to allow shifting between these two positions.

The Relative Coordinates Method

Using relative coordinate method to save coordinates is not obvious. It is invention that this method is most suitable for the application to plot out, by means of symbols, a depiction of the hierarchy of folders loaded from a storage structure on a computer, on a two-dimensional surface. When the folders and their hierarchical distribution shall be displayed on a flat surface, it can be done by connection lines and the indication of a direction for the order of folder symbols. The direction is given by the fact that one folder, that is located in another folder, always has only one input connection line, while the folder, if it contains several other folders (stored inside it), connects to those folders with several, as many as the child folders, outgoing lines. The direction of a folder that has only one input line is always the inward direction. The user understands the extent of tree structure even if the direction of extension is changed, such as from being from left to right to be top-down in the same tree structure. The hierarchy of folders is still unchanged, but the propagation direction can be changed.

An exception, according to an embodiment, to the above rule with always only one inward, or inbound, connection line, is if you want to show that the folder has several aliases, or shortcuts (i.e. images of the folder), that are located in folders other than the folder itself. In this situation, one can see the connection between the mapped folder (alias shortcut) and the proper folder by any other type of line, or the same type of line, which shows the tree structure construction. In the above mentioned situation, a folder can obtain as many additional connection lines to the folder (on the map symbol in-side) that there are additional images of the folder (alias, shortcuts).

On the surface is shown the hierarchy of folders in the computer system using the symbols of the folders and the connecting lines between the symbols. Other graphic icons and buttons are also used in the interface to carry out operations with the underlying computer system. The surface can be mainly used for the following, to:

1) Overview of the structure of the folder hierarchy of the underlying computer system.
2) Show contents of selected folders in the underlying information system. Using the surface to select subset of the folder structure and to display results on the surface of, for example, search and calculations.
3) Conduct analysis of content in folders with the superior overview as depicted hierarchy in the form of plane tree structure provides. Display sizes, quantity, distribution, duplicates, etc.
4) Improve the performance of search engines by showing where the search results are in the structure of the folder icons on the flat surface (map).
5) Simplify the movement and sorting of folders in the underlying data system file system. Change in the hierarchy of folders easier and clearer.
6) Simplify the movement and sorting of files stored in folders in the computer system's file system.

It is desirable and advantageous to be able to plot out on a two-dimensional surface how symbols of folders relate to each other and to the corresponding folders in an underlying computer system with file management, in a hierarchical storage structure where you can easily see which folders are located in which folders and easily move a folder, change the logical location in the file system, with the whole of the subsequent contents of folders located inside the moved folder (on the two-dimensional surface—outside the moved folder). This visualization problem does not exist in the mainstream operating systems, or in the tools for file handling since the content of, other folders, in a folder, do not appear explicitly in a depicted two-dimensional structure.

With a hierarchical storage structure means that several folders inside a folder, and so on, thus resulting in branching. A problem that is solved with the relative coordinate method is the movement of a folder, i.e. a folder icon on the surface, in other folders stored inside, that is, a tree structure. An example is if a folder P with its content should be moved from its location inside a folder Q and to be located inside a new folder R. We want to show in a simple and clear way by clicking on the folder P and simply drag it over the two-dimensional surface in the program window (map) and to folder R. When P is above the folder R, the move is indicated graphically on the surface and the system executes operations for moving folders with their content. Coordinates for folders (their location on the map) can be easily changed by clicking-and-dragging. Folders are permitted to stack on top of each other when a folder coordinate is changed manually. When folder P in its turn contains a number of folders that are plotted on the surface of the window, then you want these to follow in the movement, without changing their internal positions. This means that you obtain a clear picture of the operation.

According to various embodiments, data containers, such as folders, can be symbolized in various ways, i.e. with different symbols, in the two-dimensional surface. The hierarchical structure of folders, that is, how they are stored within each other, is best shown by folders symbolized by mapping symbols and their affiliation to a folder (called parent folder) is shown by a line joining the folder with the folder in which the folder is contained. In this way folder placement appears as a tree structure. Since a folder can contain several folders inside it will appear as a branch with several outgoing lines to all the folders inside the parent folder. A given folder in the tree structure can not, however, have several lines reaching into it. A folder can only be in one folder. For this reason, the tree's direction can be easily identified and thereby also which folders that are stored within each. If a folder has an alias or shortcut, which is a depiction of the folder, then its symbol in certain situations is shown as located in multiple folders. A folder that has multiple depictions (alias, shortcuts . . . ), can in this situation, obtain more input lines to the folder icon. One can in this case symbolize the connection which is a shortcut (alias etc.) through aberrant type of line or other symbol associated with the line (other line color, dashed line, extra graphic symbol, etc.).

We save each folder (node in the structure) coordinates relative to its parent folder. In contrast to calculate coordinates for all folder nodes and then save those in a database, only the change in coordinates from the previous folder are saved. These are saved in a database for each folder (see the Box Method below). In the following text, these are referred to as relative coordinates or offset coordinates. Data is saved in a (small) database or data array per folder and includes coordinates relative to the previous folder (parent). When a folder is moved in the tree structure, i.e. its coordinates are changed, and then all the outward lying folders will follow (as a branch).

When the system shows how folders are stored in each other through a depicted tree structure of folders connected by lines to show the structure, then, it is important that all outlying parts, folders, follow along as we move a folder. This is so much easier to achieve if you use relative coordinates, and by storing them in each instance of the folder symbol data, instead of absolute coordinates in a database. With this method, a folder's position on the two-dimensional surface depends on its relative coordinates to the previous folder (parent) and its relative coordinates to its previous folder (the parent folder) and so on. This allows all outlying folders to follow all changes in folder positions. This makes it possible to move an entire branch from one place to another simply by a click-and-pull of the entire branch, e.g. the operation Move (cut+paste to new location). It would look unclear if only the selected folder was moved while all other folders remained in fixed positions on the surface of the program window. With the help of the relative coordinate method it is easier to ensure that the entire branch follows any move naturally.

Each child-folder's icon can remember what their relative coordinates relative to its parent folder (startup folder). The y-coordinate, that is, the difference in height, is calculated by using the "Box method" described below, while the difference in the x-direction is obtained as a default value (which can be set). The coordinates are set to default values when loading (imports into the system as the data folder instances in memory are created) and subsequent resetting to the default position by calling the adjustment function, if so desired. The adjustment function is called even when using the wrapping function, Trimming, to retract some part of the tree structure of folders icons to a folder in order to save space on the surface. Relative x-coordinates are the same value for all folders while relative y coordinates are calculated for each folder with the Box Method. Both the x and y coordinate (Cartesian coordinate system) can then be changed manually by clicking on a folder and drag, drag-and-drop, in which a subsequent tree structure automatically follow. When doing a manual change this is added in the coordinates, hereinafter referred to as offset coordinates, to the estimated coordinates of the moved folder icon. By using the relative coordinate method, this change will have impact on all subsequent folder symbols placement on the surface.

Each folder's relative coordinate is saved in relation to its parent folder in the folder instance in database, data area, or in any other kind of file in the memory. The memory stores the coordinates of each folder in relation to each other, in height and width of the map. At plotting the system knows only were one specific folder should be in relation to the previous folder. Calculation of folder relative default coordinate in y-direction is calculated using "Box method" so that it does not collide with adjacent folder symbols (or folders) in the y- direction.

Calculation using the Box-method occurs when plotting of the tree structure, when importing a folder structure, and when redrawing of the tree structure is ordered (the ordered alignment automatically calculates return default values for the coordinates of the selected part of the tree structure). Manual movement of the freely selected parts of the folder structure is done by drag-and-drop in the parent folder, this will alter the relative offset coordinates and stores them in the current instance of the folder, regardless the use of the Box method.

Four Directions of Extension in Two Dimensions

Here and below, the principles and processes for handling coordinates, i.e. application of the relative coordinate method and the principles and processes of generation and adjustment of these coordinates for the nodes of the depicted structure of symbols corresponding to the underlying folder structure in the operating systems, and described. Principles and processes are designed so that the generation and adjustment becomes optimal and efficient based on the folder icons or jointing lines must not collide or intersect. These solutions are shown here as plotted from left to right, but will do as well with the same principles and processes, and to be drawn from left to right, top to bottom or bottom to top. The described methods solve the same problems regardless of the plotting direction of extension on the two-dimensional surface. Some adjustments may need to be done when changing from the horizontal plotting direction (left to right and right to left) to vertical propagation directions (top-down and bottom-up) and depending on requirement to still be able to read folder titles horizontally the width will be adjusted accordingly.

Figure 2:
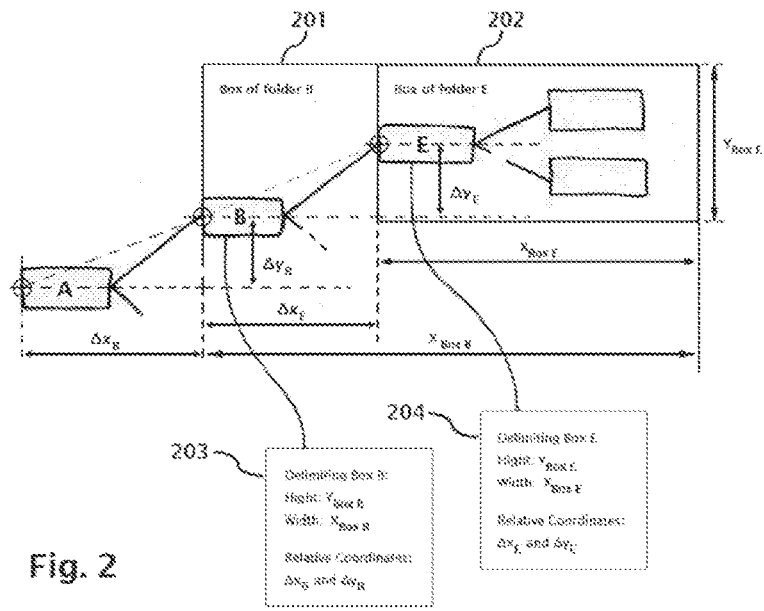

Some of the properties associated to the Data Container Node B, 203 in FIG. 2, which can be a folder in an operating system, can be its relative coordinates to the parent node, A, as well as the area it expands in the structure according to calculations with the Box Method described. The height of the Delimitation Box, 201, is not shown in FIG. 2. Data on the Delimitation Box, e.g. 203, can be stored in a Data array of instance E, 204, in the computer memory. It can also be stored in a central array for all the Delimitation Boxes in the computer memory. If the object E is a folder the stored data can be, but are not limited to be, height of the Delimitation Box, width of the Delimitation Box, the relative coordinates to the parent folder, B of the folder E.

The Reason why the Solution is Important

If we move a parent folder, all child folders will follow automatically because they only keep track of its location relative to its parent folder. If a parent folder is moved into a new position, the new position will be stored relative to its parent folder and the downstream tree will follow the move and obtain a new location when the calculating algorithm for plotting redraws the program window. The structure with relative coordinates provides the advantage that each folder only needs to only keep track of its position in relation to the parent folder. In combination with the reading and rearranging the PC file system to a map structure, this is important. The same relative coordinates were also used at the plotting of flags and text notes etc.

A less attractive alternative is to choose to set the root folder for example zero in a coordinate system and provide all other folders absolute coordinates relative to this origin. Then the absolute coordinate of x and y can be calculated and stored for each folder.

Loading the tree structure/import and plotting also goes faster and requires less of your computer's CPU because it requires fewer computations to specify the folder to the relative placement on the two-dimensional surface with relative coordinates which only points to the previous parent folder.

Storage of New Coordinates when Changing the Structure Appearance Manually Set Relative Coordinates.

Clicking the mouse cursor on a root folder (the innermost folder as the other folders in the selected branch is located inside) to a branch will highlight the entire branch. The location of folders and entire branches is easily changed by drag and drop. Folders can be moved in all directions, above, below, to the right or to the left of the previous folder that it's in, see description below. If a folder is clicked and pulled with mouse button it will move the folder and the entire underlying tree branches as much as the mouse moves over the map. The entire underlying branch of the folder icons accompanies due to each folder symbol is plotted in relation to the icon of the previous folder (the parent folder). The new relative coordinates of the current folder is saved as relative offset coordinates in the memory for folder icons. The relative coordinates of the surface and underlying folders are not changed. This is one of the consequences of the Relative coordinate method, that allows modifications of coordinates in a faster and easier way, with less calculations and with the consequence that subsequent and underlying folders follows automatically.

Figure 3A:
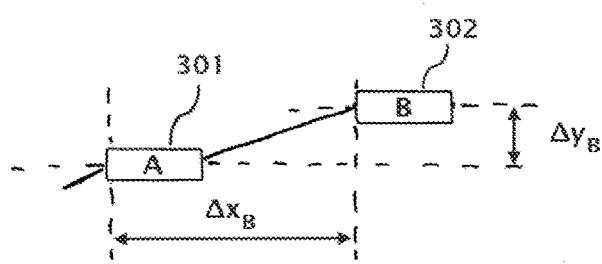
Figure 3B:
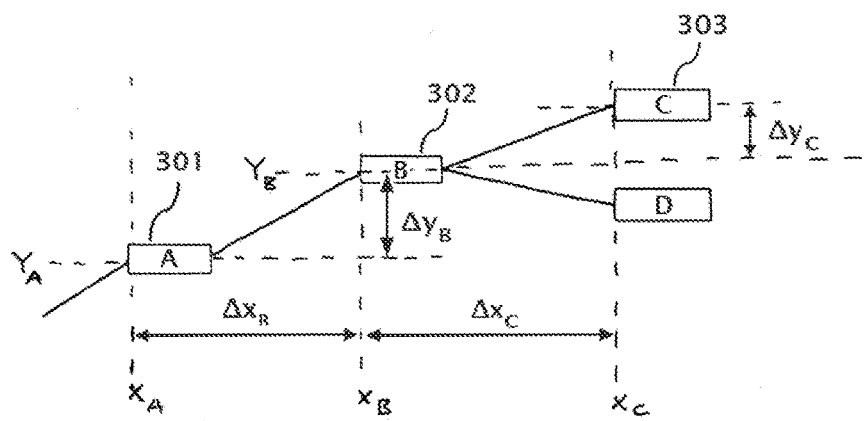

To enable re-plotting of the map or to make for example the position change of a branch from one folder to another (i.e. to edit the folder structure in a clear way) the method of Relative coordinates is a prerequisite. The invention solves the problems that applied for file structures that is shown in 2-dimensions and where you want to undertake a movement of the file structure or an arrangement where all outlying folders follows when a parent folder is moved. This is easier to calculate and plot out in the window in real time. Folder A in FIG. 3 is aware of its child folder B but does not have to know the folder B's coordinates. These coordinates are stored in the data area of B in the computer memory. B's relative coordinates will be added when B is plotted in the program window (offset) $\Delta xB$, $\Delta yB$ to A's coordinates, which in turn is the sum of A's relative coordinates relative to its parent folder etc. The relative coordinate between folder A and B in FIG. 3A is: $\Delta xB$, $\Delta yB$.

Figure 4A:
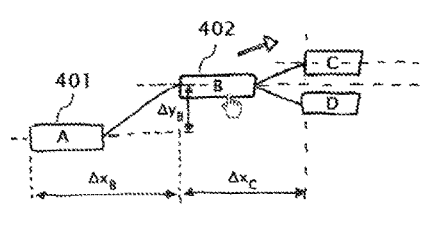
Figure 4B:
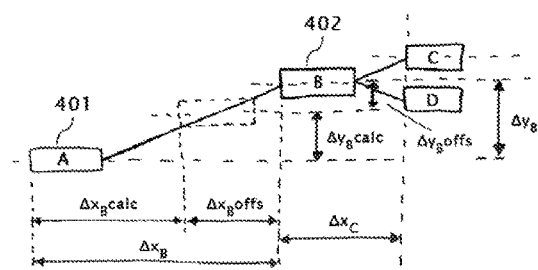

In FIG. 4A is shown how Folder "B", 402, have calculated relative coordinates default $\Delta xB$, $\Delta yB$ in relation to the parent folder "A", 401, stored in i Folder B's instance I the memory. Folder B is them moved, as shown in FIG. 4B, through the pull-and-drop distance $\Delta xBoffs$, $\Delta yBoffs$ to the new relative coordinate $\Delta xB$, $\Delta yB$ in relation to parent Folder A, 402. Folder C's coordinates relative to parent folder B will not change. The method of Relative coordinates contributes to an appealing and clear presentation. The method allows each folder locks up to the previous folder with the exception of when a folder (the child) is clicked and moved. Then the fixation is dissolved by the nearest previous coordinates inwards and towards the tree structure, that is, the fixation only will remain outwards in the tree structure. All child-folders will follow along when their parent folders are moved. The changes in relative coordinates apply only to the folder that is clicked in relation to the move. The system changes the relative coordinates of the instance and database for this particular folder, not coordinates in its parent folder or previous folders closer to the root.

Figure 29A:
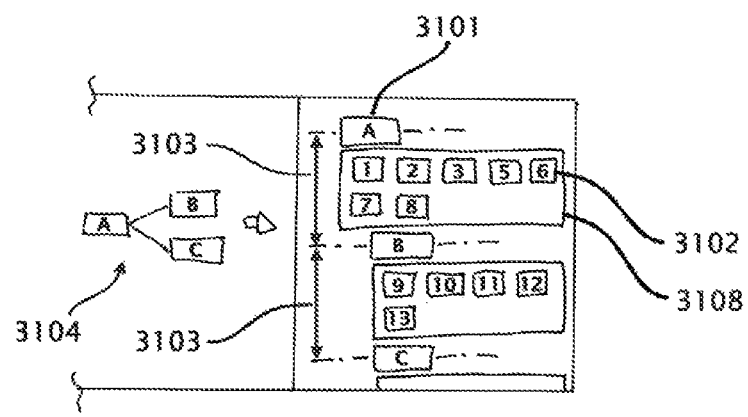
FIGS. 29A-29B are display views of exemplary embodiments of the invention.
Figure 29B:
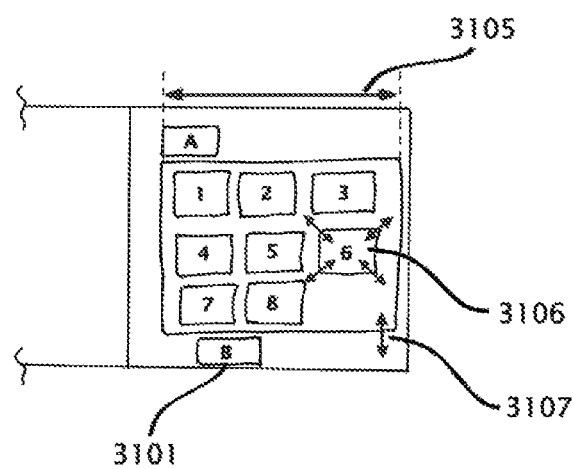

Relative coordinates to folders can be saved:

Locally in the computer, e.g. client device C1, C2, or C3 in FIG. 29, for the computer's own content of folders and In a database file in the server, e.g. server device C5, or C6, in FIG. 29, for public folders on the server that multiple client computers can share access off. This file ensures that changes of coordinates must appear equally in all client applications.

2. Two Different Types of Coordinates, Calculated Default Coordinates and Manually Adjusted Offset Coordinates are Stored in the Memory Instance of a Moved Folder. According to an Embodiment, the Sum Represents the Relative Coordinate to the Folder's Parent Folder. Plotting of Positions for Mapping Symbols and Interconnecting Lines.

Two different types of coordinates can be used, those who are automatically calculated with the Box method, referred to as default coordinates forming a first set of coordinates, and the manually set coordinates forming a second set of coordinates that is created by adjusting a folder's location (movement), referred to as offset coordinates. The coordinates are stored in the memory instance of a folder and the sum of them represents the relative coordinates to the folder's parent folder. This set up is favorable in order to enable for example; the function for wrapping (Trim, which compresses a tree structure into a single folder (the folder which then has one (or several) control keys; for in- and for out packing of the tree structure) occurs with maintained manually changed positions of the surrounding folder symbols.

According to one embodiment, the user can also change the appearance of the folder structure with the drag-and-drop by moving the given positions of the folders on the surface (without, however, changing in the logical structure of the folder hierarchy). Changing the appearance is made manually by changing the calculated coordinates of the folders by clicking-and-dragging at the same time as one observe how the structure changes on the surface. A prerequisite for this to happen, is that when a folder is moved inside the structure, i.e., both have other folders in the rear (closer to the root), as well as in front, (farther out in the structure) so should all the folders outside the moved folder follow the movement without distorting their relative positions, or the position to the moving folder, change. One wants the whole branch, which starts from the folder that has been clicked, to move in its entirety without changing appearance. Distance and appearance are changed backwards and around. The procedure will be clearer if the line between the moved folder and its parent folder continually redrawn. For this to work effectively, it requires that folder positions are obtained by relative coordinates in the way previously described. This means that a changes in a folder's relative coordinates moves all outlying folders directly or indirectly (through other folders) have their coordinates relative to this folder. A change to a folder coordinate is in fact a deviation from the calculated coordinate. To save this new changed coordinate, that the user has required and implemented manually in order to create clarity in the structure (or otherwise), so it is not lost in the event of recalculation of coordinates must be done for any reason, it is saved in a special location in the memory for the moved folder.

When adjusting the structure, changing default coordinates, understanding is facilitated if the connection line to the migratory folder is drawn between attachment points and with the right curvature continuous, so that the user can adjust the structure of optimal and no lines are crossed or infringe on other plotted folders.

The Sum of the Two Types, Default Calculated with Box Method and Manually Set Offset Coordinates, Represents the Folder Relative Coordinates to its Parent Folder.

The relative coordinates of a folder symbol is the sum of the calculated coordinates with the Box method and the manually specified offset coordinates obtained through drag and drop the folder symbol. One reason to distinguish between these two different pair of coordinates is linked to the retraction (trim) function of a tree branch in a folder. Then, the folder surroundings will be recalculated when viewing the wrapped tree branch as if the folder does not have any child folder at all. There is a significant difference from the appearance on the surface when the tree folder is fully extended compared to its appearance as retracted. It is desirable that manually executed moves are preserved in ambient folders after a retract. It is also desirable that manual moves in ambient folders remains and once the folder is opened again that tree branch can extend in an identical structure.

Advantage of Two Different Types of Coordinates for the Recovery of Only a Subset of the Directory Structure Another occasion when the division of coordinates, into of relative default coordinates and relative offset coordinates is favorable, is when return to the default coordinates is ordered (i.e. the default appearance) of only a subset of the tree structure of folders, see FIG. 16A. Then you need the subset of coordinates that belong to the folders which are not affected, to remain intact. This is done by erasing the manually placed offset coordinates within the parts of the structure which shall revert to the default layout and default coordinates. Other Folders manually set offset coordinates are retained intact. When returning to the default layout, one or several tree branches (several branches can be highlighted through the multi-select i.e. by clicking of several folders with the control key pressed), in the same way as when the branch is moved, by moving the first folder containing all other folders (the root folder) by clicking with the mouse cursor. This will select all outlying folders in the structure, or structures. This may be done through thicker lines, shading of lines and/or folder icons, or otherwise. After marking, order is made for adjustment to the default coordinates, i.e. a reversion to the original appearance which this part of the structure had when imported. This will erase or reset the manually set the offset coordinates to their default values for only the, or those folders, in the highlighted tree branch/branches. These folders' relative position shall revert to default and regain the appearance that the branch had when imported, if no folders have been added, deleted or renamed.

Default coordinates are computed by the Box method while the manual coordinates are added by drag and drop the folder structure on the map. Upon entry (inputting) of manual coordinates a stacking of folders on top of each other are allowed (as well as lines to be crossed). This could also function with a set of coordinates where the calculation to default would place the coordinates back to origin, while drag-and-drop would have changed them again. But then would not the wrapping function (Trim) be able to maintain manually changed coordinates during the process to wrap and then unpack a part of the folder structure.

Offset Coordinates by Drag-and-Drop Transfer of Graphical Objects

In addition to the, with the Box Method estimated (calculated) portion of the relative coordinates with a folder icon, is also an offset component created at manual change, transfer, through drag-and-drop of the folder icon in the structure of the surface. The object in the memory (instance) for each folder icon, accommodate both offset coordinates and the default coordinates. The value of the offset coordinates are reset (or set to a value that does not change the offset) when you return to the default position for a folder.

These coordinates are created e.g. when any graphic symbol on the surface is moved manually by drag and drop. Graphical symbols are folder icons, flags, text notes and other items. Folder icons works especially when all extrinsic objects, folders, flags, FIGS, and text notes, accompanies the movement of a folder through the use of the relative coordinate method.

Offset coordinates are saved to the instance of the graphical object that moved. This applies to all movable graphic objects except document symbols which are not plotted with relative coordinates for positioning on the surface, but they are only functions of folder icons.

The adjustment mode to return to the default modes of a structure erases offset coordinates and returns only to the calculated coordinates for the symbols on the surface. This applies to both the global "Adjust all" and the local alignment of a portion of the structure.

At application of the wrapping function, adjustment, offset coordinates are not erased. If the calculation of the relative coordinates with the Box Method occurs on all folder icons at the side and before trimming the folder, but their manually adjusted positions, stored in offset coordinates, remain unchanged. This makes the structure and the map behaves in a manner generally expected. Unexpected changes can be avoided.

Relative coordinates are the sum of the estimated coordinates and manual offset coordinates:

Relative $x$-coordinate=$\Delta x$ calculated+$\Delta x$ manual offset

Relative $y$-coordinate=$\Delta y$ calculated+$\Delta y$ manual offset.

When adjusting the structure, change of offset coordinates, the connecting line to the migratory folder shall be plotted out between attachment points continuously so that the user can adjust the structure optimally and no lines are crossed or infringe on other plotted folders.

Calculations of Positions for Folder Symbols when Plotting of the Structure of Folder Icons 1. The program reads (out) the coordinates for the position from the instance of the first Folder, the root folder, A. These are A's coordinates on the surface. See FIGS. 5, 9, 10 and 11.
2. The program then reads the relative coordinates from the instance for the first folder icon outside the root A. The Folder symbol B (A's child folder) in the memory, $\Delta xB$, $\Delta yB$. These coordinates are the sum of the (with the Box Method) calculated coordinates and any offset coordinates from any eventual manual movement. For folder icon B applies that to the relative coordinates of A are:

$\Delta x_B = \Delta x_B \text{calc} + \Delta x_B \text{offset}$ $\Delta y_B = \Delta y_B \text{calc} + \Delta y_B \text{offset}$ 3. The program now calculates the folder icon B's position on the surface by that the x coordinate is equal to the sum of the x coordinate of its parent folder A and relative x coordinate of the folder symbol B relative to A. Similarly for the y coordinate.

$x_B = x_A + \Delta x_B$ $y_B = y_A + \Delta y_B$

4. The calculations continue in this way for all coordinates when plotting folder symbols. The summation continues with a new term in the function under point 3 for each level that the hierarchy structure continues outward, alternatively a calculation whether the interim results (the absolute coordinates) are saved.

Folder icons can either be predefined bite folders or so can symbols be adapted after data within the folder. Data that can affect the folder layout is for example its folder name, text string that specifies its name, or the amount of its content when for example could make folders larger containing more files, or apply different kind of folders as symbols of what they contain in terms of folder types.

5. When plotting various folders sizes, depending on the length of the text string that represents the folder name, the system needs the coordinate for the point of attachment of each folder, the name of the folder and a placed variable that indicates the number of characters the text string should contain before changing rows.

Plotting of the Interconnecting Lines Between Folders

Figure 7:
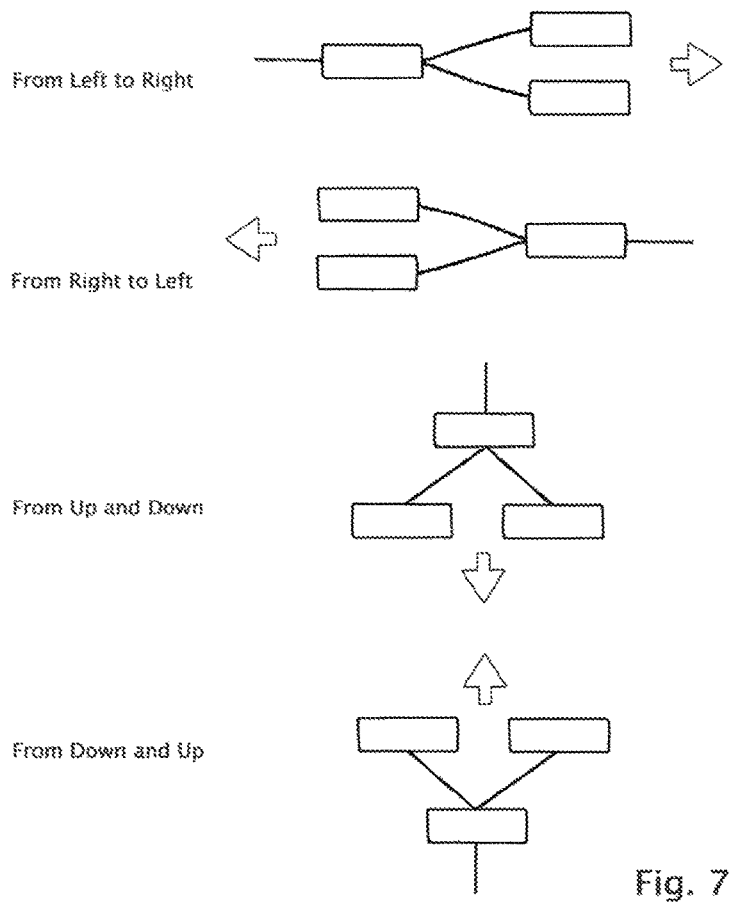
FIG. 7 is schematic view of exemplary directions of the tree structure and suggested connection lines.

Folder coordinates are calculated and always given from the center of the folder icons forefront when dispersal occurs from left to right. When dispersal occurs from top and down coordinates are always given from the middle of the folders upper edge, see FIG. 7. Connecting lines showing the location of folder icons and other graphical symbols always connects to the side of folder icons (or elsewhere in other sides of symbols) and thereby the other pages) and thereby follows when a offset coordinate is changed for a folder icon, or when a folder icons size is changed, for example by changing by a name change which may have impact on the length and height of the folder icon if this is plotted as enclosing folder names, see FIG. 5.

Figure 5:
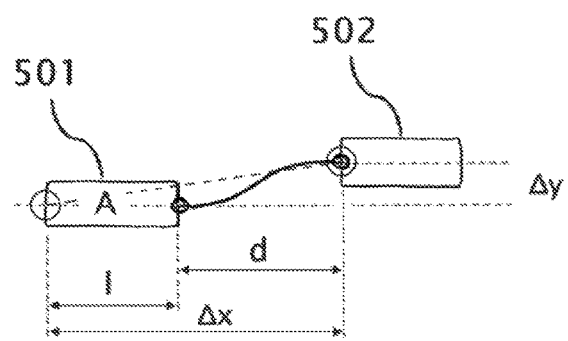

The line feature is dependent on start and end coordinates when a line shall be plotted between folders, see in FIG. 5, in case that the folder comprises a rectangular box.

If the folder A, 501 is renamed in FIG. 5, then length l will change, and therefore the distance d. For example, if the name of the folder A increases but not so much that the line shift occurs, then a length of folder symbol icon, l, increase and thereby decreasing distance d. The relative coordinates to the following (contained) child folder is not changed. The line is then redrawn and if applied curved lines are used this will result in slightly sharper curve bending.

3. Creation of Automatic Distribution and Thus Graphical Structure of the Folder Icons on the Two-Dimensional Surface, i.e. Calculating the Coordinates of the Folders on the Map for Saving in Memory Instances and in Databases, at Default Positioning.

How is automatically created by a computing process, an appropriate structure of nodes with symbols representing the folders in a file system distributed on a flat two-dimensional surface area (hereinafter also referred to as the map or work space) with the relative coordinates between the folder symbol nodes ($\Delta x$, $\Delta y$) are saved in the database, databases or similar surfaces in the memory. Lines connecting nodes (folder icons) to show the structure of the created hierarchy, i.e. how they are arranged inside/under each other.

An interface is previously described in WO 2006/004491 and U.S. 2008/0222166, hereby incorporated by reference. Calculating the coordinates of the symbols must be done so that no line can collide with any folder or cross another line, and that no folder icon may collide with any other folder symbol on the two-dimensional surface. The calculation algorithm/the method of calculating relative coordinates ensures that these collisions do not occur when it generates the appropriate coordinates on import, and the application of manual adjustment function. Change of coordinates can be done by moving folders manually. The adjustment function calculates the execution of new default coordinates and returns the folders to their original, default, modes. When the position (coordinates) of the folders and hence also for linking joint connecting lines to extrinsic folders are changed manually, then there is no need to fulfill the terms above of "non-collision".

The method according to one embodiment of the invention can calculate two-dimensional virtual invisible boundary boxes (or actually rectangles), also referred to as Delimitation Box representations, that encloses all the folder icons in a branch with the condition that the boxes may not collide, i.e. not encroach on each other's surface, and the process of calculating relative coordinates so that this does not happen. Each Delimitation Box is created on the basis of a folder icon. The box is owned by the folders that are in this folder (the folder icons included in the branch of the structure that has its beginning in the folder) and give the folder properties for calculation of relative y-coordinates. All folders do not need to obtain boxes. A folder can obtain a Delimitation Box if it contains at least one folder in turn, which is plotted outside the folder. Boxes can be present in both folders inside a branch and with the first folder in the branch, the root folder. The values for the Boxes, can for example stored in the instance for each folder in the memory and specifies Box's demarcation including all folder following child folders and their child's folders' external border. The limits are the highest respective the lowest situated folder's roof respective floor plus a fixed margin. In this way a box's folder becomes increasingly larger as you get closer into to the structure, i.e. to the root, where the folder is located. The Boxes provide, by repeating calculations, the coordinates in the y direction for each folder relative to its parent. Argument to the function, The Box Method, is the level of the x-coordinate and the number of folders at different levels. The x-coordinate, also referred to as parent-child distance, is a fixed (but adjustable for preference) default distance, why the number of the x-level is sufficient argument for the program to know which folder icons that are located above each other on the same level. When the number of siblings increases, lying in parallel on the same level, so does the "box" size in y-direction. For calculating relative coordinates is the box's height in the y-direction that is important to estimate accurately the number of pixels, while the extent of the x-direction, it is only the number of levels of folders separated by spacing standard, $\Delta x$, between folder icons. N.B the order of these coordinates (x, y) can change with the propagation direction of the tree structure.

Figure 6:
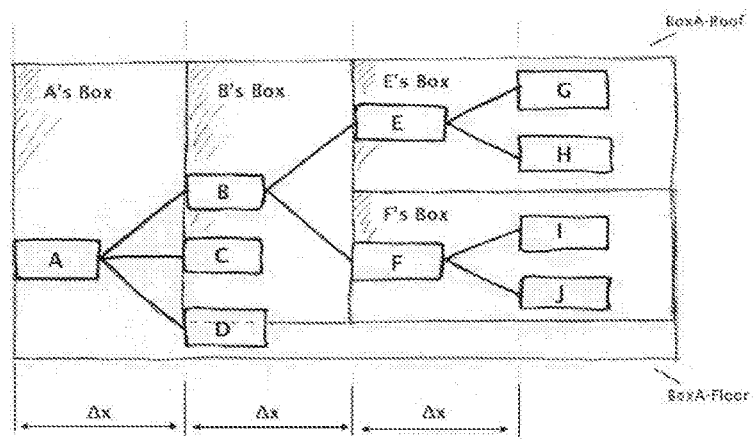

In FIG. 6, Folder C and D have no subfolders (Child folder) and have therefore no Box and is not moved out of A's or B's Boxes. The distance $\Delta x$ between folder icon in x-direction is per default a standard distance that can be changed by drag-and-drop.

The Symbols for the Data Containers, Such as Folders on the Two-Dimensional Surface In the following descriptions of solutions and patents so may folder symbols consist of various types of graphical objects with a defined distribution in height and width. The Icons need in other words, not to be drawn just as here by a rectangular box, but can for example display of a folder icon with an attached name field. At the folder icons, also referred to as data container symbols, to be calculated one a height and thereby a center point for the attachment of connection lines, disposed on half height in the y direction. In normal import, the lines between folders can be connected in the folder's left edge input line, and in the folder right edge for the outgoing lines. But the propagation direction of the tree structure of folders icons can be any of four different directions at which the connecting lines are moved to the corresponding sides. Outgoing lines can be more than one line if tree branching occurs, i.e., the current folder contains more than one folder (the child folder). The amount of connecting lines reaching out from the folder has no limitation in number. The amount of lines reaching into the folder icon can only be one. Connecting lines can also be placed on the folder icons upper or lower surface as movements are made upwards or downwards (along y-direction) on the two-dimensional surface, see FIG. 7 for the connecting lines at different propagation directions.

The Distance Between Symbols in the Folder Structures in the x-Direction

The distances between the folder icon the front edges, the relative x-coordinate, can according to one embodiment be a globally applied default value which gives the distances (in units used, such as pixels) between all folder icons at the calculation of relative coordinates in the event that the propagation direction is to the right of the folder structure. In a similar way, coordinates are given for the other three propagation directions (with an expanding −x, and expanding −y and expanding y). This value can be set and may then impact for all folder icons in the calculation of relative default coordinates. A folder icons relative coordinates can also be changed manually and coordinates are then written for manual offset into the instance of the folder icon. To give the offset coordinates to a folder icon in a structure of folders on the surface (the map), you can simply click on the folder icon and with the help of the mouse, drag the graphic folder object to any position you desire, so called drag-and-drop. All folder icons lying outside will follow the movement, without distorting their relative positions to each other or their positions relative to the migratory folder icon. The final relative coordinate of a folder icon is the manually determined offset coordinate plus the estimated relative coordinate.

$$\text{Relative } x\text{-coordinate} = \Delta x \text{calculated} + \Delta x \text{manual offset.}$$

See FIGS. 4A and 4B.

The Start Column, the Vertical Line with Root Folders from all Imported Structures All root folders are collected along a vertical column starting at a specified position in the x-direction relative to the application window, e.g. represented by the digital boundary.

Distributed along the vertical line (x=0) the imported root folders are separated by different y-coordinates. When importing a root folder it can be fitted with a trim function, a button that enables the whole outside lying tree structure to be folded in ("into the folder") and the folder's Delimitation Box then decreases to just the root folders height plus margins. This allows that the start column root folders can be gathered in a small area due to the ability to retract the tree structure. Then, the structure can be chosen in which one wants to work without being disturbed by other imported tree structures.

The Box Method

The Box Method is a method to calculate the offset coordinate in height, y-direction, ie. how much a child folder should differ from its parent folder in the y-direction. This calculation is based on whether the (child) folders has child folders in its turn or not and their quantity and their height (the height of the folder icon may depend, among others, on the number of lines in the string is the folder name). By relative coordinate is meant differences in the x- and y-coordinates between the mounting points at the folder icons leading edges. The attachment point is the point that lies in the middle of on the folder's graphic symbol, center at its left side, where the line attaches to the folder in case the propagation direction is to the left. The dot indicates the folder's x- and y-coordinate. Each child folders coordinates are indicated relative to its parent folder according to relative coordinate method described above. The coordinate in the x-direction is always the same as in the default position.

The Box method to calculate coordinates: The method means that one begins in the root folder, i.e. the first folder that contains all the following folders, and examines itself outward and then reads all the logical addresses (paths) to the folders that follow to find it, or the outermost folders from the root folder. A smaller subset of the structure can, where appropriate, also be ordered adjusted back to a default positions with The Box Method without the other elements are affected. The first folder is examined to see if it contains any child folders, then the next following folder is to be examined to see if it has any child folders etc. Every parent folder plots out their child folders. When calculating folders location in height (i.e., y-direction), a calculation starts off with the sum of all child folders total height and calculates an Delimitation Box, which then gives the position in the Y direction of their parent folder. Boxes are calculated on all folders that contain any child folder. The main condition that arranges parent folders and calculates their offset coordinates in Y direction is: that no Delimitation Box is allowed to interfere with any other Delimitation Box's surface, i.e. they must not collide or overlap.

Three Variants of the Application of the Adjustment Process are Possible:

1) Completed Adjustment at the Particular Time of the Entire Structure or Selected Subset of the Structure of Folder Symbols Ordered by a Specific Command.

Calculation of the folders in the structure for arrangement of coordinates at a special occasion. The procedure may then be repeated as necessary. If a new folder is added, or a folder is moved, after organizing with The Box Method, then there will be no automatic adjustment of the coordinates, but only when organization is ordered. Such organization can be ordered by pressing a button provided for this purpose when either:
  a. All imported branches should be adjusted, or
  b. Only the subset of folders selected in the structure should be adjusted (a branch becomes selected (highlighted) by its first folder, the root folder, when clicked).

2) Adjustment at Import of One or More Folders or at Wrapping or Unwrapping of a Branch of the Tree Structure of Folder Icons in a Folder (the Trim Function).

Adjustment of the entire tree structure or the surrounding tree structure emanating from the new folder's parent folder, or the wrapped folder's parent folder.

3) Continuous Adjustment.

Continuous calculation and organization. As soon as some folders coordinate is changed, its relative coordinate is be saved to its parent folder and surrounding folders, siblings and parent siblings are adjusted. Likewise, when creating a new folder, or when moving the folder in the structure, i.e. the operation when a folder switching parent folder, then all coordinates are adjusted in either just the y-direction or in both x- and y-directions with The Box Method.

Rules for Folders and Calculation of Relative Coordinates with the Box Method

1. For each imported folder to the system an instance in the memory is created (an object from a class in the programming). The instance is an organized area in computer memory for the folder in question and is used to by a symbol depict the folder (from the computer system) on the two-dimensional surface. Data from the instance is used both to position the icon for the folder relative to other folder icons in the structure (among other with relative coordinates), view and calculate the folder contents as well as for using the symbol (e.g. by drag-and-drop) to give instructions on operations acting on the corresponding folder in the computer system. Instances saves the following data:
   a. logical address to the folder (path) from a given root.
   b. the text string for the folder name.
   c. the folder icon's height, i.e. distribution in y-direction of the folder icon (symbol). This can be a function of the length of the character string and the accompanying line breaks.
   d. Relative coordinates, $\Delta x$ and $\Delta y$ to:
      i. the folder's parent (the parent folder) if any (the folder is then not root folder) or to
      ii. surface origo if the folder is a root folder. Origo can be located along a vertical line that creates a column of imported root folders. Origo can be in the middle of this line or in another point along this line.
      iii. offset coordinates, which is, additions to the calculated relative coordinates, that occur when manually moving a folder icon (and subsequent branch).
   e. Values for height and width of the own box's borders. Height is calculated in pixels, or other suitable unit, and width (in number of levels where folder has child folders).
   f. Lists on the folders all child folders, their child folders etc. and links to them in memory as well as their logical addresses. The lists contain the entire underlying hierarchy (structure) of folders.
   g. List on the folder all other graphical objects than mapping symbols that are linked to the folder icon if available: flags, text notes, photos and links to them in memory (their instances created from their classes).
   h. Information (flag) if Trim symbol shall display on or off (On/Off).
   i. Information (flag) about if the folder and the whole peripheral hierarchy of folder icons shall be shown as selected (shown graphically shown as front lifting through increased size and with shading) or not.

2. Each folder that has at least one subfolder (the child) gets a bounding (below and above referred to as "Delimitation Box" or "Box") indicating an own separate two-dimensional surface of the map.

3. In to the own surface Delimitation Box may no part of other Delimitation Box(es) from other folders, from parallel branches of folders enter. I.e. other siblings should not interfere in the Box if they have a Box in turn (i.e. have children). With this, no other folder symbols can trespass on a given Box after calculating the default coordinates.

4. Separation of folders to their boxes in order to not infringe on each other applies only to Delimitation Boxes associated folders with the same distance from the root folder in the x-coordinate (i.e. the same number of x-increment, of the same generation). Child folder Box(es) are enclosed in, and extend out, which increases the size of, its parents Box without infringing on the Box (and thereby cause recalculation of coordinates).
5. If a folder does not have its own Delimitation Box (i.e. no children) it will not be affected by other Delimitation Boxes and can be placed inside a Delimitation Box when coordinates are calculated without having to belong to the folders that generate the box.
6. Each box has a value indicating the Box height from the Box Folder's center and up to the roof of the Box folder (upper boundary). Each box also has a value indicating the depth from the middle of the folder to the lower box floor (lower boundary).
7. The Boxes boundary values are used to calculate the optimal relative coordinates between the folders in a branch that has Delimitation Boxes.

Process for Loading (Importing) Folders Under Plotting of Structure on the Two-Dimensional Surface for Calculation of Delimitation Boxes and Calculation of Relative Coordinates.

Calculation of coordinates to the folders occurs when importing tree structures of folders to the two-dimensional surface. This happens also when return to default values has been ordered, if the structure change is made by movement of folders (and any, pendent branches) on the surface, or by adding or creating new folder in the structure, contribution of tree branch or folders or deletion of folders in the underlying information system. That is, change in the structure with the help of the structure of the map or change in the underlying information system. Calculation of the relative coordinates can also be done by trimming (wrapping and unwrapping) of part of the tree structure of folders icons if you do not just use the saved default coordinates of folder icons in memory.

In the example below, we assume that root folder A is the only folder that is imported into the system. If there are already one or more other root folders so shall the distance to those in the y-direction be calculated with the Box Method in the same way as the distance between siblings folders in a tree structure.

When importing new tree structure, two different methods can be used, Either:

a) The Entire Structure is Loaded Directly,

Instances are created in memory and coordinates are then calculated through the "Arrangement to default coordinates". The whole structure emanating from the imported folder (root folder) is loaded under paragraph 1) to 3) below until instances for all occurring folders in the structure have been created without information about relative coordinates or Delimitation boxes. Thereafter the process is executed "Order to default coordinates" below for all folders in the imported structure. By applying this method, with calculation of relative coordinates after the creation of the "instances", then, you will not obtain intuitive successive plotting of tree structure at import as one obtains from the process below.

b) Gradual Calculation with Simultaneous Plotting.

The structure is loaded gradually, folder by folder, and relative coordinates are calculated for folder icons while instances for the symbols on the map are created in the memory. This gives a more beautiful and intuitive plotting, enabling the user to obtain a better understanding of what happens. Calculation of coordinates when importing tree structure is then made according to the following process:

Process for Successive Calculation During Import with Simultaneous Plotting

1. Folder A, which is the root to the tree branch to be imported, is first loaded. The root folder is the folder that is imported with its entire contents of subfolders. When A is imported it creates an instance in memory from the class folders. The instance for a folder is a systemized collection of data on a folder in the primary memory of the computer which, both when running and when the system is shut down, is saved to your computer's secondary memory. Each instance for a folder is created from the folder class and instances contain the same data fields arranged in the same way.

As stated in the rules above. The folder instance is saved in the computer memory, among other: logical address to the folder (path), name of the folder, relative calculated coordinates $\Delta x$ and $\Delta y$ or to the folder's parent folder, if such exist (the folder is then not root folder) or to the surface origin of the folder, if the folder is a root folder. Values for height and width of the box's own borders are saved, likewise a list of the folder's all child folders (links to instances of child folders in the memory), list of the all graphic notes of the folder: flags, text notes, pictures, and information about Trim On/Off.

2. When the folder (A) is a root folder it is provided with a Trim button. All folders in the Start column can have this control button in order to trim down (in) the whole structure.

3. The system examines whether the folder A has children, namely, if A contains folders. A list is compiled for the child folders. The list is saved in the instance for A. The list is arranged according some kind of sorting criteria, which can be e.g. alphabetic order, most content, most recently opened etc. Sorting criteria for sibling folders determines the order in which they are imported and in which (suitable) order they appear from top to bottom. They can be placed in alphabetical order, but also other criteria can be applied, e.g. by order of magnitude, so that the folder that contains the largest number of documents is found at the top.

4. The first folder in the list of child folders, B, is imported. An instance similar to A is created in the memory of the new folder B (i.e. data from point a to f, in point 1 of the "Rules of folders . . . " above).

5. Child Folder B's relative coordinates relative to the symbol of the parent folder A is now calculated and stored in the instance of B (point 1.d above). The first loaded child folder in list B can obtain the first same y-coordinate as the parent folder A, i.e. the difference in the y-coordinate is equal to zero, $\Delta y=0$. The X coordinate is increased by the predetermined default value $\Delta x$. $\Delta x$=the default distance in X-direction between the point of attachment for mapping symbols in the structure. See FIGS. 4, 5, 6 and 8.

The relative coordinate in the x-direction, $\Delta x$, from the leading edge of the parent folder to the forefront of child folder is always the same in the default mode, a fixed number of pixels or distances. However, this can be changed manually by the appraised value is added with offset coordinates if the folder is moved by drag-and-drop.

6. Parent folder A now has more than 0 child folders and the limits of the Delimitation Box enclosing folders are therefore calculated for A, and its prevalence in height and width in relation to A's attachment point is saved in the instance of A. This is called A's Delimitation Box. This is done for each folder if the folder has >0 child folders, that contains one or more folders.

The distance to the box's roof and floors can be given in relation to the parent folder's attachment point (at the middle of the folders short side if it is plotted as the shape proposed for the box). The distance to the ceiling and floor are at a child's folder, B, equal to the largest of values of the two folders height, A and B, divided by 2 added to the standard distance from the folder to the box edge, This distance gives folders "air" between the boxes and shows more clear, to which parent folder, a folder in the box's edge, belongs.

Figure 8:
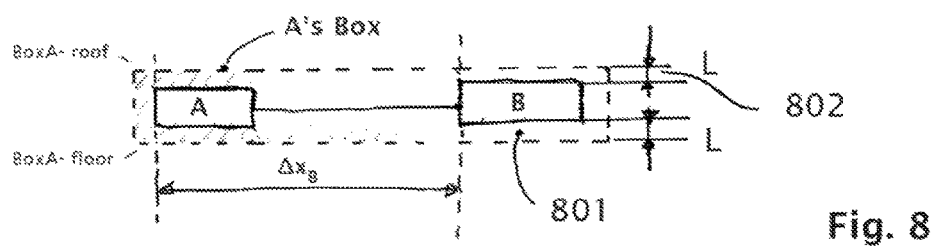
FIGS. 8-25C are schematic views of exemplary embodiments of the invention.

The standard distance, L, from a folder icon's top or bottom edge to the box's top or bottom can be set globally in the program and thereby provide an opportunity to adjust the vertical spacing between all the folder icons in the structure of the surface as a feature, see FIG. 8.

In FIG. 8 is 801 a forbidden space for a folder which is not child of A and included in a box. L, 802, is an arbitrary distance between the top edge of the folder and the box's ceiling added to make the structure transparent. In FIG. 8 is BoxA Roof=−BoxA Floor= (the greatest height of A and B)/2+L.

7. If the parent folder A had not been root folder, the system would check whether A has siblings who also have box i.e. at least one child folder. If that were the case then would the folder box parameters (the distances from folder A's fixing point (center height of the short side) and the box's ceiling and floor)) be compared by their relative coordinate relative to their common parent folder, increased in steps of 1 pixel or other minimum increment until Box A is no longer impinges on the sibling folder's Delimitating Box, see FIG. 9.

Figure 9:
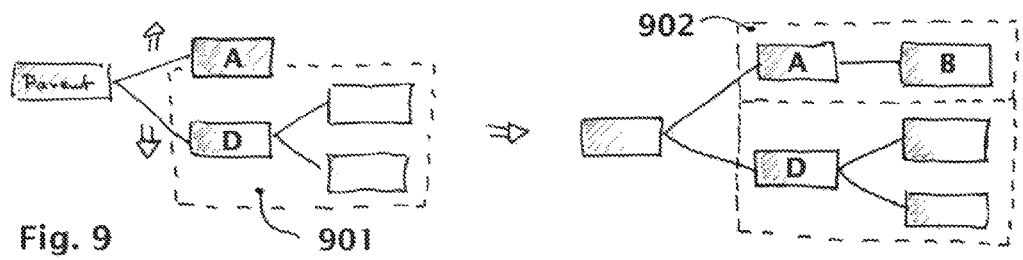

If the system in FIG. 9 has calculated D's box, 901, and find that sibling folder A has a child folder, B then begins the process of separating A from D until the folders are no longer overlap. The folder A's y-coordinate increases by 1 pixel alternately, with that folder D's y coordinate decreases by 1 pixel. This continues until the condition that A's box, 902 no longer impinges on D's box or vice versa.

If there had been one or several root folders above or below the root folder A so could the distances to those in the y-direction have been adjusted every time the Delimitation Box of A is recalculated. This recalculation is done every time a new folder is read into the tree structure, but it may not always impact on the size of the Delimitation Box for A.

8. The system examines whether the folder A has more child folders than B and reads in that case in the next from the list. Number two on the list, folder, C, is loaded into the same manner as in Point 4 above and creates an instance in memory for storage of folder symbol C's data in the same way as for folder A and B.

9. Now a re-calculation of the coordinates of B, while the coordinates of C are calculated. Relative coordinates for mapping the symbols B and C to the folder icon for parent folder A is calculated in the y-direction, the x-coordinate is not changed but will be the same for C as for B.

Two different ways to calculate the relative y-coordinates can be applied:

a. It does not account for the different folder symbols height. At two child folders, one sees to that the upper folder icon's lower edge is equidistant from the parent folder center in the y direction as the lower folder icon's upper edge. The Child Folders relative y-coordinate, Δy, is half of the folder icon's height+half the distance, k in the figure below, between the two child folders. The invisible Delimitation Box for the parent folder may then end up being higher or lower than its folder icon depending on the child folders that stretches out may be different in height.

b. It takes into account the different heights of the folder icons and makes sure that the uppermost folder Icon's highest point (ceiling) is as far from the parent folder A's fixing point in the y– direction as the bottom folder icon's lowest point (floor). See FIG. 15. With other words, the sum is calculated of the height of the symbols for the two child templates A and B and the distance between them. The centerline horizontally through the folder icon for the A (which passes through A's attachment point for the connecting line) shall be at the middle of this length. This length plus 2 times the Delimitation Box margins, the distance t, is equal to the height of the box A. This method yields a symmetric distribution of the Delimitation Box relative to its folder icon.

Figure 10:
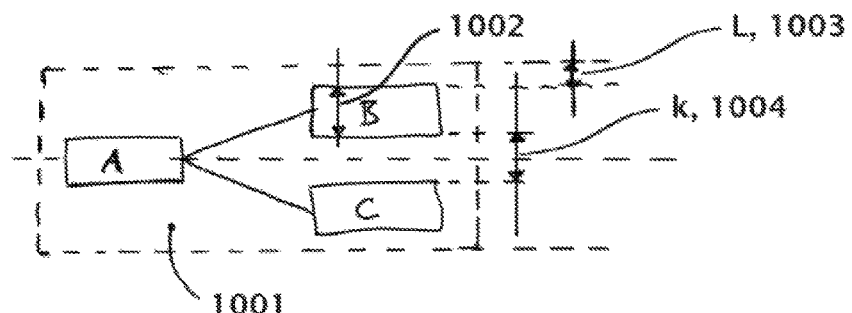

In FIG. 10, one can see the Delimitation Box for Folder icon A, 1001, when two child folders are loaded, B and C. L, 1003, is the distance between the box's ceiling and the top folder's top edge, k is the minimum distance between folders in the y– direction. The stretch 1002 is the height of the folder icon B.

When calculating child folders relative y-coordinates at this option, (or b, one takes into account the various height of the different folder icons and make sure the top folder icon uppermost point (roof) is as far from the parent folder A's fixing point in the y-direction as the folder icons lowermost bottom point (floor)), this is how the height of the parent folder's Delimitation Box is first calculated. This is done by summarizing: the heights of the two child folders (B and C in FIG. 10) with the distance, k, between folder icons with two times the edge distance L. Height of the Delimitation Box for A=Height of B+Height of C+k+2×L.

Then you can either calculate the y coordinate of each folder symbols mounting points from the top, bottom or one from each direction. Folder icon B's y-coordinate is calculated e.g. as half the height of the parent folder's Delimitation Box minus edge distance, I, minus half the folder icon B's height. Similarly, for the next child folder, C if the calculation is from the bottom, while if the calculation is made from the top (from the top edge of the bounding box) so shall the whole height of the folder symbol B and the entire distance between folder icons, k, and half the height of folder symbol C be subtracted from the height of the parent folders' Delimitation Box.

10. The new values for the height of parent folder, A's, Delimitation Box are now written into the instance of folder icon A in the memory. When the number of child folders to A has increased, the parent folder, it now has 2 child folders, B and C, and the limits of its Delimitation Box have been increased in the y direction. The values that are stored is the distance from the folder icon A's attachment point (the center for height, the center of the folder icon's left short side) and the Delimitation Box's ceilings and floors. The value is saved in the instance of folder A.
11. If now folder A would have had a parent folder, so would the relative coordinates of the folder symbol A be re-calculated if folder A's Delimitation Box has increased in size and its position in relation to possible siblings must be changed so that the Delimitation Box to A do not infringes upon the Delimitation Boxes of the Siblings. In addition would folder A's parental folder's Delimitation Box increase in size after the folder A's coordinates have been changed and depending on the area of A's Delimitation Box has increased, and so on.
12. When reading a new folder it will either be created a virtual Delimitation Box or so will an existing Delimitation Box widen. The Parent folder's relative coordinates are recalculated when taking into account the folder surrounding Delimitation Boxes. Thereafter will the calculation be moved one level inwards to the parent folder's parent folder, and so on. Calculations of the change of boxes and recalculation of relative coordinates are done gradually inwards all the way to the root folder.
13. Import of folders will now continue according to the list of child folders stored in the instance of the imported folder A until all the folders on the list is imported and positioned with estimated relative coordinates according to the Box Method (see paragraph 6 and 9 above), or until the import is interrupted by another reason. Such reasons may include import and the plotting method described in FIG. 11.

If the folder name has different lengths on the text strings so can folder icons be plotted with different heights, and mounting points will end up at different lengths (heights) from the parent folders' attachment point in the y-direction and calculation of relative coordinates can take into account the folder level.

Figure 11:
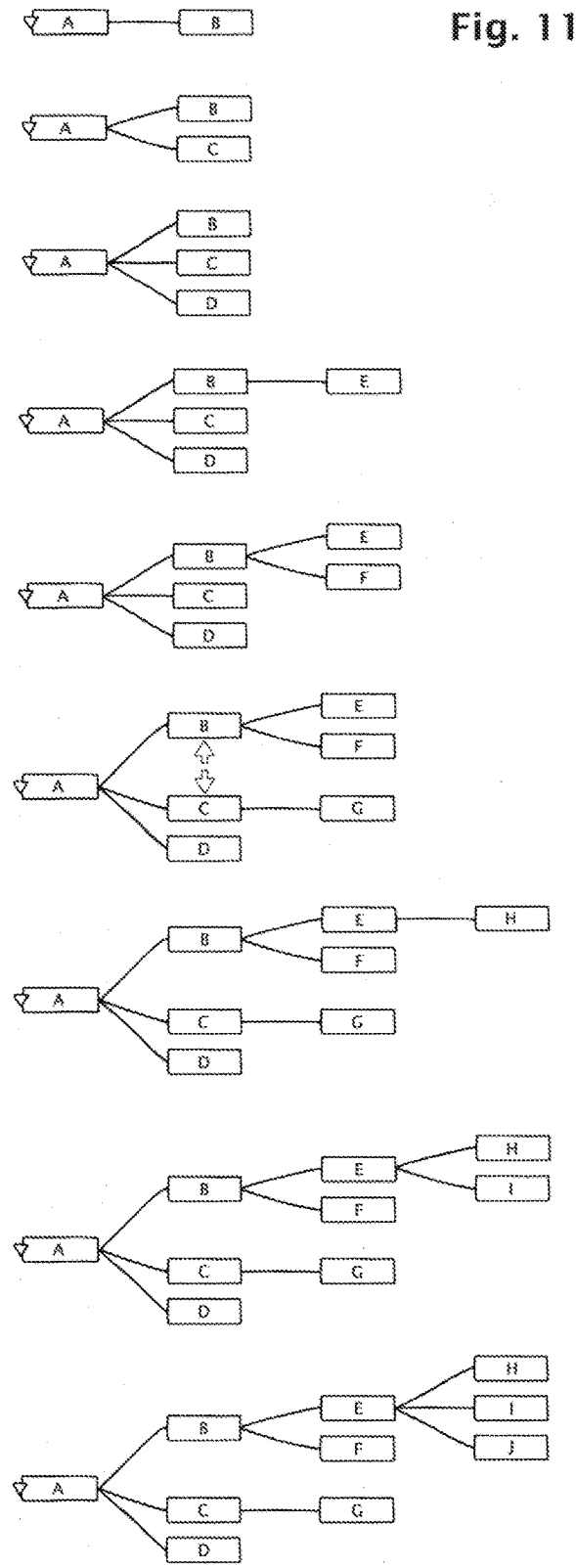

FIG. 11 is showing Example of relative coordinate calculations with the Box method when importing folders.

Rules of the Box method states that folder symbols B to C obtain relative coordinates to A so that the borders of their folder symbols are separated only by the minimum standard distance. These are not affected by the import of E and F since it is only the folder symbol B that gets this border Box.

When folders E and F are loaded into the structure as child folders to B's so is not affected B's position relative to its Parent Folder A because C and D have not yet received any child folders loaded and thereby not received Delimitation Boxes in their instances, in the memory.

When then C reads in child folder G a new box around C is shaped that allows the box around B, that push apart folders, B and C. Their relative estimated (default) y coordinates of their parent folder A changes accordingly.

Figure 12:
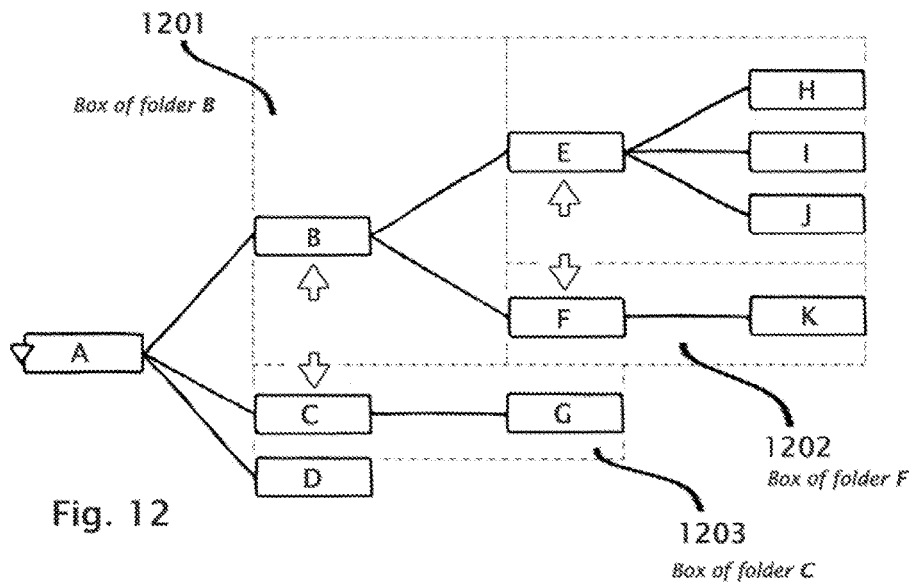
Figure 13:
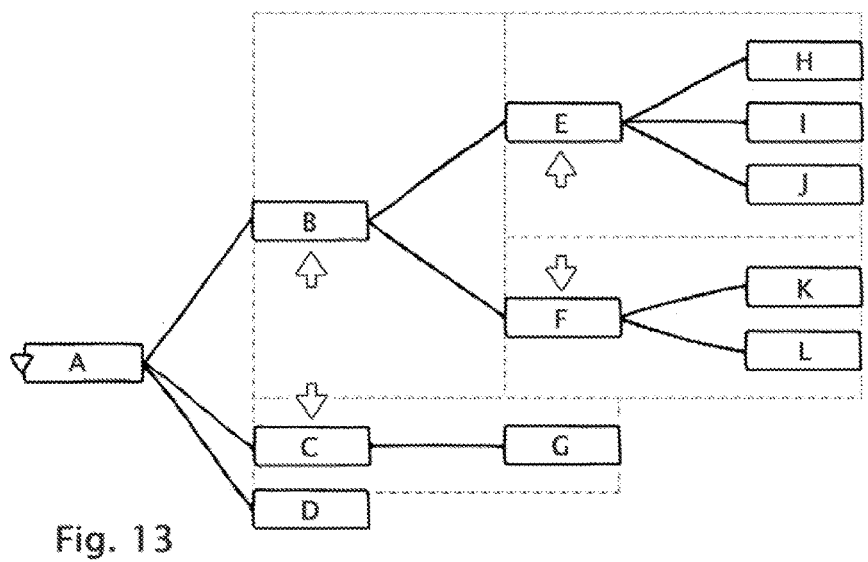

In FIG. 12 and FIG. 11 is shown increased separation of folders B and C is caused by increased borders of Box B, 1201, due to the new Box of folder F, 1202. Folder C is acquiring a Delimitation Box, 1203 because it has the child folder G. In FIG. 13 the new folder L is causing the Delimitation Box of F to increase in y-led. Increased separation of folders B and C caused by increased borders of Box B due to the increased borders of Box F when folder L is added, compare FIG. 11.

Figure 22:
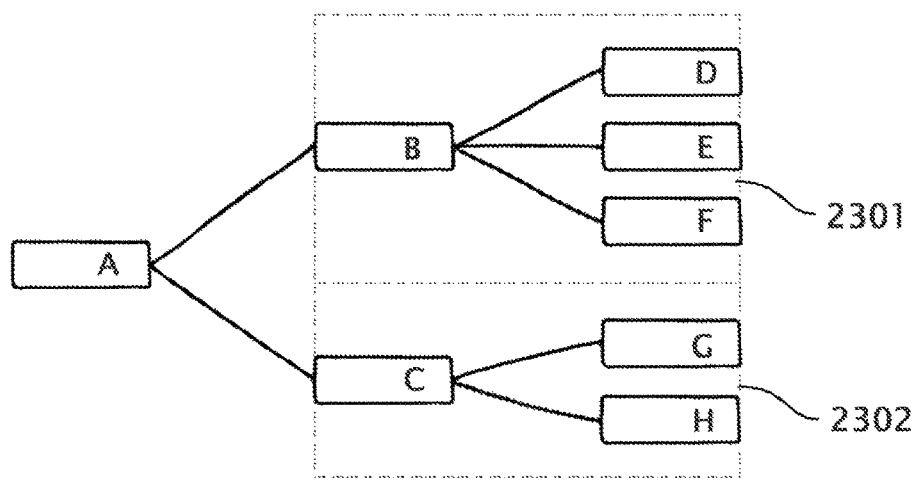
Figure 23A:
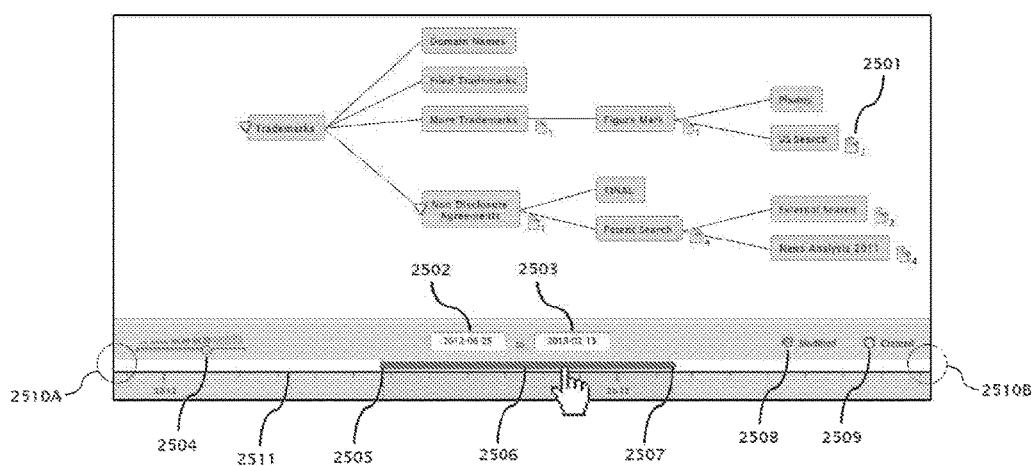
Figure 23B:
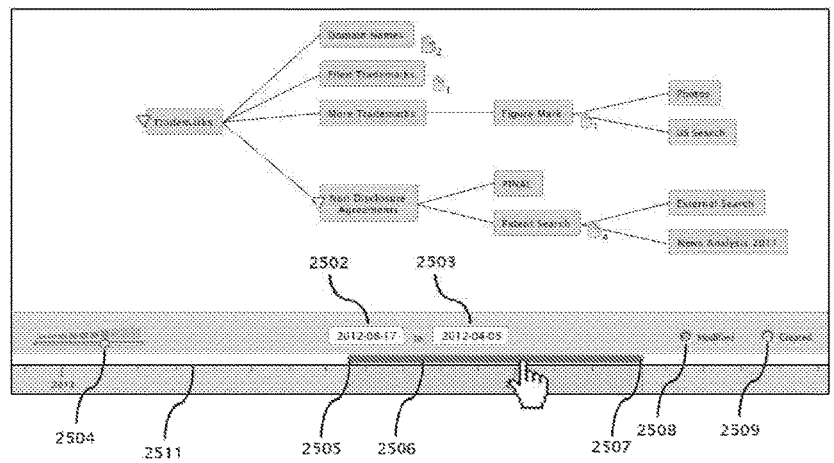
Figure 24A:
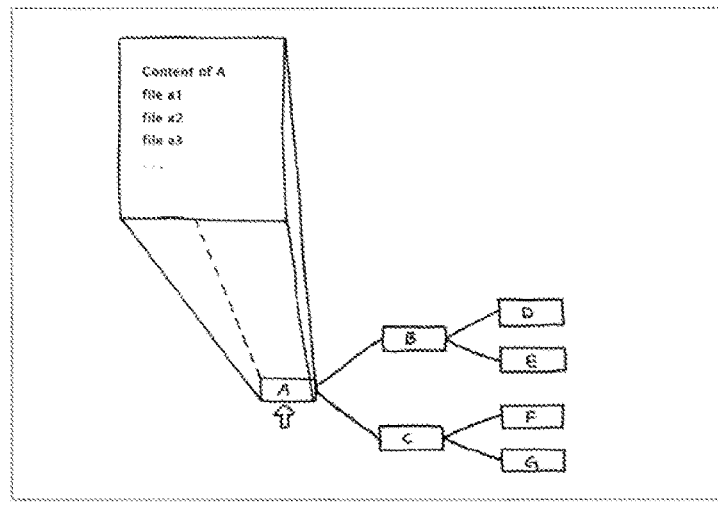
Figure 24B:
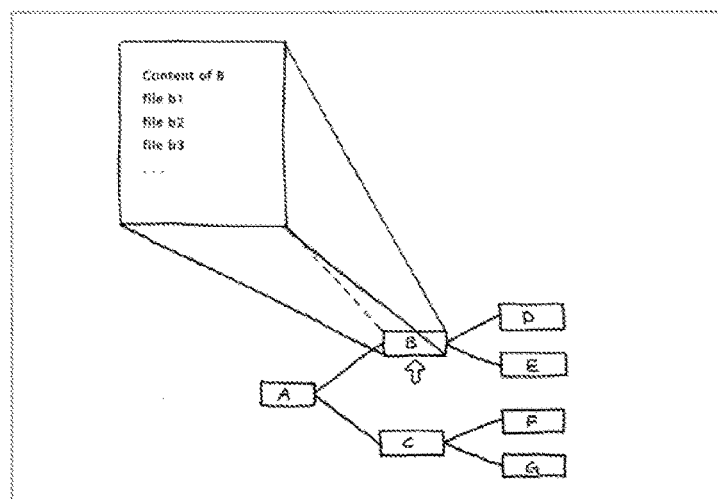
Figure 24C:
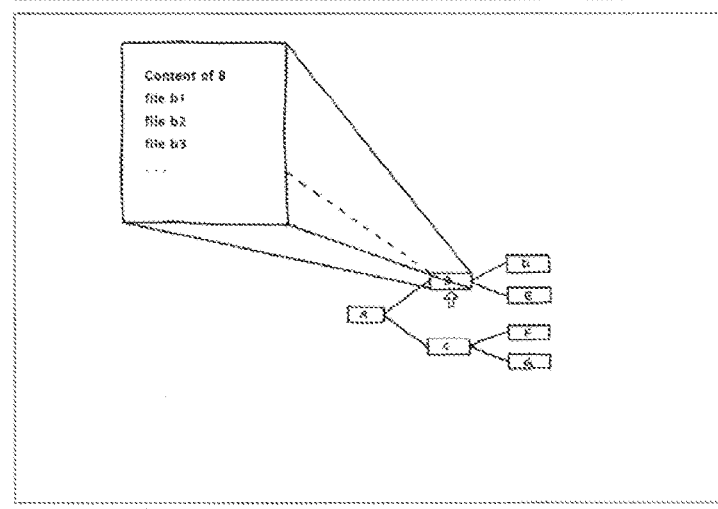
Figure 24D:
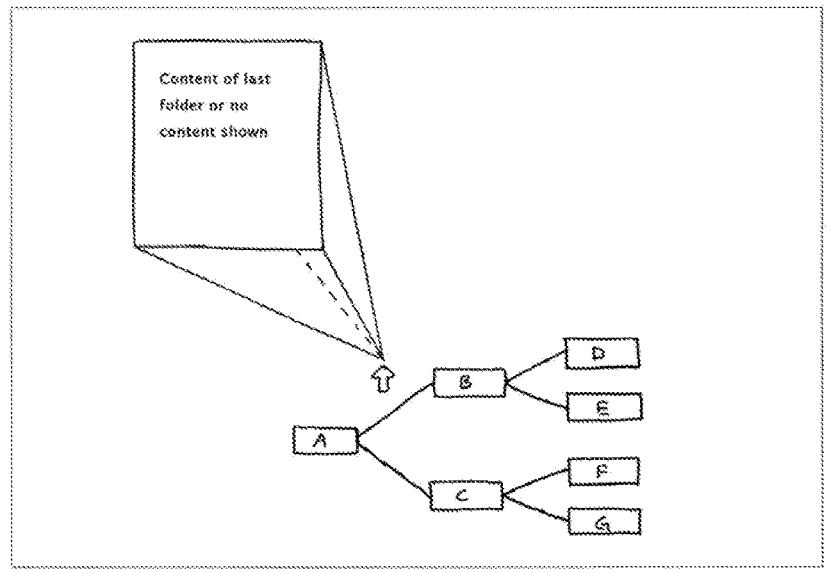
Figure 24E:
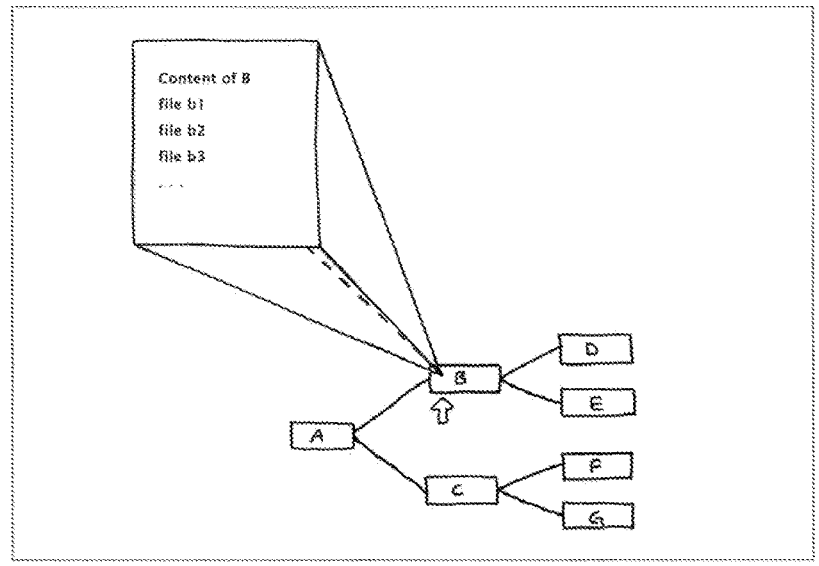

FIG. 22 shows how The Box Method can provide different distances in the y-direction (vertical) depending on the different affinities for parenteral folder Icons at the same level (same distance to the starting point of the folder icon) in the x-direction (horizontally). The distance between the folder symbol F and G are greater than between D, E and F, respectively, between the G and H above depending on the Delimitation Boxes 2301 and 2301 have a larger distance set between folder icon and edge of the Delimitation Box than between the folder icons. This increases transparency of folder icon' affinity and distinguishability in the structure.

The process for calculation of layout at import can be described as:

```
Method To Import Root Folders
MapFolder importRootFolder(MapRoot mapRoot, FileItem folderItem) {
    MapFolder rootFolder = importFolder(mapRoot, folderItem,
MapNode.DEFAULT_ROOT_POSITION, true);
    autoCompressNodeTree(rootFolder, true);
    return rootFolder;
}
Mehod To Import A Folder And Add It To A Parent.
MapFolder importFolder(MapNode parentNode, FileItem folderFile, ImPoint21 position,
boolean isRootFolder) {
    MapFolder folder = new MapFolder(parentNode.getMap( ), folderFile, position);
    parentNode.addChild(folder);
    layoutAllParents(parentNode);
    importChildren(folder, isRootFolder);
    return folder;
}
Method Which Gets The List of Child Folders of A Folder And Imports Them.
void importChildren(MapFolder folder, boolean isRootFolder) {
    List<File> childFolders = folder.getChildFolderFiles( );
    if (childFolders.isEmpty( ))
        return;
    sortFilesByTitle(childFolders);
    if (!isRootFolder && childFolders.size( ) >= COMPRESS_COUNT)
        folder.setCompressed( );
    else
        importChildrenOfFolder(folder, childFolders);
}
Method That Imports A List Of Children For Folder.
void importChildrenOfFolder(MapFolder parentFolder, List<File> childFolders) {
    for (File childFolderItem : childFolders)
        importFolder(parentFolder, childFolderItem, DEFAULT_POSITION, false);
}
Method To Compress A Strucure In Appropriate Places
```

```
void autoCompressNodeTree(MapNode node, boolean isRootFolder) {
    Visit All Children First
    for (MapNode child :
MapNodeFilter.filterCompressables(getNode( ).getChildrenList( )))
        autoCompressFolderTree(child, false);
    if (node.getBoundariesHeight( ) >= AUTO_COMPRESS_CHILDREN_HEIGHT)
        compressChildren(node);
    if (!isRootFolder && (node.getBoundariesHeight( ) >= AUTO_COMPRESS_HEIGHT
||
node.getChildCount( ) >= COMPRESS_COUNT) )
        compressNode(node);
}
```

Ordered Adjusting, Structure Back to Default Position

Figure 14:
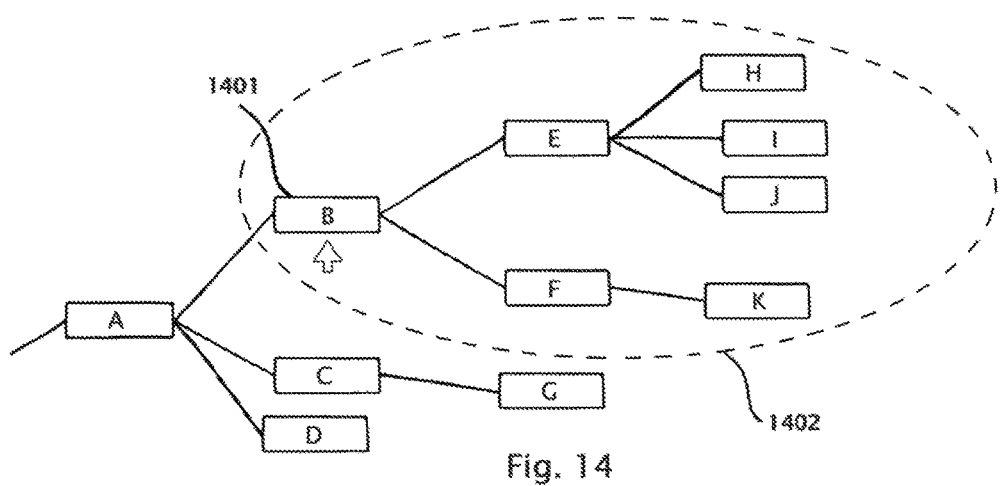

The system can be asked to adjust only a part of the tree structure, as shown in FIG. 14, where the part of the Folder structure is originating in 1401, Folder B. The method is recalculating the coordinates of E, F, H, I and J, or resetting their relative coordinates to Default coordinates by permanently deleting or temporary ignoring the manual offset coordinates.

Coordinates of the Folders C, D and G in FIG. 14 are not affected in this case and their respectively relative coordinates are not changed.

Adjustment of a tree branch to the default coordinates can be done from any folder in the structure that has other folders outside itself in the structure of folder symbols, namely, that the folder has them inside in the file structure. See FIG. 14. Adjustment of the entire imported structure can also be done through a global command. Alternatively, the stored offset coordinate for each folder is ignored and the relative coordinate for each folder becomes the original computed (during import) default coordinate. The offset component of the relative coordinates to the parent folder for each folder icon in the branch is ignored at plotting. Or the stored offset coordinate for each folder is ignored and the relative default coordinate is computed again. This may be appropriate if a change has been made of the structure of folders or by folder icons size (distribution) for example by the changing the name of the folder. The system can keep track of whether any such changing operation has occurred and applies in this case recalculation of the default component of the relative coordinate in addition to any offset coordinate ignored.

In this case, global adjustment, you can adjust the default coordinates take place from every root folder in the start column and then the program can adjust the distance between the root folders in the y-direction. The system searches through all the folders icons outward, away from the folder to obtain the default coordinates is done by only one branch, or from all root folders if adjustment shall be made of all parts of the structure (globally) to find the folder that is located in the most peripheral structure.

The folder furthest out of the tree structure and as such e.g. is the first in the alphabetical order of several folders at the same level at the end, is looked up first. When the folder has been localized data is saved about the folder in the memory (database) and the system runs a process to identify if this folder has any sibling folders. The siblings are e.g. arranged in alphabetically and whoever is first gets the highest coordinate in the y direction. The folders can also be arranged in other ways, such as by size, number of documents or after the date on which it was created. All of these sibling folders will per default be given the same coordinate in the x-direction.

Calculation of the Relative Coordinates on Return to Default Coordinates

Upon recalculation of changed coordinates back to the original positions, the default coordinates obtained during the import, so calculated either all folders in all structures on the surface, or so is only calculated one branch that is marked. We apply a process to "adjust all" or just "adjust branch" either the entire structure or just part of it.

First, the system reads through the list of the structures child folders in the instance for the selected folder to find the folder or folders that are farthest from the folder (root). If the structure extends from left to right in the map area, this is the folder that is furthest out to the right in terms of number of folders. Each folder contains information in its instance in the memory (database) about the child-folders the folder has. These are read in sequence, each child-folder's child folders is examined in the same way and so on. In this way, read all the folders in and a temporary database of all the folders is built up with their level of distance (number) from the root, their siblings and children. The path to the folder that is located at the tip and all of its siblings, the one who lies next furthest out and their siblings etc. is easy to read from the database.

The folder that comes first in the list of child folders, which lies farthest out, with the parent folder to these folders (depending on the given sorting criterion) is first given relative y-coordinate=parent folder y coordinate and relative x-coordinate=the default value n as above. Sorting criteria for sibling folders may be that they are deployed in alphabetical order default, but this can be changed, for example, to order of magnitude so that the folder that contains the largest number of documents found at the top.

The change of coordinates in the x-direction, the relative coordinate Δx, is always the same in the default location, from the leading edge of a parent folder to the forefront of child folders is always a fixed distance, i.e. number of pixels, or other units.

The height is stored to the parent folder of the box created by the distance between the top folder icon's upper edge and the lower folder's bottom, the folders that are furthest away from each other, plus the top and bottom margins. There will be a Delimitation Box that encloses the parent folder and all folder children. There is a fixed standard distance between the C folder and the box's edge and between the A folder and box's edge.

Furthest out on tree structure located child folders coordinates are calculated to the parent folder in an iteration one. When calculating the next level in, then calculations are made in the same way. The former parent folder now becomes child folder, or one of the child folders, and its parent folder can have many child folders which also in turn has child folders. In order for these children to not collide the child folders are calculated in iteration two and its height will be the sum of its child folders total height plus default distances between these folder icons plus a distance that is added so that the folders can not collide with each other.

When a parent folder here becomes child folder, so is the sum of its child folders total heights inclusive of the distance between them calculated and thereby we will be given height of the two-dimensional box.

In this way coordinates can be calculated for all folders at this level. Each folder's Delimitation Box prohibits infringement on another folder's Delimitation Box and the computational algorithm satisfies this condition.

If there is a trim button on one of the folders and if the folder is trimmed in, i.e. all folders in parent folders appear only inside that folder, then its height shall be the same as the folders height as calculated by the number of characters and number of rows in the same way as we described earlier. If the folder is trimmed out it is the Delimitation Box height with its entire child folder that will be displayed.

An exception is if a folder does not have any child folders. It then has no Delimitation Box, but the surface that the folder occupies dependent only on the text string which represents the folder name, and which determines the size it has.

Arrangement to Default Coordinates

Process for adjustment to optimal (default) coordinates for a portion of the tree structure of folders icons.
1. In each instance of the imported folders in the memory of your computer there is a list that describes the order of the hierarchy of subfolders in the folder.
    When adjusting to default coordinates so addresses the instance for the folder that the selected tree structure emanates from the program. The lists of all subfolders are retrieved from the instance.
    The list contains either:
    a) information on the folders located in the current folder and the folders located in these folders in turn (if there is such a/such) and so on. I.e. entire hierarchy of all folders. Or
    b) As an alternative, only the folders that are located on the first level outside the addressed folder, i.e. only those who lie directly in the folder addressed to adjustment the coordinates.
    First in the list are children to the original folder that the adjustment is based on, then their children and so on. The order of all folders in different levels shown in the list, the child folders located in the parent folder (which then are siblings) at any given level, and so on.
2. A process begins to search through lists of folders from the first folder (start folder) to the folder that is farthest from the start up folder (A in the figure below). This folder and its possible sibling folders have the longest logical address in the startup folder.
3. The process takes out the number of siblings at this level by reading the number of child folders in the registry for child folders in the instance of the parent folder. The process establishes a workflow, a work schedule with all levels outwards. Lists all folders on the outermost level, etc.
4. Level and name of the folder that is furthest out from the Startup folder, i.e. its distance in number of folders from the Startup folder for adjustment where the process begins to be temporarily stored for use by the calculation process.
5. If it is just a single folder that is located on the extreme level, i.e. only one folder furthest out, without siblings, so obtain this folder the same location in the y-direction as its parent folder, i.e. the relative y-coordinate equal to zero, $\Delta y=0$. Relative coordinate in x-direction is the default value, $\Delta x=1$, default distance.
5. If instead it is more folders located on the outermost level, i.e. several siblings, as calculated each map symbols relative y-coordinate according to the process below.
6. The Delimitation Box height is calculated for parent folder (to the outermost folder or folder). The Parent folder instance is updated with this value folder A of the example of FIG. 15. To calculate the Delimitation Box to the parent folder, the middle must be calculated for the total space as the symbols of sibling folders total take in the y direction (half height) when placed as close as possible with a specified standard distance between each folder in the y-direction. It is assumed that the folders have the same x-coordinate to the attachment points.
    Different kinds of symbols to depict a folder in the underlying information system can be used. Here is proposed rectangular boxes enclosing folder name, and whose size is given by the number of characters in the folder name. Different folder symbols acquire different height (y-axis), depending on, that the string folder name can contain a different number of characters and then wrap shift wrap occurs at the specified number of characters sometimes obtain different folder icons different number of character strings. This is a desirable effect because it gives the folder icons different looks. Especially if the proposed shape for the folder icon i used where the icon has the shape of a rectangle with the folder's name written inside. If this shape is used to facilitate various propagation in both the x- and y-directions, recognition and navigation in the structure of the folder icons on the two-dimensional surface.
    The sum of the height of all the folder icons and the sum of the standard spacing between folder icons shall be calculated. This sum, together with upper and lower standard distance between the uppermost and lowermost sibling folder and Delimitation Box represents the parent folders total Delimitation Box, see FIG. 2.x below. The value of a folder Delimitation Box (height) is stored in the folder instance in computer memory.
    The process then proceeds inward toward the root folder to the folder where the order of adjustment to the default coordinates has been made or until the root folder if all the folders in the tree must be adjusted. This is done until all folders have been calculated and all the folders boxes have been calculated with their (boxes) parameters.

The Process for Calculating the Relative y-Coordinate Between a Folder and its Parent Folder 1) The process calculates the relative y-coordinate, $\Delta y$, for the top of the sibling folders then works down the list. However, deviations can be made from this descriptive starting with the folder symbol anywhere in the list; Listing of child folders in the instance of parent folder.

One formula for calculating the relative y-coordinate within the box for the folder is:

Box A has the height ("Box height of parent folder" below)=sum of all folder icons heights plus the sum of all distances (standard distance s below) between folders plus the two edge distances (upper and lower distance t) from the upper and lower folder over—and the underside of the Delimitation Box's edge. The two distances s and t is set to values such that the distribution of the folder icons in the structure becomes clear.

Δy folder (the present one)=
(Box height of parent folder/2)
(Box surrounding distance t, the standard distance between the last folder edge and the Box edge)
(The sum of the heights of all the folders above the present folder. If no folder=0)
(The sum of all the standard distances between folders, s, from the first (top) folder in the list to the present one)
(Height of the present folder/2).

Figure 15:
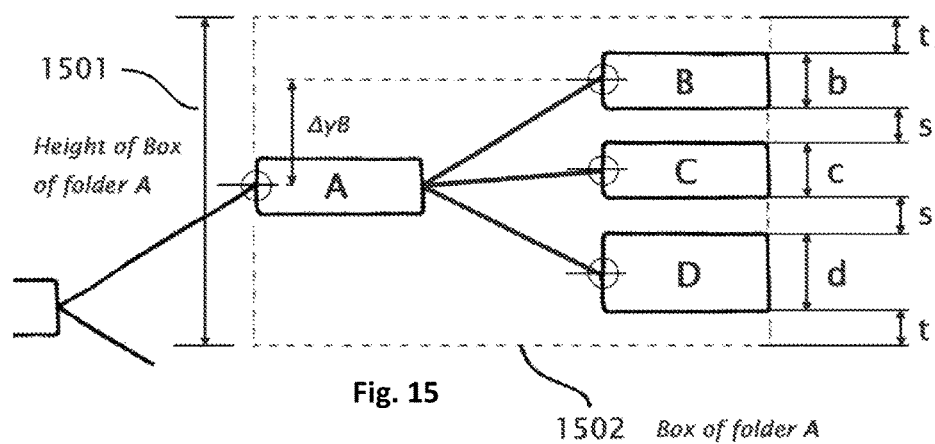

In FIG. 15 is exemplified calculation of Delimitation Box to the folder symbol A. 1501 Height of Delimitation box of folder symbol A is shown as 1502 in FIG. 15.

Relative (default) coordinate of folder B, $\Delta y_B =$
(Height of Box $A/2$)$-t-(b/2)$ Relative (default) coordinate of folder C, $\Delta y_C =$
(Height of Box $A/2$)$-t-b-s-(c/2)$ Relative (default) coordinate of folder D, $\Delta y_D =$
(Height of Box $A/2$)$-t-b-s-c-s-(d/2)$ Where b=height of folder B, c=height of folder C, d=height of folder D, etc. as shown in FIG. 15.

2) The process checks if there is any more siblings folder at this level (the farthest out) from the startup folder and calculates the coordinates of all the siblings of the list down.

3) The process then moves one level inward, when all siblings folders at the farthest level has been calculated, and the parameters (height) of the box to the folder icon A has been calculated. In the next level, the former parent folder is now child folder and when repeating the next calculation of the coordinates and it calculates the folder A (in the example above) as Delimitation Box A (height=Delimitation Box height in the instance of A in memory).

The process of calculation of the layout can be described as:

```
Method To Layout Parents
void layoutAllParents(MapNode parent) {
    for (MapNode p = parent; p != null; p = p.getParent( ))
        layoutChildrenOf(p);
}
Method To Layout All Decendants of Parent
void layoutAllChildren(MapNode parent) {
    for (MapNode child : parent.getChildrenCopy( ))
        layoutAllChildren(child);
    layoutChildrenOf(parent);
}
Method To Layout Of Children of Parent Vertically From Top To Bottom
void layoutChildrenOf(MapNode parent) {
    int bottomY = 0;
    int nextY = 0;
    int nextBoundariesY = 0;
    boolean hasNextBoundsY = false;
    for (MapNode child : parent.getChildren( )) {
        Calculate delta to align horizontally
        and add to position and to boundaries too.
        int deltaX = child.getAlignedPositionX( )- child.getPositionX( );
            child.setPositionX(child.getPositionX( ) + deltaX);
        Calculate delta to layout child to next position
        and add to position and to boundaries too.
        int deltaY = nextY - child.getPositionY( );
        child.setPositionY(child.getPositionY( ) + deltaY);
            updateBoundaries(child);
        if (child.isExpanded( )) {
            Check if layout position y is colliding with next boundaries y
            if (hasNextBoundsY && child.getBoundariesY( ) < nextBoundariesY) {
                Calculate delta to layout child boundaries to next boundaries position
                and add to position and to boundaries too.
                deltaY = nextBoundariesY - child.getBoundariesY( );
                child.setPositionY(child.getPositionY( ) + deltaY);
                updateBoundaries(child);
            }
            Calculate next boundaries top position y.
            nextBoundariesY = child.getBoundariesY( ) + child.getBoundariesHeight( ) + EXPANDED_MARGIN;
            hasNextBoundsY = true;
        }
        Calculate next top position y.
        bottomY = child.getPositionY( ) + child.getHeight( );
        nextY = bottomY + MARGIN;
    }
    Center Children To Parents
    int centerDeltaY = (parent.getHeight( ) - bottomY) / 2;
    for (MapNode child : parent.getChildren( )) {
        child.setPosiitonY(child.getPositionY( ) + centerDeltaY);
        updateBoundaries(child);
    }
    Update Boundaries of node and all parents
    updateAllParentBoundaries(node);
}
Method To Update All Parent Boundaries
void updateAllParentBoundaries(MapNode parent) {
    for (MapNode p = parent; p != null; p = p.getParent( ))
        updateBoundaries(p);
}
```

```
Method To Update Node Boundaries
void updateBoundaries(MapNode node) {
   node.setBoundaries(computeBoundaries(node));
}
Method To Compute Boundaries of Node
Rectangle computePositionBoundaries(MapNode node) {
   Rectangle nodeBoundaries = node.getPositionRectangle( );
   Check if node is compressed and if so return it own boundaries only
   if (node.isCompressed)
      return nodeBoundaries;
   Iterate through all children and union thier boundaries with node boundaries
   for (MapNode child : node.getChildren( )) {
      Rectangle childBoundaries = child.getPositionBoundaries( );
      Add position to child boundaries to get child boundaries relative node instead of
child
      childBoundaries.x += node.position.x;
      childBoundaries.y += node.position.y;
      Union boundaries to get child boundaroes included into node boundaries
      nodeBoundaries = union(nodeBoundaries, childBoundaries);
   }
   return nodeBoundaries;
}
```

4) Trim, an Automatically or Manually Applied Function for Minimizing the Part of the Map Trim represents a beneficial solution to automatically or manually depending on demand reducing down part of the folder structure, retract, (i.e. hide a coherent subset of folders, thus reducing its surface) the purpose is to increase overviewing of folder structures. The bottom-reduced (retracted) part of the folder structure is always based on a folder that has other folders inside it (and thus the folder symbols plotted outside its own folder icon). These folder symbols that are plotted outside the folder are merged into this folder symbol. That a part of the structure of the folders are nested inside this folder is displayed through an opening symbol in the folder's front (open/close button). The system with manual offset coordinates and estimated default coordinates makes it possible to maintain the appearance of the rest of the structure to facilitate recognition and navigation.

This is advantageous, because, when many folders are loaded the structure covered map surface may become unmanageably large and difficult to survey. It may need to be packed into smaller parts that can be opened when needed. Still every part need to remain unchanged when it is opened so that the recognition of the map is retained. When wrapping the structure to a folder, the trimmed folder, a recalculation of surrounding folders relative coordinates is preferred. Upon return, i.e. re-opening/expansion of the structure, the map may appear to be flawed if any folder relative coordinate has been changed manually before wrapping of the structure. This manual change needs to be transferred to the folder/folders relative coordinates to ensure that the map returns to the same appearance as before the trimming.

It is desirable and beneficial to display all folders in a large amount of folders in a clear manner, yet still be able to demarcate areas for maintaining recognizability in the structure, so that you feel at home and find your way around the structure in an easy way. Trimming of the structure shall be available:
1. manually, as needed, for example if a part of the structure is currently unimportant, but you also want it to occur
2. automatically, e.g. when you import a folder structure to the system so that the map becomes more manageable.

An embodiment of the invention is that when loading a folder's children in the structure, the folder can be displayed trimmed if the outlier tree structure covers a very large area of the desktop or contains many subfolders. When trimming a folder all folders (outside the folder that is trimmed) are trimmed into the trimmed folder. This is illustrated by the folders being moved in an animation toward the trimmed folder while they simultaneously fade away. All relative coordinates remains with the database for the folders, though they are no longer visible on the map and the parts of the tree structure that can be found around the portion of the tree trimmed folder can share the free surface. The trimmed folder indicates that it is trimmed, and the ability to untrim it again by an out/in (on/off) button. Nothing is changed in the database when the button (trim/untrim button) is pressed except in parent folder where the trim-parameter is set from trim-off to trim-on, or vice versa, and thus enable the process that moves in or out (animates) all folders to the parent folder.

When a branch (the subset of the structure to be concealed) has been trimmed, i.e. disappeared from the map a realignment of the adjacent parts of the tree will fill the space where the trimmed tree branch previously existed. This whole area would otherwise be empty. Trimming subsets of the tree structure (fine trimming) is done to save space and increase clarity. Readjustment of the coordinates of the surrounding branches in the folder structure can conveniently be done from the finely trimmed folder (the one provided with the Trim button) parent map. Realignment occurs with the Box method previously described. In the settings panel it is possible to choose another level of realignment, e.g. closer to (or further from the trimmed folder). This function with automatic wrapping (trimming) during scanning has not previously been demonstrated or patented. The dual set of relative coordinates, for calculated default position as well as possibility to manually change the offset position, is absolutely necessary. Without this, the tree structures surrounding would be changed to the default coordinates at trimming/untrimming of a branch. To enable the surrounding tree structure to reduce the total surface it covers a re-computation is made of the surrounding tree structure from the root.

When a new computation is run to the default coordinates, the wrapped tree structure is treated only as a folder, i.e. the folder that contains the trimmed branches of the tree structure (and received the button for untrimning again). This recalculation to default coordinates is done with the Box method and does not include any manually changes to the offset coordinates. By sharing coordinates in this way it is possible to manually make adjustments to the appearance of the tree structure be preserved at trimming and untrimming of parts of the tree and recognition is thus preserved. This would not have been possible if only one coordinate pair per folder icon would have pointed to the previous (parent) folder.

Simultaneous Trimming with Animation and Readjustment of the Surrounding Parts of the Directory Structure Readjustment (Adjustment) of the tree structure is carried out automatically when the branch is trimmed and trimming is simultaneously animated while migration of folders to the trimmed folder (the one with the button) is simultaneously animated. This provides a natural understanding of what happens in the process, see FIG. 16A to 16G.

The function "Trim" can retract and expand tree structure of data containers or folders while adjusting the folder structure so as to save space on the surface.

In FIG. 16A Relative Coordinates of surrounding Folders (Data Containers) are adjusting when the tree structure of folders, 1602, is retracted (hidden) by the Trim operation. The Trim button, 1601, is in the Open position and the tree structure outside the folder "Drafts" are not retracted. The areas of the tree structure of folders that can be retracted and expanded by the Trim button are all the folders in the tree structure, 1602, outside of the Folder "Drafts".

In FIG. 16B is shown an example on how the relative coordinates of surrounding Folders can be adjusting when the branch i.e. tree structure of Folders of the Folder "Drafts" is retracted by the Trim operation. An Integer, 1603, can be indicating the number of Folders in "Drafts" when the structure is retracted. The Trim button, 1604, is then in the closed position in FIG. 16B. In FIG. 16C are shown how the opening, expansion, of the tree structure 1602 the Box of the folder "Drafts" are pushing the Box of the folder "Avtal" away so that the Boxes are not colliding. The separation is made with the Box method. This means that the folders "Avtal" and the folder "Drafts" are separated vertically (along the y-axis) and that the folder "Mallar" and the folder "Description of Innovation" are not intersecting. The Box of the folder "Avtal", 1605, and the Box of the folder "Drafts", 1606, is separated horizontally (along the y-axis). The Trim button, 1607, can to allow the structure of folders outside of "Drafts" to be retracted. If this is done the Folder "Drafts", 1608, in FIG. 16D is now to be regarded as without child folders and can now be placed inside the boundaries of the Box of folder "Avtal", 1605. When the tree structure of folders outside of "Drafts" is retracted, Trimmed in, the Box of the folder, 1606, is gone. The Box of a Trimmed folder, like "Drafts" 1608 are removed from calculations when the layout are changed and the relative coordinates of the folders "Avtal", "Drafts" and "Installation" to their parent folder "Newton Product" are recalculated to make the structure more compact. The Box of the folder "NewtonProduct" are also becoming smaller having an effect on the total tree structure, not shown in the FIG. 16D.

When retracting the tree structure with Trim, 1607, the Box of <<Drafts>> diaper in the calculation and the structure can be drawn more compact. The process will be reversed when the Trim button, 1607, once again is activated (this time to expand the structure).

Figure 16E:
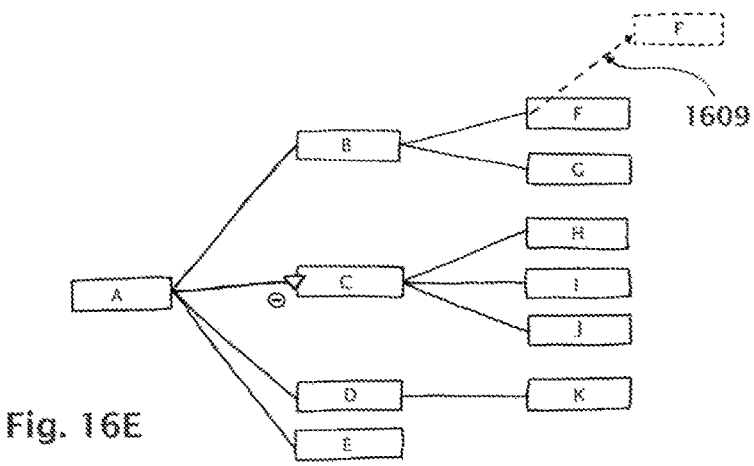
Figure 16F:
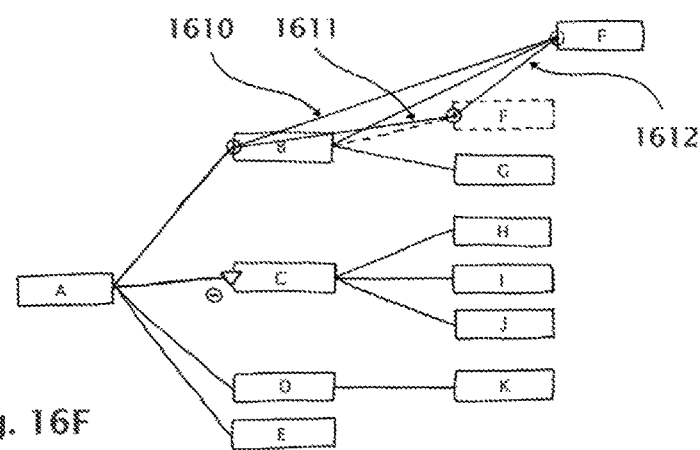
Figure 16G:
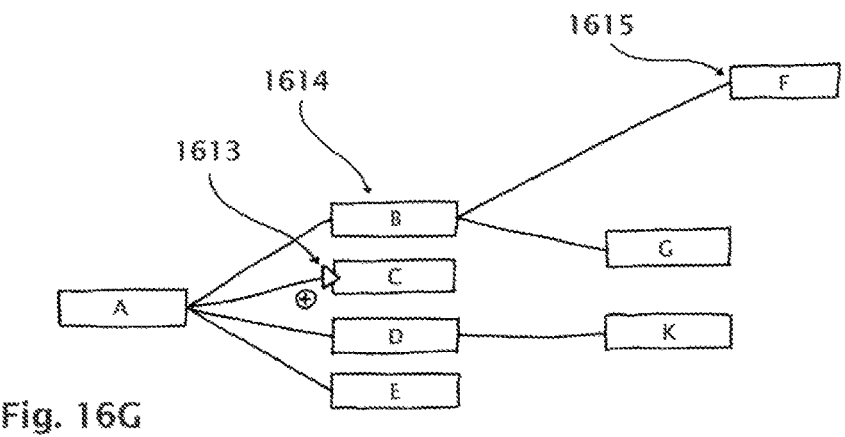

FIG. 16E to 16G show how offset coordinates are preserved when Folders in a tree structure are retraced by the Trim operation. The Folder symbol F is moved by drag and drop, 1609, to the new position. The Offset Coordinates written to the instance of F in memory and are stored. The offset coordinates for mapping the symbol "F" relative to its parent folder 'B', 1610, is the sum of the relative default coordinates, 1611 and relative offset coordinates, 1612.

In FIG. 16G the tree structure of the folder symbols H, I and J, is retracted into the folder C. The child folder symbols of folder "A" then obtain new relative coordinates (the folder icon "A") by recalculation, B, C, D and E's relative coordinates (the default coordinates) without any box around folder symbol C considered in FIG. 16G. When C's folder structure (H, I and J) are packed into the folder C, all Folders relative coordinates that are outside the folder A are recalculated (parent folder) with the premise that folder symbols H, I and J are not there. This recalculation may only apply relative default coordinates, not relative offset coordinates. Folder symbol F is has been manually moved by drag-and-drop, 1609, and its offset coordinates, 1612, does not change the recalculation after retracting the structure in C.

Figure 17:
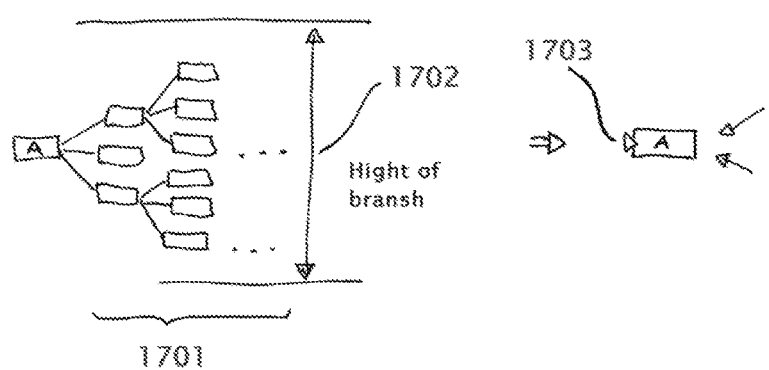

The Conditions for automatic appliance of retraction of a tree structure with the Trim function is described in FIG. 17. The condition for automatic retraction and creation of Trim button could be that the Number of folders in the branch in over a pre sett number, N, 1701, or that the Height of the tree structure on the surface, 1702, is higher than a preset value as shown in the FIG. 17. When a part of the tree structure has been retracted according to this set of conditions, a button 1703 for opening the retracted part of the tree structure can appear. If the button is pushed the tree structure are once again expanded and so on.

Figure 18A:
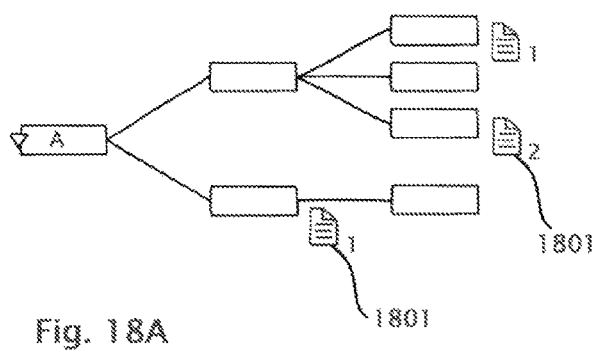
Figure 18B:
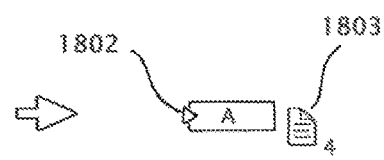

Movement of search hits when retracting a folder structure is shown in FIGS. 18A and 18B. In the folder structure originating from folder "A", 1802, four search hits are found by the search engine and indicated in the structure, 1801.

In 3 of the folders in the tree structure outside of folder A contains 4 search hits, as can be seen by the search hit symbols in the structure 1801. The number by the symbol of a search hit (document symbol) indicates the number of found documents in that folder When the structure of folder symbols are retracted in to the one folder symbol "A", 1802, (with the Trim button) the search hit symbol are moved to this folder and the number by the symbol indicates the number of hits in the retracted structure of folders in total. In the case of FIG. 18B the number 4 by the search hit symbol, 1803, is the sum of 1+1+2. The Trim Button symbol, 1802, indicates that the structure can be expanded (Opened). The process of summarizing and moving the Search Hits indicator can be reversed. When the button is pressed and the structure is expanded again the symbols are again moved to the positions of FIG. 18A.

Automatic Retraction (in-Trimming)

Three parameters are preferably used to determine if an actual part of the tree should automatically retract during the process of folder structures being imported into the system and plotted on the map:

1) Folders for retraction are allocated outside inwards towards the root. When a folder meets one of two conditions 2 and 3 below its folder structure is retracted down into the trimmed folder that gets an open/close button. The folders tree structure is not included in the continued calculation of the next folder for trim (the tree structure disappears and the whole structure is rearranged with Box method described above.
2) If one folder contains more than one adjustable, predetermined number, subfolders, x (child folders) or, 3) If the number of pixels in height overall, for the extrinsic tree structure exceeds the height y pixels (calculated with the Box method), then the folders are displayed with a trim switch and all its outlying tree structure is retracted.

When a folder meets the above criteria and shall retract its outlier tree structure the plotting of the folders to be retracted is interrupted, and the system recalculates the structure's appearance on the basis that the entire retracted structure can only be displayed as one folder (displayed with a trim-key) in the calculation of the new coordinates with the Box method. When recalculating the positions of the adjacent siblings of the retracting folder is processed there is no need for recalculation of these sibling-folders children also. It is sufficient for the branch's delimitation surface, folders highest and lowest (the outermost box) of each sibling folder to be calculated. In this way manual changes in the sibling-folders folder structures are preserved so that their appearance is not altered by the retraction.

Thus, folders that are outside the retracted folder are not plotted on the map. The relevant folder will instead have a button control that when activated, draws out all the sub-folders and their children again, i.e. the entire outside of the folder lying tree structure again becomes visible and active for clicking. When a tree structure of folders is retracted into a parent-folder in this way, and the search function is applied, see below, results are indicated by a number which represents the sum of the total number of hits in the retracted folder structure, outside of its parent folder, see FIGS. 18A and 18B.

Saving Coordinates from Manually Changing the Folders Location for Unwinding after Tuning to its Original Appearance. Application of the Two Different Relative Coordinates, Manually Set and Default Calculated.

If any of the retracted folders folder icons relative coordinates have been manually changed they can be kept during the trimming process. In the instance of each folder object there is a special storage area for manually changed coordinates, offset coordinates. These are not affected when calculating relative coordinates when retracting and/or expanding the tree structure. Similarly, manual changes of relative coordinates of the previous folders, parents, are conserved because also their positions need to be recalculated to retract. Relative coordinates of the folders that are trimmed into the retracting folder does not change when there is no coordinate calculation process is applied to these folders, they only discontinue to appear on the map surface.

Viewing the Content Window

When viewing the retracted folders contents in the content window, ContentView, to the right of the program window, the entire structure of retracted folders is displayed. Here there is no need to show the structure retracted to save surface, instead the structure is fully displayed.

Fixation of the Folder Icon (the Folder that Contains the Tree Structure) and the Trim Button in Relation to the Program Window. The Folder that Retracts its Tree Structure by the Trim Process Remain in the Same Position on the Screen (the Program Window) During the Retraction or Expansion Process.

The folder in which the tree structure is retracted, and the trim button located in the folder forefront, shall be fixed in position relative to the program window to enable an easily understandable display of the retraction process and the user experience will be more pleasant. To accomplish this it requires the plotting systems coordinates (canvas) to compensate for the position changes occurring as the relative coordinates of the surrounding folders are altered. When the tree structures folder icons are retracted into the parent folder their boxes disappears in the calculation with the box method of relative default coordinates to the surrounding parts of the folder structure. This makes the surface of the entire structure of folder icons change, it increases when expanding and reduces when retracting. Therefore, compensation calculations of the entire surface coordinates occurs in order to keep the retracting folder and trim button fixed relative to the program window (fixed on the screen and the window is not moved).

The method for retraction of tree structures is best described as:

```
Method To Compress Children of Node
void compressChildren(MapNode node) {
    for (MapNode child : node.getChildren(node))
        compressNode(child);
}
Method To Expand Children of Node
void expandChildren(MapNode node) {
    for (MapNode child : node.getChildren(node))
        expandNode(child);
}
Method To Pack A Folder Branch
void compressNode(MapNode node) {
    if (node.isExpanded()) {
        node.setCompressed();
        for (MapNode child : node.getChildren())
            child.setVisibe(false);
        node.updateBoundaries();
        updateAllParentBoundaries(node);
        layoutAllParents(node);
    }
}
Metod To Unpack A Folder Branch
void expandNode(MapNode node) {
    if (node.isCompressed) {
        setExpanded(animated, node);
        for (MapNode child : node.getChildren(node))
            child.setVisible(true);
        updateAllParentBoundaries(node);
        layoutAllParents(node);
    }
}
```

5. Changing the Direction of the Connection Line Between Folder Symbols and Thus Change of Direction for the Hierarchical Direction of Propagation of the Folder Structure When the hierarchical distribution of folders shall be displayed on a flat surface this can be done by connecting lines and the indication of a direction for the order of folder symbols. The direction given to a folder that is located in another folder, always have an intimate connection line. While a folder that contains multiple folders connect to those folders with multiple outgoing lines. The direction of a folder that has only one input line is always the inbound direction. The user understands the extent of the tree even if the propagation direction is changed, such as from being from left to right to be top-down in the same tree structure. The hierarchy of folders is still unchanged, but the propagation direction can be changed.

It may be desirable and advantageous to change the direction of a part of the tree such that it goes from being last year right (left to right) to be propelled down (top to bottom) or displayed to the left (right-to-left). This is sometimes very useful for instance because it may clarify certain structures, for example, to show organizational structures.

Figure 19:
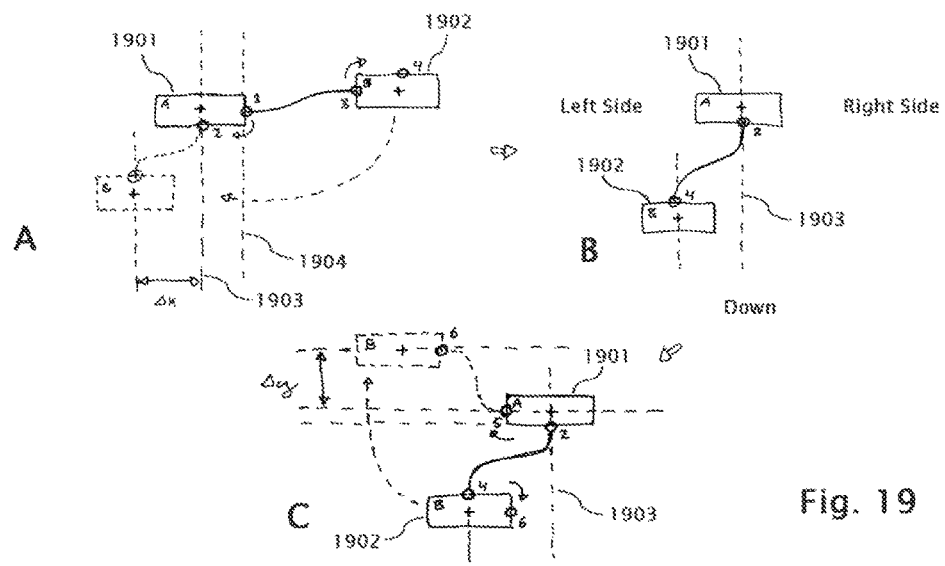
Figure 20:
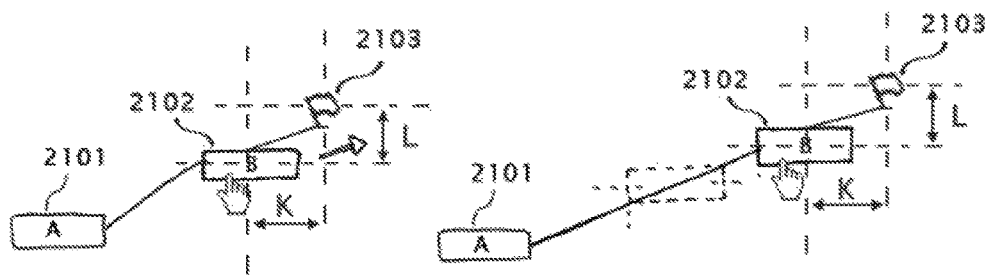

One embodiment of the invention includes displaying the hierarchical structure by using the lines are constructed so that the lines may have different attachment points to the folder icons when outlier folders are moved around the parent folder. The interconnecting lines are based on a normal vector from one or more of the folder icons four separator borders. The conditions are such that the parent-folders middle point coordinate is calculated (middle of the folder) and the middle point coordinate for the child folder that is moved is calculated. When the child folder has been moved from one of the parent-folders borders and on any of the parent-folders sides passes so far that the child-folder middle point passes the parent-folders middle point then the attachment points are changed for the function that calculates the interconnecting line between the folders. Attachment point for lines is always centered on the folders sides, one or more of the folder symbols four sides. A function calculates and draws the line between the points. Arguments to the function are the coordinates of the point and the start and end vector (a direction vector perpendicular to the folder symbols edge), when the folder 1902 in FIG. 19 is moved by Drag-and-Drop to an of-set position around folder 1901 on the Digital Boundary. When passing of the midline, 1903 in FIG. 19, of the folder 1901, or when passing the edge of the folder symbol, line 1904, the attachment point of the connecting line between the folders 1901 and 1902, can be made to be redrawn according to FIG. 19. In this way the attachment points of the connecting lines can be made to move around the folder symbols.

In FIG. 19, the attachment point moves so that the line goes from 1 to 2 on the folder A with the movement of folder B to the left. The line changes the attachment point when the center of folder B passes the center of folder A or when folder B passes the edge of folder A, line 1904 in FIG. 19. Same end of the line moves from point 2 to point 5 on folder A when folder B is moved further to the left and past the center of A in height. Similarly, replacing the other end of the line moves the attachment points at the edges of the folder B, from point 3 to 4 and so on, see Figure X above.

6. Create New and Better Structures for the Storage of Documents and Files as Well as Sorting of Documents and Files at Transfer to the New Structure Often an existing storage structure grows in computers by adding new folders successively at different levels, without following a strategic plan. Both in the case that there is a single computer or if it is a common file server, the structure of folders and their names sometimes becomes not quite clear and consistent. Double clarity can occur and therefore doubt as to where documents can be found and where they should be saved. To improve usability sometimes entire structures need to be re-engineered, with distinct structure and less ambiguity. The tools available today are partly unclear when creating new folder structures and also difficult to use for the transfer and sorting of content (documents) to the correct place in the structure. The problems solved are:

1. Easier and clearer to create a hierarchical tree structure of folders for transfer and sorting of documents and files.
2. Easier to transfer documents from different folders, entire folders and entire structures of folders with contents to the new storage structure.
3. Easier to arrange and restructure existing folder structure.
   It is easier to form an opinion of the existing structure, taxonomy and overview of existing naming of folders in the structure and therefore easier to improve the structure and naming of folders (taxonomy)

Modeling of New Folder Structure According to an Embodiment.

The map with an imported folder structure is used as an easier and fast modeling tool for the development of better storage structure for the documents in the imported folder structure. New folders can be created in the system where the instance of each folder in the memory creates a corresponding folder in the underlying information system. First, create a root folder. When creating the root folder, the system asks about where this folder should be placed in the root system (the computer). In that location, the folder is created as usual. All subsequent folders created with the command New Folder creates a new folder in this folder or in the folder that is currently selected in the extrinsic tree structure. This will enable easy creation of extensive tree structures. By putting the folders next to each other on the open area (the map) and connecting them automatically with lines, a better overview than in existing computer systems is directly obtained. Since an entire branch of folders can be moved, and since a parent folder (from where the branch origins) can be marked and moved with drag-and-drop, new structures can easily be modified. The open interface with plotted hierarchy of folders makes it easier to choose which folder that is appropriate to move with its following, associated folder structure.

The open area with the hierarchical tree structure of folders plotted makes it very easy to see which folders, i.e. which part of the structure that is marked and is affected by the relocation of the selected (root) folder. It also makes it easier to determine whether it is the current folder which should be relocated, or parts of the folders originating from this folder. The viewing arrangement with the listing of the content in all folders in the selected branch in a window to the right in the program also makes the decision about which folder to be moved easier, according to the structure that they are placed in the two-dimensional area (the map of structure).

The invention partly consists of:

1. Using the system described herein to visualize and manage folder structures in computers to create new and better structures of empty folders for storing documents and then transfer the documents from the old structure to the new and to have both the old structure (with documents) and the new modeled (without content) located on the same area, in the vicinity of each other, so that both can be viewed and that both are affected by the change in resolution (rescaling/zooming). Transfer of documents from the old structure to the new is easily done by drag-and-drop with the very good overview of the two-dimensional map view, but the transparent view over the contents of several folders at once (ContentView to the right), with the help of searching combined with a flat open folder structure that makes it much easier to locate and select documents of a certain type or with certain content etc. and move them to designated areas in the new folder structure (clean).
2. Highlight the new structure with a different color at to indicate which folders are empty and which folder contain documents at transfer.

Previously, it was no problem to move a folder containing many subfolders and here, it is no difference, but to easier select which folders, i.e. branches, to move, it is much easier with this descriptive technique; the open area with two-dimensional plotting of the hierarchical structure and the relative coordinate technology.

Creation of new nodes (folders) and structures of nodes (folders) where the coordinates to the new nodes are created automatically, and lines connecting the nodes (folders) to clearly show the structure of the created hierarchy, ie, how they are organized into subcategories. When the new structure has been created (that it is empty is marked with a different color) so it is automatically placed in a suitable, graphical position and documents and other folders can be moved over to the folders in the new structure.

Migration of Objects, Folders and Documents Between Folders in the Structure. How this is Presented to Provide an Intuitive Understanding of the Operation. Display of Groups of Documents for Moving and Display at Movement of a Subset of the Structure of Folders.

The interface is linked to the underlying data systems so that changing the location of one or more documents in the tree structure on the workspace gets through the program impact in the form of a corresponding change in the underlying information system. When moving an object in the structure, such as a folder from one place to another the system sets an indicator that highlight the current object and it is always plotted over (above) all other items when click-and-drag moves the object across the area.

Display of which Folders in a Structure that has been/is Highlighted (Selected).

To clearly show which of the folders/what part in a tree structure that is/are selected the symbols of the folders are a little bigger. They then appear slightly closer for the user than the folders and lines that appear without shade and without magnification.

7. Displaying the Contents of Selected Folders when Selecting Multiple Folders and Hence More Parts of the Tree Structure of Folders, i.e. Multi Selection.

The content view on the right displays the content of folders and documents for each selected branch.

The described area of plotted hierarchical tree structure of folders allows, according to an embodiment, easy selection of different parts of the folder structure. One solution is that the cursor is brought to one of the parts of the structure whose contents must be examined and the folder closest to the root folder is clicked. This will select all of the outlying part of the tree structure and its contents are displayed in the content section of the application window (on the right). Both the selected folders are displayed and their respective content of documents in a hierarchical top-down view (as previously described).

The next part of the folder structure can then be highlighted by pressing a selected key (eg Shift) to signal to the program that now a further portion of the structure should be highlighted. The root folder belonging to the part of the structure to be opened with the first, is clicked in the same way as above. This whole part of the folder structure is now highlighted and its contents are displayed in the content pane on the right under the first parts content. See illustration.

The open two-dimensional area with plotted structure of folders makes it easy to select the folder to highlight, as well as selecting several folders and/or part of the tree structure for the comparison of content. FIG. 30b shows how many folders easily can be selected in the interface. It can be arranged so that all the content from all the multi selected folders gathers together in a single data container, i.e. the Content View. This content can either be displayed ordered by the respective folder where they are located and then each folder with content is displayed in the Content View, or only the contents of files are displayed in the Content View. This content can then apply statistical functions, search function is applied that filters up only those files that match search criteria and sorting can be applied. Sorting produce different list depending on if it is just the actual files in the Content View that appears or if they have also sorted under each folder.

8. Central Storage of Coordinate Information Library.

One Method to Achieve the Same Graphical Appearance in all Two-Dimensional Surfaces (Maps) when Many Client Applications are Simultaneously Run on a Shared Server.

The software changes the way how content is perceived by adding the map coordinates according to a specific methodology, see the Box method and the Relative Coordinate method above. The algorithm allows one to understand the directory structure better and can communicate within it easier (used terms that describe the area on the map). Different people work on different things. A specific file keeps track of the offset coordinates to all folders, thus enable all users to have the same layout in the client application locally on each compute.

Each client runs its own ContentMap and builds its own database. For example, several users work in the same project they the project should look the same graphically in everyone's computers. The client software on each computer are importing only the offset coordinates that are relevant to the structures that are imported into the program.

Each client computer import changes from the joint registry database on the server that has been constructed from the relative coordinates of the folder structures that are common and imported into the client computer. Thus, enabling the displayed tree structure to look the same in all computers. Changes are only made to imported folder structures. The folders contained in the joint database of relative coordinates on the server which are not imported into the local computer's memory need not be loaded.

Even graphic symbols and information e.g. flags, images and text notes, etc. which are linked to a folder can have its position on the surface defined by coordinates relative the folder they are linked to. The invention to connect a graphic object to a folder in a tree structure in such a way that it remains with the folder even when the folder is moved and the folder and the folder connection lines change appearance, should be protected. That there is a graphic symbol, from which the image is in an image catalog and the words contained in the text, note, etc., this information is stored in the connection to the database (instance) if the folder that the graphic symbol/information is linked to together with the relative coordinates indicating the graphic symbol's mount point, see FIG. 21.

With reference to FIG. 29, an illustration of the coupling between clients, client devices C1, C2, C3, and the central server, server devices C5, C6 and process arrows representing a communication network C4.

When different computers in the network adjust the coordinates of folders, they will, in general, be different. Coordinate information may be stored locally on each client PC for the reason that the methods and system, such as ContentMap, will function offline as well as online.

As an example, to ensure that the coordinates in the various databases shall be the same, every running application, such as ContentMap, will read the stored records of changes of coordinates on a central server. This is one of the reasons to save the database on a server, i.e. so that all client computers can read the coordinates and thus ensure the appearance of the map is the same in all client computers. The register only need to keep track of all imported folders coordinates and other supplemental information such as content and coordinates to text notes, colors and placements of flags, markings of labels (background colors and their coordinates or root folder which they connect to (the folder which is clicked on when placing a label).

Figure 21:
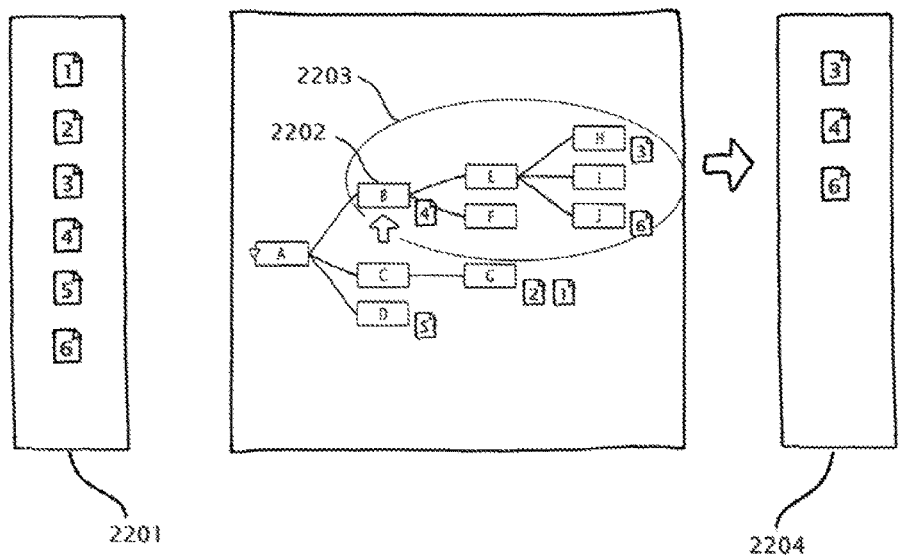

See FIGS. 21 and 29.

9. Saving of Data on Markings and Handling of Marks Upon Minimization of Part of the Structure It may be desirable to show to which folder a marker symbol belongs to, and obtain marker symbols to follow a folder when it is moved or disappear when the folder retracts (trimmed) to save space on the surface?

According to one embodiment, coordinates of markings, Flags, Text Notes, Landmark etc. will be stored as an offset with relative coordinates to Folders or as absolute coordinates (relative to the origin) "freely on the surface." In order to "attach" a mark to a folder it is placed on the folder that indicates the link with a graphic symbol (e.g. a halo). The symbol will obtain a place in the memory (in the folder database) and relative coordinates to the folders that are stored in the folder. When symbol is highlighted in order to manually change the relative coordinate affiliation will be displayed with a line similar to the bonding lines between folders. If the folder is moved the symbol will follow with the same scale. Depending on the relative coordinate method, the symbol will also follow the move, e.g. if a parent folder to which the symbol has been linked with is moved (for example, if folder A is moved in FIG. 21 the flag attached to folder B will follow with the exact same change in position as A does, and so on).

The graphical symbols can be manually adjusted relative to its parent the same way as folders can by manually set to offset coordinates. As shown in FIG. 21 the flag 2103 will follow when the folder 2102 is moved relative to its parent, folder 2101. The flag symbols relative coordinates K, L towards its parent folder 2102 are not changed when the folder 2102 is manually moved. The flag follow its parents movement while its own relative coordinates are changed when the flag is clicked and dragged relative to its parent 2102. The same function has relative coordinates to Text notes and other graphical indicators.

10. Handling of Import of Already Imported Part of the Tree Structure.

What one wants to happen when the user tries to import a branch which is imported, i.e. already existing in the system?

According to one embodiment, a branch is already a subset in a tree structure and then the branch will not be loaded again, instead it will appear in the imported tree by moving the map so that the branch is centered at a predefined point in the application window (the map moves so that the branch will end up in the center of the map window).

11. New Kind of Marker of Belonging in Folders with Color Box

It may further be advantageous to provide a suitable marker of a connection to a specific area of the tree structure, such as to a topic or theme, without deteriorating the readability of the text in folders, for example by changing the color of the folders. If the color of the entire folder changes, this will also affect the readability of the text, i.e. the name of the folder. Moreover, it will also give a messy impression.

Instead of changing the color, in one embodiment, selection of areas in the structure will be manifested by changing the background in a square box that encloses everything: from the basis of the root folder transient tree structure. The root folder is marked and the selected color is automatically calculated to cover all outlying folders below the selected root folder. Calculating the delimitation is made in the same way as a folders area in the box method described above.

12. Selection of Areas for Better Visual Recognition.

Automatically Added Navigation Symbol Image, from Images Stored in a Folder are Presented in a List or Pictures Created from the Files Stored Inside Each Folder as Folder Symbols Represent, for Greater Recognition of Areas in the Structure of the Two-Dimensional Surface (Map)

When the amount of folders becomes large, the risk of mistaking areas of the structure on which the design of folders may appear similar will increase. The branches may appear uniform and orientation will be difficult. An increased roughness of the surface appearance is then desirable.

Embodiment 1

The Folder Name Generates the Size

The folder size, both in the x direction, i.e. how high it is, and in the y direction, that is how long it is, depends on how many characters the folder name consists of. We apply a line break after particular rules allowing the folder name not to break in the middle of a word instead it will break where it provides meaningful words. At line break the Folder icon will become higher. As a consequence of the fact that different folders usually have different names (name length), they will appear different in which makes them easier to recognize and the map will be easier to navigate.

Embodiment 2

Graphical Objects Selected from a List of Image Objects or Generated from any of the Files in Each Folder Specific graphic objects (images) with different appearance connected to Folders in the map in different locations, spread over the total area of the Folders structure. The images may be larger than the folders are to be highlighted more and give a sense of topography. They can appear discreetly for example appears in monochrome. This will increase recognition and orientation capability of the structure. The objects can either:

A. Download from a library of images and be linked to a Folder and relative coordinates, the same breakdown in default coordinates and offset coordinates relative to the attaching folder so that they do not collide with other folders. The images are loaded in a series from a folder of images in a given order. They can be changed manually in any folder.

2) Be created from the files in each folder. The system can then highlight and show a palette of preview images of files in the current folder. The system analyzes the files in the current folder to obtain a photo illustration attached to it and suggests suitable image files or images created by the preview programs of other files (such as text files, pdf, calculation files, etc.) that the folder contains in order to illustrate/represent the folder in the structure. In the interface, the user can choose which of the suggested images from the files in the folder should represent the folder, in addition/besides to the folder icon. The image is mounted by the system in the background, behind or to the side of the folder so that the folder and connecting lines between folders appear in front of the picture.

The images are connected with relative coordinates as described above, for each folder and can be chosen to be placed partially behind each folder if desired. The graphical navigation item will then follow the folder, for example, after moving and/or Trimming. Selecting a folder for linking graphical objects can either:

1. Be calculated and placed automatically depending on the folder density in different parts of the structure and/or uniformity of appearance of different parts of the structure. Uniformity and many Child Folders decide the placement of graphical objects.

2. Be manually placed where the user prefers, i.e. placing the folder and/or attachment, by clicking on any folder. Symbols are shifted sequentially so that each symbol will be new until the list ends. A selected symbol can then be changed by double-clicking, and scrolling the list again.

13. Entering Information with a Geographical Coordinate (the Position in the Map) "Letter+Mouse Over the Area" Technology for the Activation of Various Markers with Simultaneous Input (Designation) of the Coordinate.

It is beneficial to tell the system where on the map surface a mark (such as text selection, flag or landmark) shall be created in an efficient manner. We prefer to facilitate easy entry of the coordinate information instead of first creating the object and then move it to the right position. We also want to avoid having to choose objects/symbol/function from a button menu and then move the cursor to the application windows surface. It should be simple to specify for any object/symbol/function required at the current coordinate.

According to one embodiment, we let the system load the cursor position on the screen (in the map) when any of the keys, as the program has assigned specific functions to at mouse click, pressed (for example T for text, F for flag, etc.) while the mouse button is pressed, click with track pad or similar. The cursor position, i.e. its coordinates on the surface, is then given as arguments to the function that creates each graphic marker. Either the cursor is placed where the cursor was located when the mouse button was clicked or there is a logical link to the item that the cursor was over as described further below.

Two Alternatives:

1. A new instance is created in the memory of the object with the mouse cursor coordinates as arguments. The instance describes the type of object and saves the coordinates of the object relative to the surface origin (absolute coordinates).

2. If the cursor is over a different object that already exists on the surface, such as a folder in the folder structure, then the object corresponding to the depressed key is added to the object that the cursor is over. If it is a folder, the new object shall be linked to the folder with relative coordinates and by a displacement function slide out a distance from the folder by default.

14. Improved Results from the Search by Combining the Described Flat Open Hierarchical Display of the Structure of the Folders in the Computer System and Results from the Search of Documents with a Search Engine.

Display of search results in the graphical structure of folder icons occurs on the flat two-dimensional surface ("map") which makes it easier to determine the relevance and Use of the flat surface of delimitation of search results by using the two-part interface; one part of the structure consisting of folders and one part which is a results section where the selected content from the structure-part is displayed.

How to efficiently display where search results, stored in the computer, are located and at the same time use this information to faster and easier evaluate which of the results from the search engine that are most relevant?

How quickly and easily collect all the results from a particular search that also lies in a certain part of the structure of the folders on my computer?

How can one see the surroundings of the document that is close to the search results from the search engine but not found by it. I.e. the documents stored in the same location as the documents that the search engine finds but does not show in the search results?

The innovation is about improving the result from search engine(s) which are connected to the computer system (such as those found in any mainstream OS like Windows 7 and/or newer OSX) by displaying search results in the hierarchical tree structure of folders on the two-dimensional surface (the map).

The invention demonstrates the benefits that goes beyond simply generating a list of results, in addition show results of the tree structure of folders and use this information to find the sought-after documents efficiently. The surface makes one obtain better overview of the location in the folder structure of the search hits than in any regular search engine It is already known how search of files can be done in a computer. It is also known that the search in a database can be displayed on a two dimensional surface. The way we now view the results and the way we take advantage of the search results from the search in addition to our development of the tree structure of folders in the file structure of a computer system is however completely new.

Viewing Search Hits in the Previously Imported Structure.

The system reads and combines the results from the computer's search engine with imported folder structures. The system checks the scanned folders against the document in the list of search results and displays the hits as document symbols next to the folders that contain the matches in the list, in the structure of folders, on the two-dimensional surface (map). See FIG. 14.1

If there is more than one hit in a folder, this is indicated by a number greater than one (1) next to the document's symbol in the structure of the surface (map). In this way it is possible to overview the folder structure in one simple glance (overview map) over the folder symbols and determines where results are located in the tree structure. This display style/method can be used for two methods/approaches:

A) Search Engine which Assists to Locate Documents in the Structure of Folders (Map)

The map of the folders can be used to limit the amount of search results, i.e. it allows the user to read the map's structure to determine in which area the user want to review results and click on the folder (including any outlier structure of folders) to be opened in the results view (area under review). The content of the result view is then a subset of the search results, and the tree structure. See FIG. 22

Search results show where in the folder structure the interesting/relevant documents are located. It makes it easier to select parts of the map to explore by clicking on folders that are opened and shown to the right in the results view. The search engine will be an additional help to choose and maneuver in the map and find the folders we want to open. A search shows were documents such as, e.g. documents containing a specific word is located and then we can use the map to open and examine. When a branch has been extended in the map and displayed in the results view the "hit-documents" are indicated by being highlighted in color enabling the user to easily, locate, open and work with, all of the documents in the folders of the branch.

B. The Structure of Folders (Map) Assisting in Finding the Relevant Search Hit(s) when Scrolling or Clicking in the List of Search Results The map structure of folders with hit indicators act as a guide/help for choosing the right hit when one scrolls through the search results list. Upon scrolling (e.g. with arrow keys, Enter, or similar) the search hits symbols are highlighted successively in the map (e.g. with a sphere around the current document, or similar). With the help of the map of the folder structure, it is easier to evaluate the relevance of each hit. One may also locate relevant (although not being search hits) documents by viewing all the documents in the hit folder displayed in the results view.

The way the user can use the extended tree structure to select the subset of search results on the basis of the amount of document symbols and folder names in the tree structure is new. The invention also includes the method of selecting a number of search results by selecting the part of the tree structure where you want to perform the search in addition to entering a search criteria, i.e. only performing the search operation in the selected area of the tree structure AND with the specific search criteria and to be able to transfer those to another storage location (folder) in the computer system. They can now be selected and moved to another location in that tree or outside the two-dimensional surface to the desktop or similar. The search engine lists the files per relevance in 2201, in FIG. 22.

A selection can be made of the tree structure of folders, 2203 in FIG. 22 by selecting a parent folder, 2202, in the tree structure. The subset of all the results in 2201 and 2202 the selection of branch of the structure in 2203 only generates the results that are in the selected branch 2204*th*

If Folder B, 2202, is selected in the structure and all folders herein, ie, the extended tree structure is selected, 2203 as shown by the adjustment in the method either all files in all folders in the structure in 2203 with the search results, especially marked in the Content view, 2204, or shows only the search hits, which are available in the selected tree structure. Content view, 2204, thus shows the average of the amounts of search and selection of the subset of the tree structure.

Included in the invention is the possibility to move the structure canvas vertically and sideways when stepping through search results so that the current hit is shown in the center of the two-dimensional surface. This automatic movement/navigation, also includes the automatic extension of the retracted parts of the tree structure when the sought for document is located in this part, in addition to a method to show where the document is available by successively moving the document symbol simultaneously with the extension of retracted parts of the tree structure so that symbol is always displayed at the folder containing the document or if it contains the folder that contains the document. If the searched document resides in a folder that is available in several retracted tree structures inside each other then the symbol is moved so that it appears next to the folder which need to be extended in the folder structure until the structure is completely extended, then the symbol moves to the next folder to be extended. In this way the user gets a better understanding of where the sought for document is located in a large structure with retracted branches in several levels. See FIGS. 18A and 18B When searching in the list of search results from a given search with the search engine our invention will deliver, not only the simple search result, but in addition the rsult will deliver the entire folder structure where the search hits are located, i.e. folders that contain other documents than those matching the search criteria which makes the search results more useful and that the number of identified interesting document may expand. What is already available in the existing data system is information about the logical structure, i.e. that one folder is located inside another folder and in these folders are specified document located, and they are described with logical addresses (paths). The information that we add is geographic coordinates. We generate coordinates in such a way so that we obtain a graphical structure. Folders will be distributed on a two dimensional surface so that they can be connected with lines.

These lines cannot cross each other and they may not cross any other folder. Information is added in the form of coordinates, each folder will have two extra coordinates (x and y) as it is a two-dimensional surface. If the coordinate is correct according to our method a graphical structure will be generated in addition to the logical structure. The solution we deliver is that the human brain navigates much better and more efficiently, by nature, in a graphical structure than in a logical structure. Explorer only works in a logical structure, there is no graphical information. The Box method is the part of the invention that manages the coordinates while the relative coordinate method is telling the system how the coordinates should relate to each other. If a coordinate in the graphic structure is altered the subsequent coordinates will follow in such a way that you can move parts without the lines having to cross each other. Applying the box method, the conditions are that the lines must not cross each other and that you should see the map in a simple and clear manner.

Thus, there are several solutions:

1. The combination of the search (the list of search results) and visualization of the tree structure of folders on a flat surface. We can look at the map and see where the hits are and thus use the map to search. This enables the user to do a second selection of search results by choosing a branch, or several branches in the structure of which folders will are marked and the contents of results we want to see.

a) Selection of the subset of the tree structure is done by: delimiting one branch based on the search results. When a folder in the structure is marked by mouse-click, whereby all the folders will be marked and all content in the folders in the selected branch is displayed in the results view with the search engine, identified, documents (hits) marked or, b) Selecting several branches delimiting the amount of search results. Several branches can be selected by pressing the control key while clicking on multiple branches in the structure to delimit the amount of search results. All clicked folders and their outlying folders will be marked and all folders in the selected branches will be displayed in the results view.

Two types of displays in the result view:

All Document in the Selected Branch

In this case, all documents in the selected branch and the documents that the search engine has identified are shown as marked. Either the branch is selected manually by the user clicking on the folder symbol in the branch the user wants to open in the results view. Then the user can choose the branch based on where the search results are located, i.e. where symbols are found next to the folder symbol in the search result, see figure XX below. Alternatively, the user may select the branch automatically by the program when it comes to the current hit in the hit list. Upon scrolling the relevant search hit is marked with a symbol with an extra sphere around the symbol.

Only the Documents Found by the Search Engine

In this display only the search engine hits (documents) are shown which are located in the selected branch or branches, in the results view. This alternative makes it easier to directly find the hits if there are large numbers of documents in the selected branch (or branches) and the user only wants to find the search results in the selected branch(es). This operation makes it easier to move the specific hit-documents, such as documents containing specific content, e.g. created or modified on a certain date, or any other search criterion, into a new location.

2) Automatic Moving Map and Moving Search Hit Symbol when Automatic Extension of Collapsed Folder Structure Scrolling Through the Search Hit List Scrolling in the List When searching the hit list it is highlighted where in the folder structure results are found/located. When you scroll the hit list, the map moves in correlation to where the search results are actually located. The search result and/or document that are active in the list are marked on the map with a circle. When searching for hits by moving around in the hit list, areas of the structure previously may have been closed will open automatically, retracted in a folder. This continuous opening of new areas continues until the folder where the searched for document, i.e. the document that is current in hit list (when scrolling in the list), is found. When the branch where the folder is located, has extended, and the folder is moved into the visible area of the surface of the application window, the extension of retracted structures and movement of the canvas automatically stops. The document's symbol to the side of the current folder showing where the search hit is located will follow the folder during the extension of retracted parts of the folder structure and the movement of the canvas. The movement of the symbol during extension of the tree structure works in the following way; it first appears next to the first folder you see in the two-dimensional surface (canvas), i.e. the folder that contains a retracted part of the tree structure in which a folder with the document found by the search engine is located. When the retracted part of the tree structure is extended over the surface the surface will automatically place itself in the center so that the part or folder that contains the hit-document is easily visible inside the application window. If the folder that now contains the requested document contains a retracted tree structure of folders, where a folder containing the requested document or a new retracted tree structure of folders, where a folder containing the requested document, the process will be repeated.

One part of the invention is the mode for displaying search results in the corresponding folders in the process of scrolling through search results. The canvas with the structure of the folders is moved automatically by calculating the absolute coordinates on the canvas surface, so that the relevant folder, i.e. the folder containing the search results, always appears. The contents of the relevant part of the tree structure is displayed in the results view, and automatic extension of any retracted (hidden) parts of the tree structure as folders in these parts that contain the search matches are triggered by scrolling in the list of search results. This function gives the user a natural and clearer experience of where the search hits are located under the tree structures.

The Search Hit Symbol (106) of FIG. 1 indicates that the search hit is located in the folder or data container C. The program for processing the described methods reads and writes to the memory of a computer or a server over a network containing structured or unstructured data. Unstructured data can be files.

3) Improving Search Engine by Expanding Amount of Possibly Interesting Documents From the results view to the right of the application window, while scrolling through the search hits, the user can also see surrounding documents in the folders, i.e. if the user has chosen (in preferences) to show the content of all the selected folders. This allows the user to evaluate the hit relevance by viewing the whole content of the folders and thus find new documents that the search engine has not found but that may be relevant on the grounds that they are located in a folder(s) where other documents have been found by the search engine.

This is an invention because it is a new way to find documents that has not been found by the search engine but which could still be relevant to the search (sought for by the user performing the search query). Documents that are not found because they do not contain any searchable text string that matches the search criteria can nevertheless be found because we let the results view on the right side of the application window show all the documents that are located in the part of the structure of folders that will be highlighted when one of the hits of the search engine is found in a folder in the structure. This is accomplished by allowing the entire branch, from the folder, containing the search result, closest to the root folder in the tree structure (i.e. from the left and propagation to the right) to be highlighted during scrolling through the search results. When scrolling through the search results, which are located in the tree structure of folders outside of the innermost folder (to the left) that has been selected, the list will scroll down to the document found by the search engine.

Scaling Down the Automatic Movement of the Surface while Scrolling Through Search Results Scrolling through the results of the tree structure of folders on the open surface (map) with automatic movement and automatic reduction (downscaling/zoomning)

When scrolling through the list of results obtained by the computers search engine, the map will show the location of each hit by:

1. Document symbols are depicted next to folders in the structure of the surface showing all places where results from the search engine are located.

2. When scrolling in the list of search results (as well as by direct click on one of the matches in the list of search results) the actual search hit(s) are highlighted in the folder structure by a circle which encloses the document symbol (or otherwise highlighted). All search results are also highlighted with symbols next to the folders where the hit is located the actual hit(s) is/are indicated beyond this by an additional symbol, such as an enclosing circle.

3. The surface in which the folder structure is portrayed (the map) is automatically moved on selection of a new hit in the search hit list such that the part of the folder structure where the actual search hit(s) are located is automatically placed in the center of the application window. In this way the user can focus his attention to the area where the selected document's symbol is located in addition this ensures that the folder containing the selected document's symbol is located inside the window.

4. If the surface/canvas on which the structure of folders is plotted is long, i.e. contains many folders, then the overview of the structure may be compromised during movement, and the perception of where in the structure the user is and/or are heading may be facilitated by scaling down the surface (zoom out). The structure is reduced proportionately to the length of the displacement with downscaling mainly at the beginning of the movement and up scaling to original magnification at the end of the movement. The function has a typical "bathtub" look with downscaling of the structure on the "bottom" of the bathtub.

Import of a New Structure if Needed

Results from the search engine can also be used to suggest the import of folder structures from the computer system that may have been forgotten by the user. This is further described below.

15. New Efficient Display Mode for Search of Duplicate Documents in the Computer System and Display of Documents with the Same Name Use of the graphical structure of the folders on the two-dimensional surface ("map") for displaying results from document search can also be used for displaying search results in the search for duplicate documents or search for documents with the same name but different contents. To easily obtain an overview of duplicates is valuable to the user because the features of the ContentMap makes out easier to clean up and organize documents for more clarity and consequently less mistakes. As described above the document symbols in the map functions as indicators that help the user to correctly select subsets of a directory structure for searching stored documents, in this case duplicates. The feature shows were document's are located in the tree structure of folders in the computer system, which has:

The same name

The same content (verifying that documents have exactly the same digital size is sufficient)

Same name but different size

Same size but different name (probably documents with the same content and the same name). An algorithm read the subset of the data systems documents in the folders that appear in the structure of folders on the canvas in the application window. The display is in the form of symbols alongside the folder symbols in the extended structure of folders on the surface.

There are two ways to select the amount of documents in which to perform a duplicate search:

1) One way to narrow the search for duplicates is to select a branch of the tree structure of folders and instruct the system to search for duplicates, in the entire system of imported structure of folders of all documents contained in this selected part of the structure.

2) All detected duplicates will be highlighted with a symbol at the respective folder symbol and a certain selected duplicate in the list of found duplicates will be highlighted with a circle around the symbols for all instances of this duplicate in the structure.

16. Quick Preview of Selected Results of the Hierarchical Structure of Folders when Performing Search Queries It is desirable that the method can quickly determine which of the featured matches of a search that is interesting for us.

According to one embodiment, the search results, in addition to the usual hit lists, will also be displayed next to the folders in the folder structure where they hit-documents are stored. The number of search results is displayed next to the folder by a simple folder symbol if the folder only contains one hit. If the folder contains more than one hit a different symbol is displayed, (the double symbol) showing a number indicating how many hits the folder contains. When the mouse cursor is placed over the surface of a folder that contains one or more search results and settles over the symbol that indicates search hits (hover) a signal is sent to the program that these documents should be displayed by the preview function. If there are several hits in the folder (indicated by a figure next to the symbol) then a preview image of each of the hit-documents located in that folder is displayed in its own window. Only the hit-documents the folder appears. The window(s) are shown arranged on the open surface (map), along the edge of the content portion of the system in the same order as they appear in the content pane on the right. This allows the user to quickly and easily slide the cursor over the tree structure for a quick overview of all hits in different folders in all parts of the folder structure. If the user finds an interesting folder in this way he may simply click on the folder and all its content will be displayed in the content pane on the right. If the Net View tool, described above, is active only the hit-documents appears throughout the selected structure, i.e. also in all sub-folders (subfolders and child folders) if the Preview function is activated.

Picture: Shows Hits in a Folder Structure and Preview Window of the (Same Number, "for Example 3 Hits in the Folder Generates Three Preview Windows) Documents in the Folder, Mouse Cursor Over Document Symbol is Demonstrated, the Hits in the Content View is Displayed.

17. Timeline a New Method to Input Arguments to the Search Engine for Searching Time Intervals, for Example, Modification or Creation of Documents Etc.

It is rather time consuming to input from and to dates, i.e. start and end dates in the search query for modified and/or created dates, of documents. It is preferred if this can be done in a simpler way, in ContentMap this is the solution: by moving the date range along a time scale, i.e. to change the start and stop dates at the same time (simultaneously) while the length of the time interval is retained, and obtain the search results in real time. This method simplifies the input of date boundaries, as well as the movement of the time interval in addition the interval placement in time is clearly visualized.

According to one embodiment, we have created a moving slider, a bar, whose two endpoints and length indicates the selected time interval. The bar's one edge, usually the left on a regular time scale, represents the start date of the range while the bar's other end, usually the right on a regular time scale represents the end date of the interval. Both the background, which is provided with a time scale, and the bar (lever) which is movable laterally.

Timeline-Input and Display Device

Figure 25A:
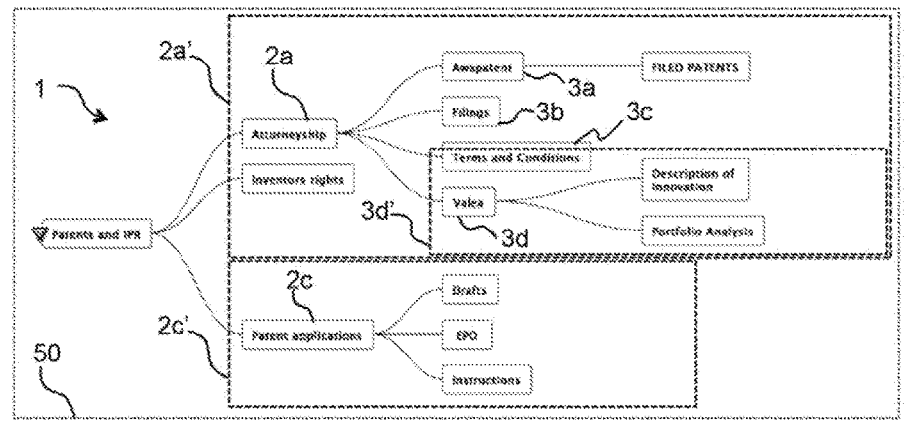
Figure 25B:
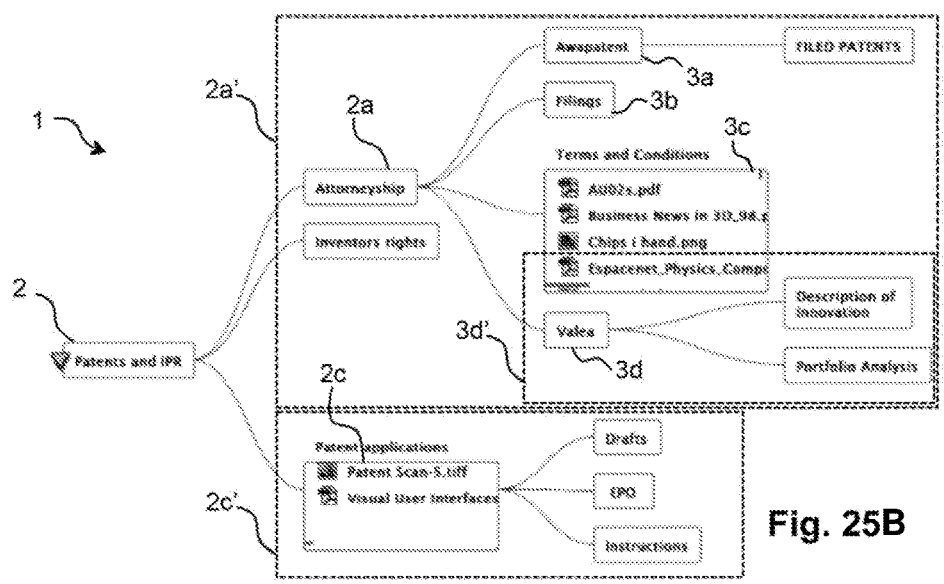

FIGS. 25A and 25B are showing an embodiment for inputting a search input and for generating a search request to a search engine or other device using time data with a start time and a stop time. FIG. 25 below is meaning FIG. 25A or FIG. 25B. Suggested here is search for files or other content that has been modified, controlled by input button and indicator 2508, or created, controlled by input button and indicator 2508, within the set time interval inputted by a bar 2506. The bar 2506 is used both to graphically represent the time interval, between its end points 2505 and 2507, and to change the interval relative to a limited or infinitely long line indicating time, or time scale, 2511.

When the time interval data is feed to the search engine, a search result is received, and the search hits are displayed by search symbols 2501, in the structure folders on work area of the digital boundary in the same manner as earlier described. The search hits symbols 2511 comprises e.g. an icon and an indication of the number of search hits in the associated folder.

The line indicating time 2511 can be arranged to change resolution of time interval by a slider input, or other input device, 2504. When changing resolution of the line indicating time 2511, the bar 2506 indicating the search time interval from start to stop-time will also simultaneously change accordingly by scaling. For example, if the timeline resolution of time is decreased according to length in the workspace the length of the bar is decreased correspondingly in length in proportion.

When the start endpoint 2505 in FIG. 25, of the bar 2506 is selected, by mouse click or with other device, moving this endpoint of the bar 2506 to the right will shrink the length of the bar 2506 and increase the time value, shown in window 2502 in FIG. 25. In a corresponding manner, when moving the selected start endpoint 2505 of the bar 2506 to the left, the length of the bar indicating time interval is increased in length and the window 2502 indicating start time is changing to an earlier time.

When the stop endpoint 2507 of the bar 2506 is selected, by mouse click or with other input device, moving this endpoint of the bar 2506 to the right will increase the length of the bar 2506, thereby increasing the time value shown in window 2503. In a corresponding manner, when moving the selected stop endpoint 2507 of the bar 2506 to the left, the length of the bar 2506 indicating time interval is decreased in length and the window 2503 indicating stop time is changing to an earlier time value.

When the center area of the bar 2506 is selected, for example by clicking a mouse button or other cursor device on the bar, between the ends of the bar, the bar as a whole can be moved either to the right or to the left relative the timeline 2511. When the bar 2506 as a whole is moved in either direction, left or right, both the start and stop values of the time interval are changing simultaneously. According to an embodiment, the relative time difference between the endpoints is maintained during a complete bar slide operation. It is further noted, that an endpoint may also be referred to as an end portion of the bar 2506.

When the bar 2506 or one of the ends 2505 and 2506 of the bar is selected and dragged to one of the end sides 2510A or 25106 of the work space of the timeline, the end sides 2510A or 2510B is sensitive for the bar and may be arranged to activate sideway scrolling, or scaling, of the timeline. The left hand side area 2510A will make the timeline to move to the right. The right hand side area 25106 will make the timeline to move to the left. Furthermore, if the middle portion of the bar 2506 is clicked and the bar is dragged (moved) along the timeline to one of the scroll activation areas, 2510A or 25106, the bar can stop at the end and the timeline will scroll sideways. If one of the ends 2505 or 2507 of the bar 2506 is clicked and dragged (moved) sideways to the to the scroll activation area that are located on the same side 2510A or 25106 as the end of the bar, this en of the bar 2506 will stop in the scroll activation area and the other end of the bar 2506 will move towards the other side of the timeline while the timeline is scrolling making the bar longer until the bar has the same length as the displayed part of the timeline. For example, if the left hand side 2505 of the bar 2506 is moved to the left hand side 2510A of the scroll activation area, while making the bar longer (the right hand side 2507 of the bar is not moved). When the left hand side 2505 of the bar 2506 reach the scroll activation area both the timeline 2511 and the right hand side 2507 of the bar 2506 is moved to the right.

A change of the start or stop time by typing, or inputting, a new value, or changing a value, in either one or both of the time windows 2502 and 2503, can make the bar 2506 to either move along the timeline, or make one of the endpoints of the bar to move along the timeline, changing the length of the bar and graphically displaying the new interval.

18. Attribute Search

Another Input Method for Entering Attributes to the Search Engine is Through Known Documents. This is to Find Documents with the Same Attributes of any Type.

It is further desirable to find other or more documents of the same type, date modified, author or similar, which a given known document entails. The method enables a simplification to feed such data into the search engine for searching similar documents.

According to one embodiment, the known document attributes in a column is displayed in the results view in the system. In the documents attribute column, different attributes may be selected (highlighted) by clicking them. The selected argument is passed to the search engine of the underlying computer system which then performs a search in the amount of folders that have been imported into the system described herein, and returns back the search results in real time for viewing on the two-dimensional surface (the map) as described previously. See paragraph 14 above.

19. Solution to Make the Signal Symbols More Apparent Upon Reduction (Zooming/Downscaling) of the Two-Dimensional Surface (the Map) to Increase the Overview.

When zooming we do not change any coordinates, the coordinates always requires 100% resolution and it is at plotting of the map that we surface is scaled.

All objects are not scaling down in the same speed. We let the symbols scale down slower than the map to more clearly see where one specific indicator is located.

The graphics display (graphics engine) in plotting programs such as Java 2D has a function that scales down the graphics evenly. When the map is zoomed in (rescaling) for a better overview the document symbols and flags shrink as well. For example, at 20 percent of normal size they are so small that they are no longer clearly visible.

According to one embodiment, for symbols to be clearly visible even at in-zooming (down scaling), they can be programmed to be reduced more slowly (less) than the structure in general does when the map is zoomed in (is scaled down). When the surface is reduced, new items are added over the surface where the marker symbols are located in a new layer with the symbol slightly larger than the downscaled symbol on the underlying layer. This is done to ensure that the symbol has the same center as the symbol has on the underlying layer. The process is repeated with another new layer for downscaling of surface structure and so on. so that the symbol on the layer decreases in size slightly slower than the underlying two-dimensional surface with the folder structure does. The symbols are scaled down at a slower rate than the surface in general but as a function of that which makes the symbols clearer and easier to pay attention to on the surface.

20. A New Way to Quickly Preview Folders, and that with a Good Overview Easily Select the Folder for the Preview (Preview)

It is further desirable and beneficial to be able to examine the folder contents in a tree structure of folders on a computer more effectively.

According to an embodiment the contents of folders is displayed in a separate window or view. The content of the window depends on where the mouse cursor is when the top surface of the tree structure of folder symbols is plotted on the two-dimensional surface (surface map). The system is aware of where the mouse cursor is on the surface, i.e. its coordinates. The system also knows about where plotted folders in the structure is located on the surface, i.e. its coordinates. When the mouse cursors coordinates coincide with the coordinates of a folder the system knows that the cursor is over a folder, the system then responds and reads this folder's contents of documents and files and updates the content (showing the contents) in the content window for preview.

The display of the folder that is currently displayed in the preview window is indicated by a "moving" shadow, a beam which either follow the cursor or appears when the mouse goes over a folder. Consequently, two indication methods exists either:

1. Allowing the beam at all times to be where the mouse cursor is, i.e. it is controlled by where the mouse cursor is located on the surface. Or,
2. Allowing the beam to jump from the previous folder to the new folder when the cursor is moved from hovering over a folder symbol to hover over a new folder symbol.

The method simplifies browsing the folder structure in three ways, it enables the user to:

1) quickly look in multiple folders in one sequence and
2) to quickly select the folder to look in and,
3) To reach the folder you want to look in faster.

The beam solves the problem to show which folder's contents that is currently displayed when the cursor slides over a series of folders. The solution builds on the overview the user gets over the structure of the folders of the two-dimensional surface, the map view. The invention is the combination of surface overview (map view) and "mouse over" display with the display mode of a growing shadow/beam. The beam shows affinities between the viewing window and the current folder with the rapid display of folder contents. The beam indicator has been designed so that it starts (in the lead) where the mouse cursor is over the map surface and radiating up (lines are drawn with intermediate fields transparent semi-selected) to the window that displays the contents of the folder where the mouse cursor (the tip of the beam) currently passes. The mouse cursor can be freely moved over the surface of the structure of folders plotted while the program scans if the mouse cursor is over a folder and if so, replace the contents of the window to display the folder contents of files while the beam/shadow shows which folder is displayed in the window.

The beam can start in the source folder in two ways, either:

1) Following the folder symbols shape. The beam starts from folder symbols sides or other graphic delimitation surfaces so that the beam starts from the surface to the folder symbol covers on the two-dimensional surface of the window and ends at the four corners of the rectangular boundary surface for the content window displaying the folder's files.
See FIG. 26A to 26C; or
2) Starting at one point. The beam starts at a point where the mouse cursor is located on the two-dimensional surface of the application window and ends at the edges of the boundary surface of the content window displaying the folder's files. In this case the lines are calculated from a point with coordinates that the mouse cursor has in the system and the four lines ending at the corners of the rectangle window showing the contents of the file in the folder that corresponds to the folder symbol.
See FIGS. 26D and 26E.

The beam consists of four lines, drawn as in option 1) or 2) above, and the two or three visible surfaces that the lines define with the content window and the folder symbol or mouse cursor, see FIGS. 26A to 26E. The beam can also be simplified to be only one of the four sides, i.e. two demarcation lines and in between a filled or partially filled surface such as for example the bottom surface. The plotting is simplified in this way but the perception of a beam is retained. In order to preserve the overview and avoid folder symbols becoming obscured, the plotted surfaces between the lines, windows and folder icon or mouse cursor may be filled only partially, i.e. drawn translucent (partially transparent) so that they can be seen through but still be able to display the connection. They may be perceived as a "glass" surface or shade.

If the map surface resolution is changed, zoomed (rescaled), while displaying the contents of a folder with the beam a recalculation is performed by lines and surfaces in the beam so that it follows the folder symbols absolute position and/or the size changes in relation to the application window because content window position should be fixed or movable relative to the application window while the folder symbol is fixed or movable relative to the adjustable two-dimensional surface (map). It is important that the beam lines always begin at the corners of the folder symbol and ends in the viewing window corners no matter how the folder symbol is moved. The folder symbol can be moved, i.e. change position in relation to the content window by movement of the two-dimensional surface the magnification (resolution) changes by a zooming procedure.

21. Display of Affiliation Between Folder and Window when Opening Folders in New Windows. New Interface with Variable Affinity Indicator Window Between Content Window and Origin Folder Format as a Beam.

According to one embodiment, a beam rises from the folder selected for opening

If the two-dimensional surface map is moved through drag-and-drop or when it changes the resolution for different overview (different "distance" to the viewer, zooming (rescaling)) then the beams lower part, the one that is attached to the folder structure which is moved, follows and the program calculates its vectors while the window showing its contents is fixed in the application window.

Several windows of folder content can be opened simultaneously on the surface for moving content between windows or for the comparison of content then each window that displays its folder has its own beam, see Figure x below. The beam itself solves the problem of knowing where each and every one of several open windows belongs, and the beam's "pointy" lower part, which ends in the folder, follows with the surface (map) movements and magnification modes.

When a folder is opened this is visualized by opening a new window that emerges, above, below or to the side of the folder.

1. The link between the folder and the window is displayed by semi-transparent surfaces connecting the folder symbols edges with the edges of the windows borders so that the sense of an ascending beam shade is obtained. The semi-transparent surfaces definition is reinforced by a thin line drawn on the edge of the surface so that the surface boundary becomes clearer and the information about the window's corners are mapped to the folder's corner (the line connects the folders corners to the windows corners). See figure.

2. The surfaces appear translucent (semi-transparent) so that all folders and all interconnecting lines that happen to be behind the surface becomes clearly visible, but the user still obtain a clear picture of which window belongs to which folder.

3. However, they do not appear semi-transparent in the rest of the connecting surfaces between opened folders and windows. This is to increase clarity. If the surfaces appeared semi-transparent everywhere then new fields would form with different transparency and different colors at the points where the surfaces intersect. Consequently, when several folder windows are open, any layer on layer effect, i.e. the superposition of transparency between the surfaces is blocked so that the interface remains easy for the user to understand. This means that the surface which is placed at the top (surfaces belonging to the window that is on top) alone covers the background. However, one should let the surfaces borders shine through slightly in order to facilitate navigation even when operating with many windows.

4. The clarity of the affinities between the window and the folder can be increased at the expense of the order of windows no longer have to correspond to the chronological order in which they were opened.

When moving the open surface with the folder structure (map), by grab-and-drag, while one or more windows with folder content is open, connected by respective folders in the structure, the connecting surfaces and its borderlines is continuously calculated so that they follow with the map's movements while folder windows remain at their positions. The connecting surfaces length, area and direction changes in real time by continuous recalculation of the coordinates of the surfaces connecting points to the folder corner, while the user moves the map.

22. A New Way to Find Forgotten Folders in the Computer System.

A Method to Let the System Search Engine Find and Suggest New Areas of Folder Structure for Import which the User Might not Otherwise have Found.

Importing folder structures can be done manually (by specifying the root folder of the structure to be loaded), to prevent the number of folders to be impenetrable or irrelevant. You rarely want to import folder structures such as system files on the map, for this reason the user should only import the folders he is currently working with, or for other reasons wish to examine or structure. Sometimes, however, not all folders or structures of folders can be found. It may also be the case that the user working in large computer systems are not aware of what folders or structures of folders that contains important information. A Search with an ordinary search engine provides only the actual hits, i.e. the documents, folders and the paths to the documents/folders. The problem is that much information may be overlooked in folders that are forgotten and then not found again. Moreover, a forgotten folder (the "first" below) may contain many folders in a great depth of many levels of folders that may not be detected even though the first (root) folder is found.

In one embodiment, the method connects the search to the display of the map, thus displaying forgotten folder structures. This is performed in the same way as described above, i.e. the connection between the search and the file structure displayed on the map (two-dimensional surface) with the effect that imports of tree structures reveals possibly unknown files to the user. The system then asks how many levels inwards from the innermost known folder that contains a hit to be "pre-import", so called "search-import".

The display of non-loaded folders, search results occurs in a temporary loading, almost like a preview of possible structures for import. The system reads the folder structure of the relative coordinate method and the box method described above, stores the folder information in a temporary memory area (array) and displays the document symbols were the hits of the document is that triggered the temporary imports in the same way as a search using the map. When the function "show not loaded folder structures" is enabled, the system examines (in addition to display the hits in the loaded tree structures) which results that are available outside the imported tree structures of folders. These new folders are read "backwards" in the path as many steps as the user prefers from the innermost hit document (by the search engine) and temporary imports the entire tree structures with the search results inside. The trees are displayed in the same or in a new two-dimensional display surface (map, the work space).

23. A New Method to Select the Statistical Data about the Contents of Folders (Also, More Generally, Nodes of the Hierarchical Structure). The Two-Dimensional Surface (Map) Provides a Means of Selection for Selecting Subsets of the Overview of the Entire Structure, while the Method of Choosing a Branch of the Structure by Clicking on the Folder Makes it Easy to Select a Subset.

Way in which the Choice of Measurement Quantity (Subset) are Shown as Well as Results Showing the Distribution of Sizes by Measuring the Content of Folders Makes Analysis of the Distribution of the Sizes and Number of Documents Easy and Fast The method and algorithm for the use of the graphical structure of the flat two-dimensional surface ("map") for display and calculation of the sizes of the folders, largest documents in folders, standard deviation etc. Summary and calculation of properties after the selection has been made on the node in the structure and thus chosen the entire underlying (highlighted) part of the structure. The results (pie charts, etc.) are displayed with an overview of the map, which facilitates decision-making How to find where there are large documents into the computer system that occupies storage space. How to easily compare different parts of the directory structure for storage of files, storage size and distribution of the largest files, such as the greatest number of pdf documents or the greatest number of Word documents etc?

How to search and display where large files are located and the distribution of file sizes stored in different folders. Two different problems are solved here as well:

1. The invention simplifies the user work to make the choice of subset for the study of the subset distribution of files with respect to certain parameters such as size. In this case it is the overview of the structure of the two-dimensional surface and the ease of selecting the subset simply by clicking on one or more folders that make the operation easy.

2. The display mode with a graphical indicator at the side of each node in the structure makes it easy to understand the breakdown of the particular selected amount.

According to one embodiment, in the flat surface of the directory structure is easy to select a folder or multiple folders to compare their overall distribution in a particular aspect, see FIGS. 30a and 30b. Each folder that becomes highlighted, shows the relative proportion of the total number of folders that have been highlighted. Thus it is very easy to compare the distribution within specific areas such as a branch. The user simply clicks on the folder in which the branch originates. If instead, two different branches are clicked then all folders in the branches are compared to the amount of the total amount of the compared in all folders.

24. Displaying the Distribution of the Number and Sizes of Documents in the Branches of the Tree Structure.

The technique to select subset by clicking on a folder anywhere in the folder structure on the open surface and thus command the measurement of the distribution of the storage sizes of the selected subset of folders. Moreover, the way to display the distribution of storage size, number, size per number, etc. of documents in the folders of the selected subset.

The way in which we show the distribution of sizes in the measurement of content in folders and the calculation is done with the connection to the underlying data storage of the computer whose content has been imported. By calling of the application to retrieve information about the number of files in each folder and file size from the underlying computer system. This information is the basis for the calculations.

Multiselect; to select subsets in calculating statistics about the contents of the folders using selection and display with the overview shown in FIGS. 30a and 30b.

25. Use of the Graphical Structure of the Flat Two-Dimensional Surface ("Map") for Viewing and Managing Indexing and Search Parameters for Documents in Folders. In a Similar Way Viewing and Managing of User Rights on the Shared Server.

The (above) described interface with the depicted structure of folders on a two dimensional surface makes it easy to monitor the structure of folders and signal the status of indexing documents for search in the search engine and select a subset (branch of the structure) or several branches by clicking at the root of the branch to be selected and then change the status of the indexing of the entire branch, for example from indexed to non-indexed. A way to determine if the contents of a folder in the structure have been indexed by the search engine or not is to show the indicator: indexed/non-indexed. For example, different colors, red or green can be used as a light signal to indicate the index status.

For modification of indexing or the search engine the beam from the folder icon to the window method to be used. Search engine settings can be displayed in a control panel in the window. The values which are set in the panel is valid/applies to the entire outlier tree structure outside the folder symbol from which the beam extends, i.e. the one that is clicked when the function is enabled. This principle of the applied effect on the whole of the outlier tree structure is used by most methods of the system. The logic is that outlier folders are located inside the selected folder. This is why a clicked folder symbol marks all the outlying branches and all folders appear in the results view, or moving a folder symbol moves the entire the outlier tree structure without modifying the folder symbols relative distance to each other (this is done by the relative coordinate method).

The status of user rights for documents in a folder for a particular user or user group is displayed in the same way. When displaying user rights, such as the right to read and the right to write, it is desirable that this appears on the document level in addition to the folder level. Status is shown next to each document in a separate column in the results view for the documents in the folders that are selected in the map. If all user rights are the same (for a particular user or user group) for all documents in a folder this will be displayed in the map. If not, it is indicated that the user rights differ between the documents in the folder. Proposed colors next to folder symbols in the structure can be red=no rights in relation to the posed question, green=rights, yellow=various rights for the documents in the folder.

26. New Method for Adding Keywords to Documents and Files Stored in Folders in a Computer (to Tag Documents with Metadata). The Method Makes it Easier to Make Documents More Searchable and Facilitates for Transfer of a Document from a File-Share (Server) to a Structured Environment, Such as SharePoint.

The (above) described interface with the plotted structure of folders on a two dimensional surface makes it easy to select a subset (branch of the structure) or more subsets, branches (by clicking on and selecting multiple folders (e.g. with control key such as Shift)) to quickly and easily add keywords (Mehta tags) to all documents in the selected branch (branches).

The method uses both:
1) The interface of the two-dimensional surface to choose, select, tar obtain document for writing the key words.
2) De-selection of documents to be excluded, i.e. be removed from the previous selection by unchecking the box on the documents that should not be included in the total. They received the highlight automatically when selecting the entire branch. All selected branches are visible in the system's content (ContentView) to the right of the application window, in this view (ContentView) any documents stored in the selected branches that was selected in the key word operation and they can be cleared by example, Shift-and-click.
3) The search function is used in conjunction with selection of folders, or branches of the folder structure on the two-dimensional surface, to select the documents to be attributed to the keyword or keywords. Even after this selection operation, e.g. search plus selecting a branch or branches of many folders or individual folders or individual folders and branches of the folders in the tree structure of folders—individual or quantities of documents can still, either be exempt or added to the selection, and thus be exempt or added to the amount of documents that will have key words assigned.

The keywords are extracted either one by one or more than one in a series from a list of keywords that are either entered directly into the system or downloaded from an external file, or retrieved from the storage structure of a SharePoint system. When adding keywords one can either:
1) select the first volume of targets documents as above 1) to 3) and then select keywords in the list, or
2) select key words first and then drag and drop the words placed on a portion of the tree structure that contains the documents that shall be assigned particular key words. If the search application has been used, only the documents available in the branch where the words are dropped (or the entire imported structure) and meets the search criteria (been selected) attributed to the key words.

After adding keywords to folders or branches a fine-tuning of folders can be done by de-selecting a subset of the selected documents. One way to demonstrate this is by check boxes that are automatically ticked by adding keywords to a branch or host folders and then ticked off at the documents that are not included in the subset that is attributed to the key words. At the writing of the key words to the branch the branch is automatically selected and its content appears in the results view as previously described. Addition of key words can be symbolized by checkboxes next to each document in the folders in a separate column. If one or more documents should be excluded from the selection then those check boxes should be un-ticked.

27. Page Builder from the Multi Preview. Composition of Documents from Parts of Different Documents by Marking Items (Documents) in Different Nodes (Folders) and then in Preview Select Parts of the Various Documents and by Click-and-Drag Move to a New Window to Create a New Compound Document.

It can be difficult to obtain a good overview of many documents located in different folders in the computer or server. It is even more difficult to obtain overview of how content appears in the form of texts, tables & charts, images and other graphic objects in the documents. Sometimes pieces of content from various documents need to be re-used in a new document by copy/paste. Previously, it has been necessary to search for the documents to be copied and then open them in their respective applications in your computer. The present innovation solves this problem in a new and simpler way than has previously been possible. One embodiment is based on building new documents from parts of preview documents using the system's Multi-select method steps. The selected parts of the preview can be moved, for example, by underlining, in addition several pages of different previews can be moved. Through the transparent display of all documents in a selected part of the hierarchical structure of folders one can easily select multiple documents (multi-select) simultaneously. Several different preview windows can thus also be opened simultaneously and be placed parallel on the surface. The two-dimensional surface map view, combined with the transparent content view and folder views, makes it easier to select multiple documents from different parts of the structure to open in multi-preview.

28. Animation at Import of Tree Structure of Folders to the System

The way structures are plotted as a root folder is imported. Lines and folders are painted out gradually from the left to the right, when a folder structure is loaded into the system. When a folder structure is loaded into the system a connection is created between the system, i.e. the open surface which displays the tree structure of folders, and the underlying computer system that stores documents distributed in folders. The "import feeling" at plotting of imported folders and interconnecting lines from left to right is accomplished by:

1. Folders and connecting lines are plotted out gradually, first from the top down, then the plotting is moved out one level to the next level to the right and folders are again plotted from the top to the bottom, whereupon plotting is moved one level out, and so on. For each level out to the right the distances on the y-axis are calculated for the folders that are located on each respective level (column) inside, i.e. to the left of the current level (column). For this calculation, i.e. the separation in height the Box Method is applied, as previously described. See steps in FIG. 11 displaying plotting and calculation with the Box Method.

2. Between plotting of each, in the computer's memory, loaded folder a timer is applied so that the user have enough time to see the propagation of the tree. In other words, the plotting is performed much slower than the actual import (which consists of the creation of database instances in memory). The methodology with a user-adapted time for change of plotting objects (folder with connecting lines) gives the user a nice experience of the import. The process of plotting the import is only meant to give the user a graphical information on the fact that a tree structure of folders is actually imported and coordinates for folders calculated.

3. When the plotted tree of folders reaches the plotting windows edges then the resolution/magnification (i.e. the size of folders and lengths of lines), the tree structure is zoomed out (is scaled down) to fit in the program window structure ("map"). In this way, the down scaling is repeated every time size of the structure has increased, e.g. when adding a new level and this is loaded and plotted (after delay as above). Down scaling (i.e. zooming in) is performed automatically when the distance between one of the folders in the plotted structure gets closer to the windows edge than a predetermined minimum distance, see figure below.

4. When a certain time has elapsed or when a certain amount of folders has been plotted the tree structure will fade out and the finished imported and pre-calculated tree structure emerges at the surface (fade in).

31. Variable Height of the Content List in the Display View as a Function of Variable Size (Zoom) of the Surface of the Image Objects Preview of Files when Displaying Content in Multiple Folders Placed Inside Each Other in a Hierarchical Structure The invented system encompasses a result and content view interface to the right of the application window that has, as one of several functions, displaying the selected (highlighted) folders in the structure of folders on the two-dimensional surface (the map) to the left of the interface.

The results view's surface shall be composed of two kinds of surfaces, one part which adapts its own surface size when zooming with the mouse wheel, through keystroke or similar and one surface that does not change its own surface at such zoom command. The total area of the results view in the application windows is constant up until manually changed by drag-and-drop of one of its walls.

The Two Different Components of are:

1) Folder symbols with the demarcation lines to display the folder content. The folder symbols surface or shape does not vary. Neither does the thickness of the lines. Lengths of the lines may vary with delimitation surface on which they symbolize.

2) Images that symbolize the files in the folders that appear in the results view. Picture symbols surface varies when zooming is done in the results view, i.e. when the mouse wheel is spun while the mouse cursor is over the results view's window or when keys symbolizing enlargement or reduction is pressed while the mouse cursor is inside the results view's window.

The invention consists in how these two components work together so that the results view will provide the most effective image of the displayed objects as possible:

The ability to increase the overview over the entire displayed results from the map (with the structure of the folders on the two-dimensional surface) to the left by adjusting the magnification of images of documents, so that as many images as possible can be observed at once.

At the same time it is desirable to be able to change the magnification of the images of the documents on the display of the contents of the folders to better discern documents contained in a folder and thus be able to quickly determine what type of documents the folder contains. These two desires are exclusively and is at the expense of another.

Therefore, the system is constructed so that:

Magnification of displayed document symbols, i.e. preview of files, will reduce the total possible amount of showed folders with content because the surface of the list of folders with content simultaneously increases in height. This will give the user a clearer view of the documents of interest.

Increased oversight by the amount selected folders with content, i.e. zooming out to enable a larger overview, decreases the magnification of the displayed document symbols and the surface of the list of folders with content thus reduces in height and more folders with contents may displayed in the result view's window. The user will be able to see a larger number of folders and documents in one view.

Folders are displayed in a hierarchical list from top to bottom with areas showing folders beneath each respective folder symbol. The surfaces with the content of the folders appear interspersed in the list and when these surfaces are resized by the size of their graphical object, images of documents (Preview), are modified by scaling (zooming) this will also change the height of the list. The amount of document images (i.e. preview images) in each folder in the result view does not change during zooming (the amount of files in the folder is not changed), this means that if the width of the surface shall be constant then the preview images (document pictures) must vary in size. For example, if the size of the document images is increasing to enable increased recognition of the content of the documents, the symbols may be moved down a line when the line is full horizontally in the content area of a folder. As a result of this in combination with the fact that document images may become higher, in the same way height of the content area of the folder will increase. See Figure. The distance between the folder symbols in the list (and any demarcation lines) changes when the total area of the sum of the items is altered by the effect of each document image being enlarged or reduced. The height of the list in the results view's window is a function of the magnification of the preview images in the following ways: resizing of images (preview) increases the height of the contents of the result view which can then be scrolled up or down. Fixation of the list when zooming is done in the following ways:

1) The top edge, i.e. the list always starts with the first, highlighted root folder at the top and grows or shrinks down at different zoom settings of the images.
2) The point where the mouse cursor is located when scrolling with the mouse wheel is held is fixed and the list is growing up and down from this point.
3) If a document symbol is highlighted in the list, the position of this document symbol can be kept fixed while the list increases or decreases upward and downward from the document symbol.

Zooming, i.e. changing the magnification of the document symbol can also be restricted to only the area that displays the contents of a specific folder in the results view. In this mode all document images in the same field are affected while document symbols in other folders (above or below the current) are not affected. In this case, the list does not grow as much as when all document symbols in all folders are selected in the map and displayed in the results view and thus affected by a changed magnification setting (zooming).

Suggested method for Zoom-scroll relation when displaying content of a trees structure, 3104, to make usage of both the advantages of a scroll list and an expandable surface by making previews to rearrange etc. as shown in FIGS. 31A and 31B.

When the size of the thumbnail previews, 3102 of files 1 to 8 in FIG. 31A Increases each of the thumbnail surfaces, 3102, increases with the same rate and the common surface 3108 of all thumbnails below of the folder symbol A, 3101, increases. The increase of the total surface area of the common surface 3108 makes this surface to expand in height, i.e. in the y-coordinate direction, while keeping the width of the surface, 3105, constant. This causes the thumbnails, 3106, to rearrange. For example in the FIG. 31 previews 5 and 6 move down one row, and the common surface, 3108, displaying all the content of the folder, in this case Folder A, expands downwards, see 3103. The list of content in the content view (the result view) becomes longer and moves downward, 3107, below the border of the visible program window. When the previews (or thumbnails), 3106, are zoomed down and become smaller the height of the common surface decreases, 3107. The thumbnails will rearrange to fill the surface horizontally moving upwards when the size of the previews is decreasing, 3106. The width 3105 of the common surface, i.e. the content surface of folder A in FIG. 31, will be fixed. This makes new content to arise from below and become visible in the content view, 3107.

Automatic Generation of Folder Structure for Overview and Extension/Retraction of Parts of the Structure with the Trim Function HOW automatic creation of the plotted structure of folder symbols works, i.e. how the calculation of the relative ("default") coordinates of the surface and plotting of folder symbols when loading folders is done. For the structure to be created automatically and become easy to overview it is necessary to use a method to calculate the relative coordinates i.e. "The Box method". Previously, the overall interface has been described in patents, but it has not been known how the layout can be created automatically upon import using the Box method. What shall be protected are two different methods/processes for calculating and plotting:

a method/process at successive imports of folders in a structure based on the imported folder (the root folder) with simultaneous gradual plotting of the structure on the surface and a method/process to calculate new relative default-coordinates after a change in the structure, for example, dependent on the movement of folders, renaming folders, adding or removing folders.

One part that shall be protected is the method of calculating virtual "boxes" that encloses the branches with the condition that the boxes may not collide and that a box is created for a folder when the folder gets a child folder to calculate appropriate relative coordinates for mapping symbols in the plotted structure HOW the building of the structure with relative coordinates and two types of coordinate pairs, the calculated "default" coordinates and manually created "offset" coordinates (by drag-and-drop), is done. THIS solution with relative coordinates is necessary for the desired interface and HOW they allow the display before/after removal of branches in the tree structure by showing an image (plotted weaker) of the location from where the movement takes place while the movement and reorganization is given the "OK" retracting parts of the tree structure while maintaining their appearance (Trim function) etc. Without this structure, it would be difficult to deal with coordinates in a practical way. Absolute coordinates on the surface would e.g. make it very cumbersome to move a branch of the tree structure over the surface with more complicated calculations of all the following folders coordinates. One could also save only the sum of the estimated relative coordinates (default coordinates) and manually changed coordinates in the instance of a folder symbol in the memory.

Then the construction with relative coordinates to the previous node is still used, but only one two-dimensional coordinate pair, x, y. Upon any adjustments by default coordinates, e.g. if a new folder has been added, or a branch of the folder structure is retracted in a folder with siblings who have been manually adjusted coordinates, or the movement of a folder or branch over the surface with simultaneous display of before and after position the default coordinates are calculated again and the information about the previous manual changes of coordinates in the structure must be saved separately so as not to be lost. To illustrate the operation "Move", i.e. movement of a branch of the tree, in the case when only the sum of the relative coordinates are stored, the original coordinated from before the movement is stored separately. This is to show the before and after picture of the structure and be able to return (at "Undo").

HOW handling of the two types of coordinate pairs works when upon reversible retraction of a tree structure (in the program and the code called retraction and extension) and HOW calculation of relative coordinates for the surrounding tree structure of folders symbols works upon retraction and the extension of the tree structure (in and out trimming).

THE fact that automated execution of the retraction function (trim) shall be implemented WHEN, the outside of a specific folder, lying tree structure of folders is large enough. THAT a process reads through the entire imported tree structure to determine which components should be displayed retracted. The user can set the sizes of one or both of the two parameters (in the paragraphs below) that determines whether wrapping will occur. Very important in the systematic reading of folders with outlier branched tree structures are that it MUST be implemented based on the tree structures utmost folders and toward the root (a requirement?). If this is not done, one will not obtain an optimal distribution of trimmed branches. If calculations are made systematically in the opposite direction, i.e. from the root and outwards, the requirements are met to early and the retracted branches become impractically large. Two appropriate ways for assessing the size of outlier tree structure for determination of conditions for retraction are:

Parameter 1: Size height (y-direction) of a structure of folders, i.e. child folders, which are following from a given folder. The size of the following tree structure outside a given folder in which the structure retracted into is equal to this folder's demarcation box. The first box that meet a minimum size in height activates the retract function so that the folder structure in the box is retracted into the folder which is then automatically supplied with an open/close button for extension/retraction of the structure. Then the search continues inwards into the structure to the root to find the next box and folder that match the criteria. At this search and calculation a calculation is performed of all previous (i.e. outliers) retracted tree structures that only the folder symbol structure is retracted in. This PROCESS can also be described as a requirement, as well as the following options:

Parameter 2: Amount of folders in the first column of child folders outside of a given folder. As above, the process of search of demarcation boxes and folders to retract into the structure from the outside in towards the root. Each retracted structure is calculated as only the folder structure has been retracted into. The difference with this option is that it is the amount of folders in the first column that is calculated instead of the height of the demarcation box for each folder upon reading inwards towards the root.

When different computers in the network adjust the coordinates of folders they will generally be different. Coordinate information is stored locally on each client computer so that the application can be used off-line. For the coordinates in the various databases to be the same every client reads (with a local database of relative coordinates) the changes in a centrally (server) stored database (or directory) of changes of coordinates. THAT a centrally stored database server ensures that all client computers can read the coordinates and the appearance of the map comes out the same in all client computers is a possible requirement. In the central database on the server, text notes and other symbols that should be accessible to everyone can be stored. Different subsets of symbols and information can be made available to different users depending on the access rights of users in the client computer (user logged into the network, in the security rights registry, etc.)

Combination of Search Functions and the Created Structure on the Surface TO and HOW the Combination of Results from the Search Engine with the Plotted Structure of Folder Icons can be Used:

A. Better and Easier Search

The invention is also using the plotted tree structure to find the right document when searching with the search engine. A search must then take place only in the subset of the imported folders and display the results in the list and with symbols in the structure.

B. Ability to Find Relevant Documents that the Search Engine has not Found

The results view displays all the documents in the vicinity of the search hits enabling the users to easily find documents that are relevant to the situation, but that has not received a proper matching from the search engine. In this way, one can find more relevant documents; broaden the search to also include the surroundings of the hit list. Either open the surrounding folders automatically when scrolling through the hit list (under paragraph 2 below), or the user can manually select a folder containing results as signaled by the document symbols next to the folder symbol in the map (see item 1 below).

C. Find Forgotten or Hard to Find Folders and Tree Structures of Folders in the Computer System To find forgotten, not yet imported, parts of the folder structure the search can be performed of "all" so that the system is able to suggest imports by temporarily showing the branches and parts of the tree structure of folders in the underlying computer system that contains the hits on the search words. The search engine then looks at everything that is indexed in the computer/server, and does not limit the search to only imported folders and documents. This is a way to find forgotten or hidden parts of the folder structure that may contain relevant documents and also displays the structure conveniently on the two-dimensional surface. The system will then show how it is temporarily displayed tree structures relate hierarchically to the already imported folder(s) by plotting lines and intermediate folders in the overall structure. These can be displayed in a different color from the imported.

There are Two Ways One can Use the Search Hits List and Tree Structure Interface:

1. Click on the Branches in the Structure that Contains Symbols Indicating Search Hits to Examine the Branches Content of Search Hits in Addition to Documents not Fulfilling the Search Criteria The search-hit documents are clearly displayed next to the corresponding folders in the structure. To examine the contents of a part of the folder structure one only need to click on the first folder (generally closest to the root) and see all of the contents of folders and documents in the result view. The documents hit by the search engine are highlighted in the results view, but also all other documents in the same folder (highlighted manually by click) are shown.

2. Scrolling Through the Search Hits in the List of Search Hits (the Ones that the Search Engine has Found and that are Imported to the System)

When viewing a hit by scrolling through the list of search results from the search engine (hits in the imported tree structure of folders) then the whole part of the tree structure that contains the hit-document is displayed in the results view. i.e. all folders and their contents starting with the folder containing the current search hit is displayed.

The hits listed, can be scrolled through and the symbols in the structure are highlighted in sequence so that you can see where the current hit is in an overview. At the same time, the current hit is displayed in a special view, the results view, along with all the other documents also are stored in the folder containing the search hit. Folders, and the contents of these folders, which are outside the folder where the search hit is located are displayed simultaneously in the result view. Upon scrolling through the results the branch with the current search hit is automatically highlighted and the content of the entire branch is displayed in the result view. The folder containing the current search hit is always root for the selected branch and is therefore always showing on top of the list in the result view. This allows documents in the environment around every hit to be displayed, i.e. all documents in the same folder and surrounding folders, and search is in this way "broadened" with documents that have not been hit yet could still be relevant (because they are stored in the surrounding structure of folders) to the user. If a previous hit in the hit list is located closer toward the root than the current search hit, the whole tree structure, outside of the first hit, horizontal tree structure should be selected and thus appear in the result view. In the display of the current search hit the results view will be scrolled up so that the current hit is displayed while the overlying (inside the root placed) documents and folders are visible to the user. In this way, the user can find relevant documents in the folder structure both inside the folder with the current hit and outside the folder with the current hit, even though these are not found by the search engine. The amount of found documents with possible relevance is extended with this method.

Net View—Only the Search Results are Displayed in the Selected Branch

To be able to, in an efficient manner, move, e.g. all documents hit at a given search from a specific area of the tree, we have invented a special feature that clears all non-hit documents so that only the search hits appear in the results view when a branch structure is selected (clicked). The function (Net View) ensures that only hit-documents contained in the selected branch of the tree structure is visible in the results view. The user can then click different parts of the tree structure, e.g. with the guidance from of each documents symbol which indicate hit results in this way all hits are collected in one place. They are then arranged in the results view according to sort buttons by name, date modified, etc.

When scrolling through the results the new branch with the current search hit is automatically highlighted and with the function activated all search results in the current branch's folders are displayed in the results view. With net view activated all results are displayed in one view and can easily be sorted in different ways (name, date, size, etc.) without the having too sort through other documents that are in the folders but not hit by the search.

If a search is not performed the net function will deliver a result that all documents in a selected branch of the structure marked by clicking the innermost folder, closest to the root, (no documents will be rejected) is displayed in the results list Search and Display of Documents Searching and viewing of documents with the same name or same content or the same name and same content (duplicates) in the structure of folders in the underlying information system. The hits can be viewed with a special overview so that the user can see where the different instances of the documents mentioned above are available. Where the documents with the same name, same content, or same name and content, are available in the folder structure can be displayed by document symbols placed next to folder symbols in the structure. One can distinguish between the current document instance by an additional symbol, such as a circle around the document's symbol, or similar.

New Display for Content in Folders by Sliding the Cursor Over the Tree Structure of Folders Symbols. Moreover, a New Form of Display with a Beam to Open the Windows for Content in the Folder.

New features with the multi-select, move and copy folders and documents and preview (preview and compile documents from several previews)

The invention consists in the use of the proposed interface to arrange/organize documents, folders and branches of folder structures in an easier and clearer way than has previously been possible in other interfaces as well as from a clearer overview be able to easier select objects (documents and folders) for preview. The interface works in the following way:

Folders are loaded by a process of creating a representation of each folder with a symbol on a two-dimensional surface (see algorithm for process). The connections of how folders are stored in each other in a hierarchical system are shown by joining lines that resemble a mind-map where each folder symbol is a note in the tree structure. A reading algorithm observes if the cursor (mouse cursor, or similar) is located over a folder symbol on the surface and the algorithm will react if the cursor is over a folder symbol or if a symbol is clicked with the cursor icon with a selection tool (mouse or similar).

If a folder icon in the tree structure is highlighted (clicked) then the WHOLE outboard portion of the tree structure of folders symbols is selected. I.e. all the folders that are inside the clicked folder in the underlying data structure is visually selected on the surface. When a folder or a folder and all of the outlying structure (which is inside the folder in the computer system) is selected so that it can be moved freely over the surface by select button on the pointer tool is held down (left mouse button for example) while the cursor is moved, i.e. drag-and-drop. When this happens a continuous recalculation is performed of the dragged folders relative coordinates to its parent folder and thus all outlier folders coordinates that is a function inter alia thereof. This means that when moving one folder all outlier folders (child) moves with it without changing their relative positions to each other. When moving a folder, the folder is continuously plotted in application window with the attached tree structure and when the moved folder is located over another folder in another part of the tree (the part that does not move) this new folder is highlighted with a graphic signal (circle, halo, etc.). In this way, a change in the membership of a folder with the associated tree structure of subfolders becomes clearer.

The contents in all selected folders are displayed in a separate view/window, the results view. If a folder in the structure which contains a structure of folders is selected then all of these folders and their contents are displayed in the results view with the selected folder and its contents first/on top. The following folders and their contents appear in a list downward so that the first folder is at the top of the tree structure of child folders to the selected folder. Then comes the folder that is on top of the child folders that are listed outside this child folder to the selected folder, and so on.

Embodiments of the invention consists in the above described way to display interface together with a move (read and write) algorithm which makes it very easy to change the order/structure of folders, including the folders content of documents, and move, throw or copy subsets of documents in the folders.

We have invented a new method to select subset or subsets of documents stored in the folders that are displayed in the folder structure to allow a process to automatically assign one or more keywords (keywords) to these documents. The method takes advantage of creating a subset by clicking.

New Way to Write Keywords to Documents in a Computer System to Increase the Searchability of Documents A new method to select subset or subsets of documents stored in the folders that are displayed by the folder structure to allow a process automatically assign one or more keywords (keywords) to these documents. The method takes advantage of creating a subset by clicking one or more folders in the folder structure on the surface and then in the results view to these folders check which of those in the stored documents to be assigned to the key words. When a folder in the plotted structure is clicked on the surface to highlight the entire outside of this underlying structure of folders (if any) and all these folders documents (files) are displayed in the result view.

New Way to Measure the Statistical Properties of the Content in Parts of the Tree Structure of Folders with an Overview and Easy to Use Interface to Select Subset or Subsets (Multiselect)

It describes a new method to select subset or subsets of documents stored in the folders that are displayed by the folder structure to Function of the New Display for the Results View Here we describe a new method of enlargement and reduction of image reproductions of documents in folders (previews), with the folder hierarchy intact. The results view is displayed as a list of surfaces for displaying document symbols below each respective folder. The list containing the fields with the folder content of documents symbols expands in height when the surface fields with the different folder in the contents vary in size. The folder surfaces showing content varies in surface height while containing the images of document symbols vary without limit in both horizontally and vertically (i.e. the ratio of their proportions in height and width is fixed/locked). Because the document symbols surfaces shall not go beyond the boundary of the folders containing surfaces at magnification of the symbols the document symbols will switch places with each other when the sideways space is not sufficient. The images will then move down the folder's surface which then increases in size downwards. Corresponding but conversely, applies to the reduction of document symbols. In this way, the list grows in height while the various folder surfaces grows or decreases in height.

Magnification of Selected Document Images (Preview) in their Own Rising Window Centered Over the Document Symbol or Document Icon in the Result View When the pointing device (mouse cursor or similar) is placed over a document icon or document symbol in the result view this may be enlarged in a separate window by using a mouse scroll wheel or similar (or keystroke/button) will signal enlargement or reduction. The window is placed on a separate layer on top of the results view, with images centered over each document symbol (or document icon if the document is already displayed as preview).

Integrated Content View and Superzoom

Figure 25C:
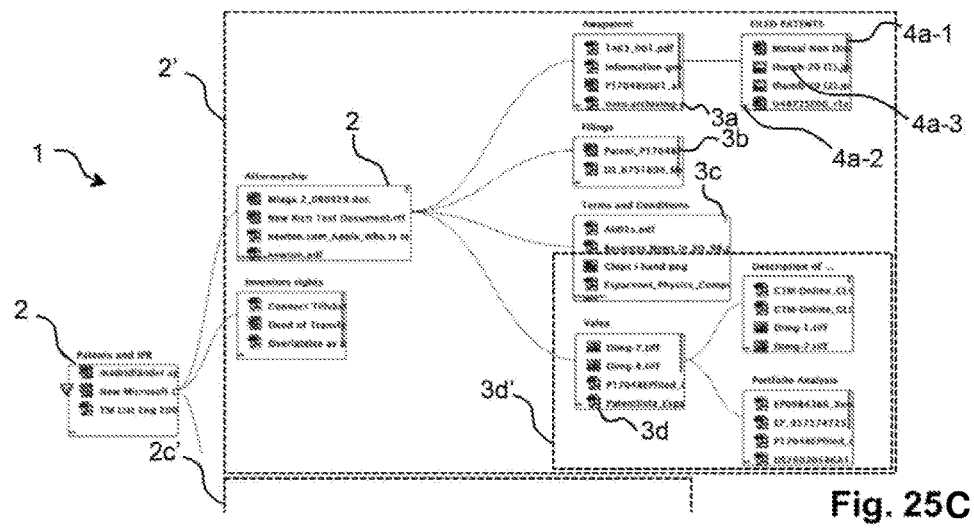

In FIGS. 25A-25C alternative embodiments of tree structures 1 of a set of data containers of a file structure, as outputted on a display, are illustrated in a schematic manner. Each data container is represented by a symbol positioned in the digital boundary 50 according their determined coordinates. A root data container (2) named "Patent and IPR" contains a set of child data containers 2a to 2c. As shown, data container 2a contains child data containers 3a, 3b, 3c, 3d. Data containers 2a thereby form the parent data container of data containers 3a, 3b, 3c, 3d. Data containers 3a and 3d forms the parent data containers for additional child data containers. Data containers 3b and 3c do not contain any child data containers. The position of the data containers in the tree structure on the digital boundary is determined based on delimiting box representations 2a', 2c', 3d', as indicted by dashed lines, as also described above. In more detail, data containers 2a is assigned box parameters defining the delimiting box representation 2a', 2c is assigned box representation 2c', and 3d is assigned box representation 3d'. Furthermore, the data containers are arranged in the tree structure 1 such that box representations of sibling data containers, such as 2a' and 2c', are arranged next to each other. In other words, delimiting boxes of sibling data containers do not overlap on the digital boundary. However, a sibling data container which is not assigned a box representation, or which does not contain any child data containers, may be located inside its siblings delimiting box representations. This is for example illustrated by data container 3c which is located partially inside delimiting box representation 3d'. As further shown, the symbols representing the data containers in the file structure are further connected by connection lines.

With reference to FIG. 25A, all data containers in the set of data containers forming the tree structure 1 is represented by a data container symbol having a width and height. With reference to FIG. 25B, selected data containers 2c and selected data container 3c are arranged in an integrated content view mode. Hence, these data containers are represented by a content data container symbol allowing for a presentation of the content of the data container in the symbol representing the data container. In other words, in the integrated content view, a symbol representing a data container in the tree structure forms an integrated window or digital boundary for displaying and handling the content arranged in the data container. In the integrated content view the content data container symbol may be larger, and the dimension of the content data container symbol may be determined based on the scale level or zooming of the digital boundary 50, or on the number of content, such as files, located inside the data container.

With reference to FIG. 25C, all of the data containers of the tree structure 1 are arranged in integrated content view. In other words, all containers having content, are represented on the digital boundary by a content data container symbol showing its content in a list or by icons. To represent all data container in the integrated content view of be determined based on integrated content view conditions, which also may be referred to as superzoom functionality. Parameters for switching to integrated content view may include: scale or zoom level of the outputted digital boundary on the display, the number of files in a data container, etc. The same parameters may be used for determining size of each one of the content data containers symbols. As illustrated, a content data container symbol may be arranged with vertical and horizontal scroll-bars 4a-1 and 4a-2 in order to scroll through the content 4a-3 displayed in digital boundary of the content data container symbol.

For example, the height of a content data container symbol may change based on scale or zoom level. Also, when scaling or zooming the digital boundary, the size of the content 4a-3 may be arranged to maintain a default size, while the size of the content data containers symbols vary.

Figure 26:
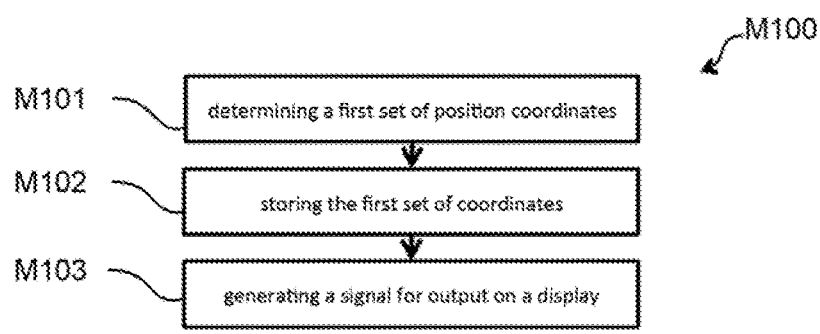
FIG. 26 is a schematic flow-chart of an embodiment of the method according to the present invention.

In FIG. 26, a schematic flowchart M100 of an embodiment of the computer-implemented method is illustrated.

Figure 27:
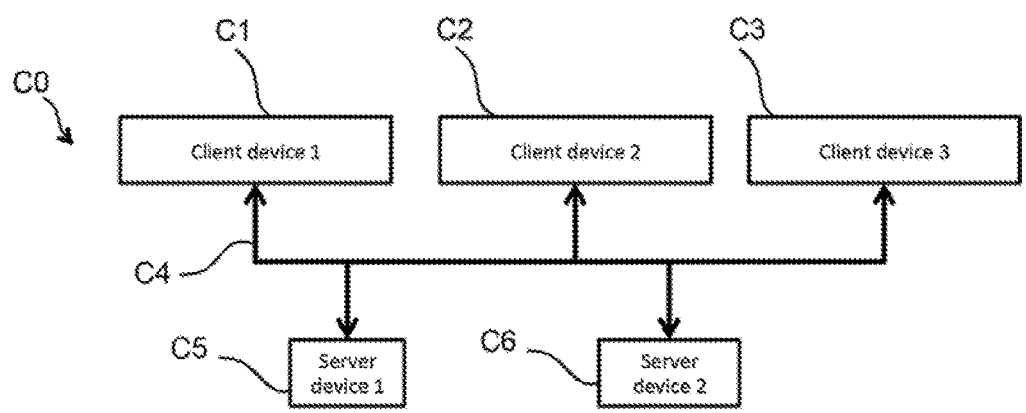
FIG. 27 is a schematic view of a system comprising client devices and server devices arranged to communicate.

In FIG. 27, system comprising client devices and server devices is illustrated. In more detail, client devices C1, C2, C3 may independently from each other be running an application based on the method, and may access a file structure stored on a server device C5, via communication network C4 (wire-based, or wireless). Furthermore, the client devices C1, C2, and C3 may further store on server device C6 a data file comprising user or user group specific information relating to the method, such as coordinates of the data containers, data container markers, meta data, etc.

Figure 28A:
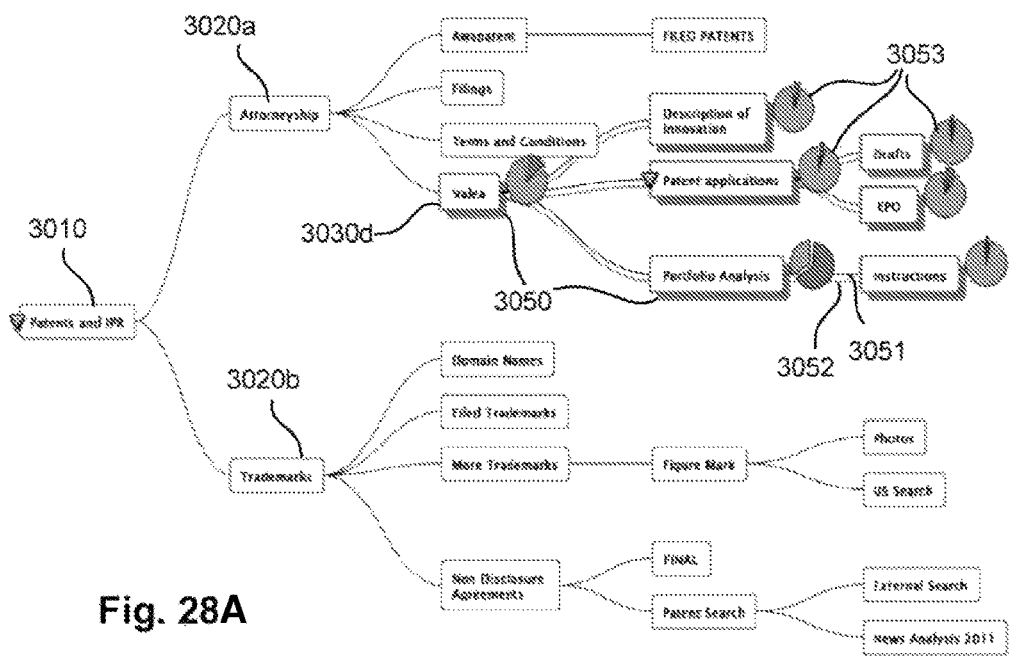
FIGS. 28A-28B are schematic views of exemplary embodiments of the invention.
Figure 28B:
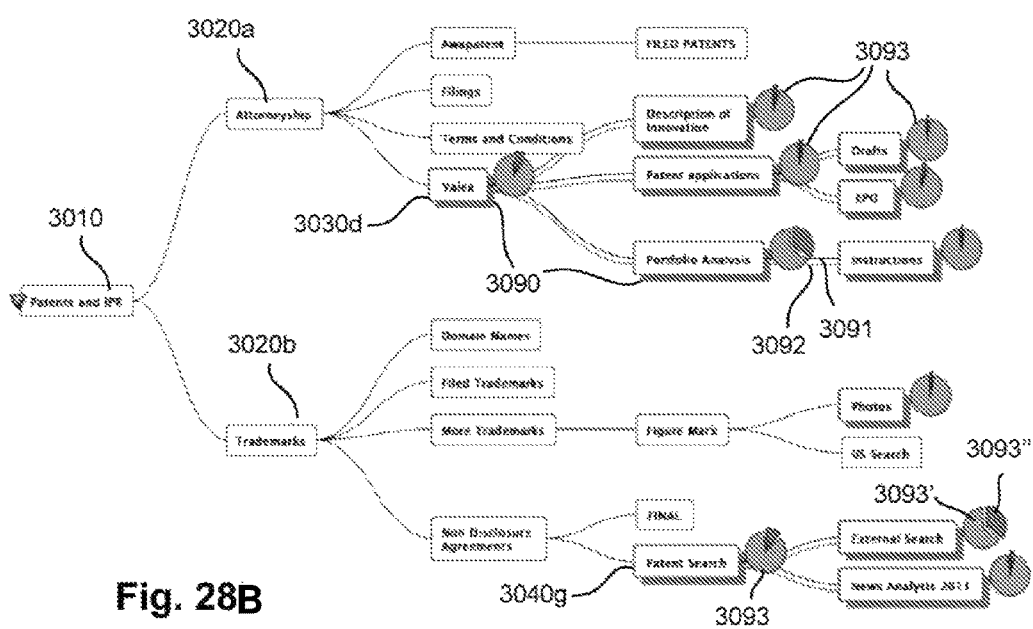

In FIGS. 28A-28B, two separate exemplary embodiments of a tree structure being subject to multi select operations for outputting statistical relationship between a subset of data containers forming a stat-subset of data containers, are shown. With reference to FIG. 28A, a plurality of data containers has been selected, e.g. via a selection input, on the digital boundary. Selected data containers form a subset of all the data containers in the tree structure. The selected data containers are provided with a graphical selection representation 3050 and 3051 indicating on the display that they have been selected. In the illustrated embodiment, the selected data containers are provided with a graphical selection representation formed of a shadowing of the data container symbols, such as 3030d, and shadowing of the connection line 3051. As shown, the selected set of data containers is formed of the branch of data containers having data container 3030d as root data container. With reference to FIG. 28B, additional data containers, such as the branch of data containers having data container 3040g as root data container and the data container named "Photos", have been selected. In other words, a multi selection of data containers have been executed, wherein the selected data containers form a multi select-subset of data containers which may be further operated on using different operations or methods. It is noted that multi selection in the tree structure allows for selection of different data containers which are not linked with connection lines, and which are located on different levels and data containers in the file structure hierarchy. Multiselection of a selected data container may automatically include the selection of all the data containers having the selected data containers as a root data container. Alternatively, multiselection of a selected data container may also include the selection of the specific data container only, excluding its child data containers. The type of multiselection mode may be determined based on a first multiselection mode input. A second multiselection mode input may be used for excluding data containers from the multiselect-subset of data containers which have been previously selected.

As further shown with reference to FIGS. 28A-28B, the multiselect-subset of data containers forms a stat-subset of data containers that are used for determining statistical relationship between the selected data containers. In the illustrated case, a statistical relationship of the distribution of the aggregated file size of the content contained in the data containers in the stat-subset is determined and outputted as a graphical representation 3053 for each data container. As shown, the graphical representation may be a pie-chart indicating the portion of the aggregated file size which is located a data container. The graphical representation 3093 may comprise a first and second portion 3093' and 3093", which combined form a representative of a portion of 100%.

It should be noted that the invention has mainly been described above with reference to a few embodiments. However, as is readily appreciated by a person skilled in the art, other embodiments than the ones disclosed above are equally possible within the scope of the invention, as defined by the appended patent claims.

In the claims, the word "comprising" does not exclude other elements or steps, and the indefinite article "a" or "an" does not exclude a plurality. A single apparatus or other unit may fulfill the functions of several items recited in the claims. The mere fact that certain features or method steps are recited in mutually different dependent claims does not indicate that a combination of these features or steps cannot be used to advantage.

The invention claimed is:

1. A computer-implemented method for handling a set of data containers associated with a respective logical address of a file structure, the method comprising:
   determining, by one or more processors of a computing device, for each given data container of the set of data containers:
      a first set of coordinates defining a position of the given data container within a digital boundary, the digital boundary forming a dimensional workspace for the file structure; and
      dimensions for the given data container including height and width dimensions, wherein at a first container of the set of containers has different dimensions from a second container of the set of containers;
   storing, by the one or more processors, the determined first sets of coordinates and the determined dimensions in memory, wherein each data container of the set of data containers is arranged in a parent data container; and generating, by the one or more processors, a signal for output on a display device communicating with the computing device by:
  generating, by the one or more processors, a graphical representation of the digital boundary,
  generating, by the one or more processors, a graphical tree structure representation of the first sets of coordinates, the determined, and the set of data containers on the digital boundary based on the determined first sets of coordinates, and
  generating, by the one or more processors, a graphical representation of a content view for presenting data container content, and
providing for display on the display device the graphical representation of the digital boundary with the graphical tree structure representation and the graphical representation of the data container content.

2. The method according to claim 1, wherein each first set of position coordinates associated with a data container is representative of a default position of the respective data container on the digital boundary in relation to its parent data container.

3. The method according to claim 1, further comprising:
determining that a first data container of the set of data containers contains a first child data container; and
specifying parameters representative of extension of a delimiting box representation on the digital boundary, which delimiting box representation is assigned to the first data container.

4. The method according to claim 3, further comprising determining that the first data container contains a second or more child data containers forming, with the first child data container, a sibling-subset of data containers sharing a same parent data container, wherein the step of specifying box parameters is based on sibling data containers in the sibling-subset.

5. The method according to claim 4, wherein size of the delimiting box representation associated with the first data container is adapted to encompass a tree structure formed by the sibling-subset of data containers.

6. The method according to claim 5, wherein each data container of the set of data containers includes one or more child data containers and is assigned a delimiting box representation, and determining the first set of coordinates for each given data container is further based on an extension of the assigned delimiting box representation for that given data container in the digital boundary.

7. The method according to claim 1, further comprising:
determining a second set of coordinates on the digital boundary for each data container, and
storing the second set of coordinates associated with each data container in a memory, wherein each second set of coordinates associated with a data container is representative of a off-set position of the data container on the digital boundary in relation to its default position.

8. The method according to claim 1, further comprising:
receiving via an input a first move input selecting a data container of the set of data containers, which selected data container is arranged in a container of a current parent container;
receiving via an input a second move input selecting a second data container for moving the selected data container to be arranged in the container of the second data container; and
in response to the second move input recalculate the first set of coordinates for the selected data container.

9. The method according to claim 8, further comprising receiving via in input a first trimming input selecting a data container presented in a user interface connected to the computing device, for expanding or retracting a branch of child data containers associated with the selected data container.

10. The method according to claim 1, further comprising receiving via an input a plurality of multiselecting inputs for selecting a plurality of data containers of the set of data containers outputted on the display device, wherein the data selected plurality of data containers form a multiselect-subset of data containers presented in the displayed graphical tree structure representation.

11. The method according to claim 1, further comprising:
receiving via an input a first search input; and
generating a signal for output on a display device a graphical representation of a search result comprising search hits on the digital boundary.

12. The method according to claim 11, the method further comprising generating a signal for output on a display device communicating with the computing device a graphical representation of suggested data containers of the file structure for import.

13. The method according to claim 1, further comprising generating a signal for output on a display device communicating with the computing device by a graphical representation content of at least one of a preview data container and of a preview-subset of data containers in an integrated content view on the digital boundary, the integrated content view forming part of the displayed graphical tree structure representation.

14. The method according to claim 13, further comprising receiving via an input a first preview input selecting a data container of the set of data containers to form the preview data container.

15. The method according to claim 13, further comprising determining that an integrated content view condition is fulfilled, and in response automatically generate a second preview input selecting data containers forming a preview-subset of data container.

16. The method according to claim 13, further comprising:
receiving via an input a plurality of multiselecting inputs for selecting a plurality of data containers of the set of data containers outputted on the display device, wherein the data selected containers form a multiselect-subset of data containers presented in the displayed graphical tree structure representation; and
searching based on the multiselect-subset of data containers.

17. The method according to claim 13, further comprising receiving via an input a time interval input for selecting a searching time interval via a user interface.

18. The method according to claim 1, further comprising:
receiving via an input a first stat-input for determining statistical relationship between a stat-subset of data containers; and
generating a signal for output, on a display device communicating with the computing device, a graphical representation of the statistical relationship between the stat-subset of data containers.

19. The method according to claim 18, further comprising receiving via an input a plurality of multiselecting inputs for selecting a plurality of data containers of the set of data containers outputted on the display device, wherein the data selected containers form a multiselect-subset of data containers presented in presented in the displayed graphical tree structure representation, and wherein the statist-subset is defined by the multiselect-subset of data containers.

20. The method according to claim 1, wherein generating the graphical tree structure further includes providing a measure of search results for each given data container of the set of data containers with that given data container.

21. The method according to claim 20, further comprising:
receiving a request to expand or retract a branch of child data container associated with a selected data container of the displayed graphical tree structure representation; and
causing the branch to expand or retract based on the request, and wherein each measure of search results aggregates and increases in number in relation to retraction of data container and de-aggregates and decreases in number in relation to expansion of data container.

22. A computing device for conducting at least one of handling and displaying a set of data containers associated with a respective logical address of a file structure, the computing device comprising:
one or more processors,
a memory containing instructions that, when executed, cause the one or more processors to:
determine a first set of position coordinates on a digital boundary for each data container of the set of data containers, each digital boundary forming a dimensional workspace for the file structure, determine dimensions for each data container of the set of data containers including height and width dimensions, wherein at a first container of the set of containers has different dimensions from a second container of the set of containers, store the determined dimensions and the first set of coordinates associated with each data container comprising a position and a number of delimitation positions in a memory, wherein each data container of the set of data containers is arranged in a parent data container; and
generating a signal for output on a display device communicating with the computing device by:
generating a graphical representation of the digital boundary,
generating a graphical tree structure representation of the first sets of coordinates, the determined dimensions, and the set of data containers, and
generating a graphical representation of a content view for presenting data container content, and
providing for display on the display device the graphical representation of the digital boundary with the graphical tree structure and the graphical representation of the data container content.

23. A computer-readable medium containing instructions that, when executed by a computing device, cause the computing device to perform a method comprising:
determining a first set of coordinates on a digital boundary for each data container of a set of data containers stored in a memory and comprising a position and a number of delimitation positions, each digital boundary forming a dimensional workspace for the file structure, and
determining dimensions for each data container of the set of data containers, the determined dimensions including height and width dimensions, wherein at a first container of the set of containers has different dimensions from a second container of the set of containers,
storing the determined dimensions and the first set of coordinates associated with each data container in the memory wherein each data container is arranged in a parent data container; and
generating a signal for output on a display device communicating with the computing device by:
generating a graphical representation of the digital boundary,
generating a graphical tree structure representation of the set of data containers on the digital boundary based on the first set of coordinates, the determined dimensions, and the set of data containers, and
generating a graphical representation of a content view for presenting data container content, and
providing for display on the display device the graphical representation of the digital boundary with the graphical tree structure and the graphical representation of the data container content.

* * * * *